(12) United States Patent
Shimono et al.

(10) Patent No.: US 10,639,905 B2
(45) Date of Patent: May 5, 2020

(54) INK SET AND IMAGE RECORDING METHOD

(71) Applicant: FUJIFILM CORPORATION, Minato-ku, Tokyo (JP)

(72) Inventors: Katsuhiro Shimono, Kanagawa (JP); Takuya Arai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/128,508

(22) Filed: Sep. 12, 2018

(65) Prior Publication Data

US 2019/0010349 A1    Jan. 10, 2019

Related U.S. Application Data

(63) Continuation of application No. PCT/JP2017/006685, filed on Feb. 22, 2017.

(30) Foreign Application Priority Data

Mar. 24, 2016    (JP) .................................. 2016-060111

(51) Int. Cl.

| | | |
|---|---|---|
| C09D 11/54 | (2014.01) |
| B41M 5/00 | (2006.01) |
| B41M 7/00 | (2006.01) |
| B41J 2/21 | (2006.01) |
| C08F 220/14 | (2006.01) |
| C09D 11/107 | (2014.01) |
| C09D 11/106 | (2014.01) |
| C09D 11/322 | (2014.01) |
| C09D 11/40 | (2014.01) |
| C08F 212/08 | (2006.01) |
| C09D 11/326 | (2014.01) |

(52) U.S. Cl.
CPC .......... *B41J 2/2107* (2013.01); *B41J 2/2114* (2013.01); *B41M 5/0017* (2013.01); *C08F 220/14* (2013.01); *C09D 11/106* (2013.01); *C09D 11/107* (2013.01); *C09D 11/322* (2013.01); *C09D 11/40* (2013.01); *C09D 11/54* (2013.01); *B41M 7/0018* (2013.01); *C08F 212/08* (2013.01); *C09D 11/326* (2013.01)

(58) Field of Classification Search
CPC ........ B41J 2/1433; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52

See application file for complete search history.

(56) References Cited

U.S. PATENT DOCUMENTS

| | | | |
|---|---|---|---|
| 2009/0202724 A1* | 8/2009 | Arai .................... | C09D 11/033 106/31.86 |
| 2009/0263635 A1 | 10/2009 | Sano et al. | |
| 2012/0320121 A1* | 12/2012 | Arai .................... | C09D 11/322 347/20 |
| 2012/0320123 A1 | 12/2012 | Takeda et al. | |
| 2013/0249996 A1* | 9/2013 | Saito .................... | B41J 2/2114 347/21 |
| 2015/0166819 A1 | 6/2015 | Shinohara | |
| 2016/0222238 A1* | 8/2016 | Arai .................... | B41M 5/0017 |

FOREIGN PATENT DOCUMENTS

| | | |
|---|---|---|
| EP | 2535379 A1 | 12/2012 |
| JP | 2009-256537 A | 11/2009 |
| JP | 2013-001854 A | 1/2013 |
| JP | 2013-018156 A | 1/2013 |
| JP | 2013-72045 A | 4/2013 |
| JP | 2014-111374 A | 6/2014 |
| WO | 2014050751 A1 | 4/2014 |

(Continued)

OTHER PUBLICATIONS

Extended European Search Report dated Mar. 11, 2019, issued in corresponding EP Patent Application No. 17769784.4.
English language translation of the following: Office action dated May 7, 2019 from the JPO in a Japanese patent application No. 2018-507151 corresponding to the instant patent application.
International Search Report issued in International Application No. PCT/JP2017/006685 dated May 30, 2017.
Written Opinion of the Isa issued in International Application No. PCT/JP2017/006685 dated May 30, 2017.

(Continued)

*Primary Examiner* — Manish S Shah
(74) *Attorney, Agent, or Firm* — Solaris Intellectual Property Group, PLLC

(57) ABSTRACT

Provided are an ink set including: an ink composition which contains a colorant and water, and a treatment liquid which contains water-insoluble resin particles having a constitutional unit derived from a first monomer that contains at least one group selected from a sulfo group and a salt of the sulfo group and a constitutional unit derived from a second monomer that has at least one structure selected from an aromatic ring structure and an alicyclic structure, a compound that causes the colorant in the ink composition to aggregate, and water; and an image recording method.

11 Claims, No Drawings

(56) References Cited

FOREIGN PATENT DOCUMENTS

WO        2016/136914 A1     9/2016
WO        2016/159054 A1    10/2016

OTHER PUBLICATIONS

English language translation of the following: Office action dated Oct. 1, 2019 from the JPO in a Japanese patent application No. 2018-507151 corresponding to the instant patent application.

\* cited by examiner

INK SET AND IMAGE RECORDING METHOD

CROSS-REFERENCE TO RELATED APPLICATIONS

This application is a continuation application of International Application No. PCT/JP2017/006685, filed Feb. 22, 2017, the disclosure of which is incorporated herein by reference in its entirety. Further, this application claims priority from Japanese Patent Application No. 2016-060111, filed Mar. 24, 2016, the disclosure of which is incorporated herein by reference in its entirety.

BACKGROUND OF THE INVENTION

1. Field of the Invention

The present invention relates to an ink set and an image recording method.

2. Description of the Related Art

In the related art, various systems have been proposed as a system of recording an image. For example, a recording system that uses an ink jet method has been widely used from the viewpoint that images can be recorded on optional materials. In the recording system that uses an ink jet method, for example, images can be recorded by jetting an ink in the form of a liquid droplet from a plurality of nozzles provided on an ink jet head used for jetting an ink.

Techniques for improving the quality of recorded images have been examined in various manners. Even in the recording system using an ink jet method, for example, there is a technique of forming an image by bringing an ink and a treatment liquid into contact with each other using an ink set which includes an ink containing a colorant and a treatment liquid containing a compound that causes components in the ink to aggregate.

As a specific example, an image recording method which includes a step of applying an ink containing a pigment being dispersed to a recording medium; and a step of applying an acidic liquid composition, which contains resin fine particles containing at least one selected from a sulfo group and a phosphoric acid group and destabilizes the dispersed state of the pigment in the ink, to the recording medium has been disclosed (for example, see JP2013-18156A).

Further, an image forming method that uses an ink set including an ink composition that contains a pigment and water, and a treatment liquid that contains a water-soluble polymer compound, an organic acidic compound, silicone oil, and water has been disclosed (for example, see JP2013-72045A). In the ink set described in JP2013-72045A, the coating unevenness and graininess of images are considered to be suppressed because the treatment liquid contains a water-soluble polymer compound and silicone oil.

SUMMARY OF THE INVENTION

However, in a case where an image is recorded, using an aqueous ink, on a substrate whose wettability with respect to water is relatively low, impacted ink droplets are affected by a water repellent action of the substrate and thus the recorded image tends to be smaller than the desired size since the contact angle of the surface with water (water contact angle) is 70° or greater, compared to a case where an image is recorded on a substrate having a low water contact angle. Further, as described in JP2013-72045A, since the treatment liquid has an action of decreasing the diameter of an ink droplet in the recording form in which an image is recorded by causing the components in the ink to aggregate using the treatment liquid, ink droplets impacted on the substrate may become significantly smaller than the desired size of liquid droplets. In a case where the size of liquid droplets of the impacted ink becomes smaller more than necessary, the white background of the substrate appears from the gap between liquid droplets. As the result, a phenomenon in which the density of a solid image area that is expected to have a high density is decreased occurs. Further, the impacted liquid droplets are moved on the surface due to the water repellent action of the surface of the substrate, and striped unevenness appears on the image in some cases.

Among the above-described techniques of the related art, a treatment liquid containing a water-soluble polymer compound is used in the ink set described in JP2013-72045A. However, it is considered that, since the water-soluble polymer compound cannot be in a particle state in a case where the compound is used in an aqueous treatment liquid, the effect of improving the wettability of a surface of the substrate by permeation of the water-soluble polymer compound into the substrate at the time of application of the treatment liquid to the substrate is not necessarily sufficient. Further, a surfactant is used for improving the wettability of a surface of the substrate in some cases, but the effect of improving the wettability using a surfactant is not sufficient.

Since the resin fine particles contained in the liquid composition contain a sulfo group or a phosphoric acid group according to the technique described in JP2013-18156A, the effect of improving the wettability of the surface of the substrate can be expected, but fine particles are swollen in the treatment liquid with time and thus likely to be coarsened. The resin of the resin fine particles contains 2-ethylhexyl acrylate which is a relatively hydrophobic monomer, but the effect of suppressing swelling of particles is not sufficient. Accordingly, the dispersion stability of the resin fine particles in the treatment liquid is low, and this results in an increase in viscosity with time. Therefore, coating unevenness or the like easily occurs. Consequently, with the technique described in JP2013-18156A, coating unevenness easily occurs in an image and deteriorates with time, and thus it can be said that occurrence of striped unevenness or the like is difficult to stably suppress.

Under the above-described circumstances, for example, in a case where a technique that stably suppresses a decrease in density at the time of formation of a solid image and also stably suppresses occurrence of striped unevenness in an image is established, a high-quality image can be stably recorded on an optional substrate while using an aqueous ink, and thus the application range of this technique is expected to be widened.

An embodiment of the present invention has been made in consideration of the above-described problem, and the purpose of the present invention is to provide an ink set which is used to obtain a solid image area with a desired density and suppresses occurrence of striped unevenness (hereinafter, also referred to as streak unevenness); and an image recording method. Further, an object of the present invention is to achieve the purpose.

In the present specification, the "solid image" indicates a surface image formed by applying an ink at a specific halftone dot rate (density).

Further, the "streak unevenness" indicates a phenomenon in which shading occurs in the form of a stripe because an ink composition is moved due to impact interference of the ink composition.

Specific means for solving the above-described problem includes the following aspects.

<1> An ink set comprising: an ink composition which contains a colorant and water; and a treatment liquid which contains water-insoluble resin particles having a constitutional unit derived from a first monomer that contains at least one group selected from a sulfo group and a salt of the sulfo group and a constitutional unit derived from a second monomer that contains at least one structure selected from an aromatic ring structure and an alicyclic structure, a compound that causes the colorant in the ink composition to aggregate, and water.

<2> The ink set according to <1>, in which the constitutional unit derived from the second monomer is at least one constitutional unit selected from the group of constitutional units represented by any of Formulae A to E.

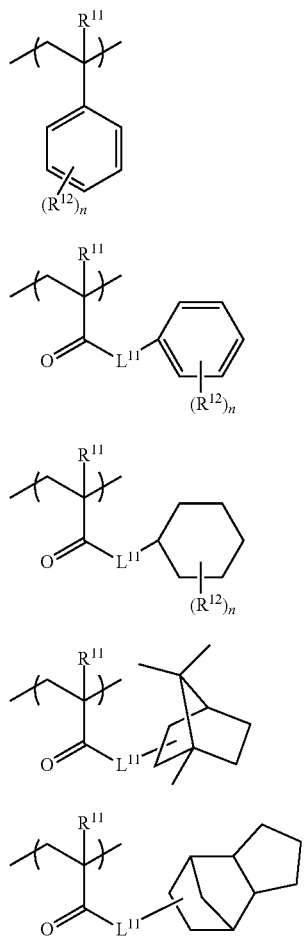

In the formulae, $R^{11}$ represents a methyl group or a hydrogen atom, $R^{12}$ represents a hydrogen atom or a linear or branched alkyl group having 1 to 10 carbon atoms, n represents an integer of 0 to 5, and in a case where n represents 2 or greater, a plurality of $R^{12}$'s may be the same as or different from each other, and $L^{11}$ represents a divalent linking group formed by linking one or two or more groups selected from the group consisting of a single bond, a linear, branched, or cyclic alkylene group having 1 to 18 carbon atoms, an arylene group having 6 to 18 carbon atoms, —O—, —NH—, —S—, and —C(=O)—.

<3> The ink set according to <1> or <2>, in which a content ratio of the total constitutional units derived from the second monomer in the water-insoluble resin to a total mass of the water-insoluble resin is in a range of 10% by mass to 40% by mass.

<4> The ink set according to any one of <1> to <3>, in which a mass ratio of the constitutional unit derived from the first monomer to the constitutional unit derived from the second monomer is in a range of 0.15 to 0.90.

<5> The ink set according to any one of <1> to <4>, in which the constitutional unit derived from the first monomer is a constitutional unit represented by Formula 1.

In the formula, $R^4$ represents a methyl group or a hydrogen atom, $L^4$ represents a divalent linking group formed by linking one or two or more groups selected from the group consisting of a single bond, a linear, branched, or cyclic alkylene group having 1 to 10 carbon atoms, an arylene group having 6 to 10 carbon atoms, —O—, —NH—, —S—, —C(=O)—, and —CH(—OH)—, and M represents a hydrogen atom or a cation.

<6> The ink set according to any one of <1> to <5>, in which a content ratio of the constitutional unit derived from the first monomer in the water-insoluble resin to a total mass of the water-insoluble resin is in a range of 5% by mass to 25% by mass.

<7> The ink set according to any one of <1> to <6>, in which a mass ratio of oxygen atoms in at least one second monomer to a molecular weight of the second monomer is 0.1 or less.

<8> The ink set according to any one of <1> to <7>, in which at least one second monomer is styrene.

<9> The ink set according to any one of <1> to <8>, in which a glass transition temperature of the water-insoluble resin is 100° C. or higher.

<10> The ink set according to any one of <1> to <9>, in which a content ratio of the water-insoluble resin particles to the compound that causes the colorant to aggregate is in a range of 0.19 to 0.5 in terms of the mass.

<11> An image recording method comprising: a pretreatment step of applying the treatment liquid of the ink set according to any one of claims 1 to 10 to at least one surface of a substrate having a contact angle of 70° or greater when 3 seconds have elapsed from application of water droplets to the surface; and an image recording step of recording an image by jetting the ink composition of the ink set according to any one of claims 1 to 10 to the surface to which the treatment liquid has been applied using an ink jet method.

<12> The image recording method according to <11>, in which the substrate is a paper substrate having a coating layer.

According to the present invention, it is possible to provide an ink set which is used to obtain a solid image area with a desired density and suppresses occurrence of striped unevenness (hereinafter, also referred to as streak unevenness); and an image recording method.

DESCRIPTION OF THE PREFERRED EMBODIMENTS

Hereinafter, an ink set and an image recording method will be described in detail.

In the present specification, the numerical ranges shown using "to" indicate ranges including the numerical values described before and after "to" as the lower limits and the upper limits.

Further, in the present specification, the amount of each component in a composition indicates the total amount of a plurality of substances present in the composition in a case where a plurality of substances corresponding to each component in the composition are present, unless otherwise specified.

In the present specification, the term "step" includes not only an independent step but also a step which cannot be clearly distinguished from other steps in cases where the intended purpose of the step is achieved.

Further, in the present specification, the term "(meth) acrylate" indicates acrylate and methacrylate and the term "(meth)acryl" indicates acryl and methacryl.

<Ink Set>

An ink set according to the present disclosure includes an ink composition containing a colorant and water; and a treatment liquid for performing a pre-treatment on a substrate before application of the ink composition. In the present disclosure, the treatment liquid contains water-insoluble resin particles having a constitutional unit derived from a first monomer that contains at least one group selected from a sulfo group and a salt of the sulfo group and a constitutional unit derived from a second monomer that has at least one structure selected from an aromatic ring structure and an alicyclic structure, a compound (hereinafter, also referred to as a "aggregation component") that causes the colorant in the ink composition to aggregate, and water.

The treatment liquid may further contain components other than the water-insoluble resin particles, the aggregation component, and water as necessary. Further, the ink composition may further contain components other than the colorant and water.

In the ink set according to the present disclosure, the water-insoluble resin particles having a constitutional unit derived from a first monomer that contains at least one group selected from a sulfo group and a salt of the sulfo group and a constitutional unit derived from a second monomer that has at least one structure selected from an aromatic ring structure and an alicyclic structure are unevenly distributed in the surface of the substrate by performing the pre-treatment for applying the treatment liquid to the substrate before recording an image so that the quality of the image recorded on the substrate whose surface is hydrophobic is improved.

The present disclosure is important in terms that the hydrophilization of the surface of the substrate and the stabilization of the treatment liquid are intended to be improved by using the particles.

Specifically, since the surface of each water-insoluble resin particle contained in the treatment liquid is hydrophilic and the inside thereof is hydrophobic, the particle itself is unlikely to be swollen in a case where the water-insoluble resin particles are present in the treatment liquid, and thus the dispersed state is stably maintained and the surface (surface to which the treatment liquid has been applied) of the substrate is hydrophilized and the wettability of the aqueous ink composition is improved at the time of application of the water-insoluble resin particles to the substrate. In this manner, a decrease in density of a solid image area is suppressed, a solid image area with a desired density is obtained, and an image in which occurrence of streak unevenness is suppressed is obtained.

The "decrease in density of a solid image area" indicates a phenomenon in which an image is affected by the color of a substrate so that the numerical value of the color density is more decreased than the intended color density because the size of liquid droplets of an ink composition impacted on the substrate is small or a phenomenon in which an ink composition is moved due to impact interference of the ink composition and an image is affected by the color of a substrate so that the numerical value of the color density is more decreased than the intended color density, in a case where a solid image is formed on the substrate.

The detailed operation mechanism of the ink set according to the present disclosure is not necessarily clear, but it is speculated that the mechanism is operated as follows.

Since the water-insoluble resin in the water-insoluble resin particles contains at least one group selected from a sulfo group and a salt of the sulfo group, the resin is hydrophilic and the water-insoluble resin particles are hydrophilized. Therefore, in a case where the particles are allowed to be present on the surface of the substrate, the surface of the substrate is hydrophilized. Further, in a case where the water-insoluble resin particles contain a sulfo group and the like, repulsion between particles increases due to the presence of a large amount of anions and the dispersion stability of the water-insoluble resin particles in the treatment liquid is further improved. Moreover, in a case where the water-insoluble resin simply contains a sulfo group and the like in a molecule, not only the surface but also the inside thereof become hydrophilic in a case where the water-insoluble resin is used as the particles. Accordingly, in a case where the particles are allowed to be present in the treatment liquid, water or a solvent serving as a vehicle permeates into the particles with time and is swollen, coalescence of particles is likely to occur, the dispersion stability of the particles in the treatment liquid is degraded, and the dispersion stability of the particles in the treatment liquid with time is also degraded. In this manner, the viscosity is increased with time due to the treatment liquid. As the result, an increase in viscosity results in degradation of the image quality.

Therefore, the water-insoluble resin in the water-insoluble resin particles has at least one structure selected from an aromatic ring structure and an alicyclic structure, as a hydrophobic group. A hydrophobic group is likely to be present inside of a particle rather than the surface of the particle. Accordingly, since the hydrophobic group is introduced into particles so that the inside of the particles becomes more hydrophobic, the swelling of the particles with time is prevented, the temporal stability of the particles in the treatment liquid is excellent, and the occurrence of streak unevenness with time is prevented in a case where the particles are allowed to be present in an aqueous treatment liquid. Further, the hydrophilicity of the surface of the particles can be maintained because uneven distribution of the hydrophobic group is found not from the surface of the particles but the inside of the particles in a case where the hydrophobic group is present in an aqueous treatment liquid.

In the related art, as described in JP2013-72045A above, a water-soluble resin is used in a treatment liquid of an ink set in some cases. However, since the water-soluble resin cannot be in a particle state in a case of being present in an aqueous treatment liquid, particles are likely to permeate inside of the substrate in a case of being applied to the substrate, and thus the effect of improving the wettability of a surface of the substrate is not expected. Further, a surfactant is used for improving the wettability of a surface of the substrate in some cases, but the effect of improving the wettability using a surfactant is not sufficient.

Meanwhile, in the ink set of the present disclosure, at least one hydrophobic group (hereinafter, also referred to as a specific hydrophobic group) selected from an aromatic ring structure and an alicyclic structure and at least one hydrophilic group (hereinafter, also referred to as a specific hydrophilic group) selected from a sulfo group and a salt of the sulfo group are allowed to be present in the water-insoluble resin particles. It is considered that the water-insoluble resin particles in the treatment liquid are unlikely to permeate into the substrate and are likely to be unevenly distributed in the surface of the substrate in a case where the treatment liquid containing the water-insoluble resin particles is applied to the substrate. Further, since a hydrophilic sulfo group or a salt of the sulfo group is allowed to be present in the surface of each particle, a hydrophilic action of the particles with respect to the surface of the substrate is expected by unevenly distributing the particles in the surface of the substrate.

In the present disclosure, in the substrate (for example, a substrate having a contact angle of 70° or greater when 3 seconds have elapsed from application of water droplets to the surface) having a hydrophobic surface, the wettability of the surface of the substrate is remarkably improved.

In a case where the ink composition is impacted on the surface of the substrate to which the treatment liquid has been applied as described above, since the surface of the substrate is hydrophilized, the size of liquid droplets of the impacted ink composition does not become extremely small. As the result, coalescence of liquid droplets in the ink composition is prevented and a desired size of liquid droplets is acquired in a case where the colorant in the ink composition is aggregated due to the contact with the treatment liquid, and thus the liquid droplets of the ink composition are disposed at a desired size in a desired position of a substrate. In this manner, an image in which a decrease in density of a solid image area, in a case where a solid image is recorded, is suppressed and occurrence of streak unevenness is suppressed is considered to be obtained.

Further, the water-insoluble resin particles maintain the state of being dispersed in the treatment liquid even in a case of being brought into contact with the aggregation component (the compound that causes the colorant in the ink composition to aggregate) contained in the treatment liquid.

(Treatment Liquid)

The treatment liquid contained in the ink set according to the present disclosure is used for performing a pre-treatment on the substrate before application of the ink composition described below. The treatment liquid contains water-insoluble resin particles having a constitutional unit derived from a first monomer that contains at least one group selected from a sulfo group and a salt of the sulfo group and a constitutional unit derived from a second monomer that has at least one structure selected from an aromatic ring structure and an alicyclic structure, a compound (aggregation component) that causes the colorant in the ink composition to aggregate, and at least water. Therefore, the treatment liquid is excellent in the hydrophilic action on the substrate. In other words, the wettability with respect to the ink composition of the substrate (for example, a substrate in which a contact angle (water contact angle) between the surface and water is 70° or greater) whose wettability with respect to water is relatively low is increased, a solid image area with a desired density is easily obtained, and occurrence of the striped unevenness can be effectively suppressed.

—Water-Insoluble Resin Particles—

The treatment liquid contains at least one kind of water-insoluble resin particles.

In a case where the treatment liquid contains water-insoluble resin particles, most of the water-insoluble resin particles are unevenly distributed in the surface of the substrate after the application of the treatment liquid, and the wettability of the surface of the substrate is improved.

The ink droplets wet-spread over the surface of the substrate in a case where the ink composition is impacted on the surface of the substrate, on which the water-insoluble resin particles are unevenly distributed, and the aggregation component contained in the treatment liquid causes dispersion components such as the colorant in the ink composition to aggregate. In this manner, coalescence of the liquid droplets is prevented and the size of liquid droplets becomes a desired size. As the result, a solid image area in which a decrease in density of a solid image area is suppressed and which has a desired density is obtained.

As described above, the water-insoluble resin particles have excellent temporal stability in the treatment liquid, and coarsening of the particles resulting from swelling is suppressed. Therefore, occurrence of streak unevenness which is likely to occur in a recorded image is effectively suppressed. Further, the graininess in an image can be suppressed.

Further, the "graininess" indicates a phenomenon in which extremely small density unevenness occurs in an image so that the uniformity of pixels is degraded due to coalescence of liquid droplets after an ink composition is impacted on a substrate.

The term "water-insoluble" of the water-insoluble resin particles indicates a state in which, when the volume average particle diameter is measured using an aqueous dispersion liquid of resin particles obtained by adjusting the concentration of solid contents to be in a range of 1% by mass to 2% by mass at a liquid temperature of 25° C., particles can be detected and the volume average particle diameter thereof can be measured. Further, the resin is in a state of being dissolved in water in a case where particles are not detected and the volume average particle diameter cannot be measured, and this state is typically referred to as a "water-soluble" state.

In the present disclosure, the "solid content" indicates remaining components obtained by removing solvents from the composition.

The volume average particle diameter can be measured using a nanotrac particle size distribution measurement apparatus UPA-EX150 (manufactured by Nikkiso Co., Ltd.) according to a dynamic light scattering method.

The water-insoluble resin particles may be used in the form of a dispersion (an aqueous dispersion which is referred to as a so-called latex) formed by particles being dispersed in an aqueous medium.

The water-insoluble resin in the water-insoluble resin particles has at least a constitutional unit derived from a first monomer that contains at least one group selected from a sulfo group and a salt of the sulfo group and a constitutional unit derived from a second monomer that has at least one structure selected from an aromatic ring structure and an alicyclic structure and may further have constitutional units derived from other monomers as necessary.

—Constitutional Unit Derived from First Monomer—

The constitutional unit derived from the first monomer is a constitutional unit which is present in a resin by copolymerizing the first monomer containing at least one group selected from a sulfo group and a salt of the sulfo group with at least the second monomer described below. The surface of the water-insoluble resin particles is hydrophilized by copolymerizing the first monomer so that the first monomer contains a sulfo group or a salt of the sulfo group.

The first monomer containing at least one group selected from a sulfo group and a salt of the sulfo group is not particularly limited as long as the monomer contains a sulfo group or a salt of the sulfo group or a sulfo group and a salt of the sulfo group. The constitutional unit derived from the first monomer may be appropriately selected from the group consisting of a constitutional unit derived from a monomer containing a sulfo group or a salt of the sulfo group and a constitutional unit derived from a monomer containing a sulfo group and a salt of the sulfo group. The water-insoluble resin particles may contain one or two or more first monomers.

Among these, a constitutional unit represented by Formula 1 is preferable as the constitutional unit derived from the first monomer.

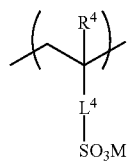

Formula 1

In Formula 1, $R^4$ represents a methyl group or a hydrogen atom.

Further, $L^4$ in Formula 1 represents a divalent linking group formed by linking one or two or more groups selected from the group consisting of a single bond, a linear, branched, or cyclic alkylene group having 1 to 10 carbon atoms, an arylene group having 6 to 10 carbon atoms, —O—, —NH—, —S—, —C(=O)—, and —CH(—OH)—.

L4 represents preferably a divalent linking group formed by linking one or two or more groups selected from the group consisting of a linear, branched, or cyclic alkylene group having 1 to 5 carbon atoms, —O—, —NH—, and —C(=O)— and more preferably a linear, branched, or cyclic alkylene group having 1 to 5 carbon atoms; a divalent linking group formed of a linear, branched, or cyclic alkylene group having 1 to 5 carbon atoms, —O—, and C—(=O)—; or a divalent linking group formed of a linear, branched, or cyclic alkylene group having 1 to 5 carbon atoms, —NH—, and —C(=O)—.

L4 represents still more preferably at least one linking group selected from the following group a. In the linking group represented by the group a, n represents an integer of 1 to 5, and the symbol "*" represents a bonding position.

[Group a]

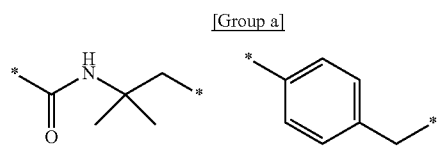

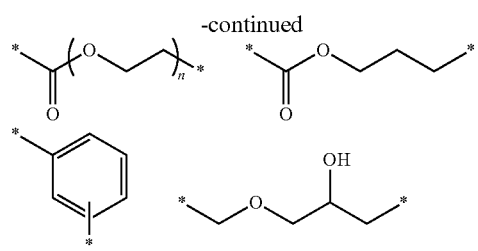

In Formula 1, M represents a hydrogen atom or a cation.

Examples of the cation as M include ions, for example, an alkali metal ion such as a sodium ion, a potassium ion, or a lithium ion; an alkaline earth metal ion such as a calcium ion or a magnesium ion; and an ammonium ion.

Examples of the constitutional unit represented by Formula 1 include constitutional units derived from monomers containing 2-acrylamide-2-methylpropanesulfonic acid, 2-acryl amidopropanesulfonic acid, vinyl sulfonic acid, styrenesulfonic acid, α-methyl styrenesulfonic acid, 2-sulfoethyl (meth)acrylate, 3-sulfopropyl (meth)acrylate, methacryloyloxyethyl sulfonic acid, vinylbenzyl sulfonic acid, 1-allyloxy-2-hydroxypropanesulfonic acid, allyloxypolyethylene glycol (the degree of polymerization an ethylene glycol moiety: 10) sulfonic acid, and salts of these.

Further, examples of counter ions of the salts include alkali metal ions such as a sodium ion, a potassium ion, and a lithium ion; alkaline earth metal ions such as a calcium ion and a magnesium ion; and ions such as an ammonium ion.

As a method of introducing at least one group selected from a sulfo group and a salt of the sulfo group into the water-insoluble resin, a monomer containing at least one group selected from a sulfo group and a salt of the sulfo group may be copolymerized. Alternatively, in a case where a salt of a sulfo group is introduced into the water-insoluble resin, a monomer containing a sulfo group may be copolymerized, and water-insoluble resin particles are synthesized and neutralized using a base to obtain a salt of a sulfo group.

Among the constitutional units derived from monomers containing at least one group selected from a sulfo group and a salt of the sulfo group, a constitutional unit derived from 2-acrylamide-2-methyl propanesulfonic acid, a salt of 2-acrylamide-2-methyl propanesulfonic acid, or 3-sulfopropyl (meth)acrylate is preferable. Preferred examples of counter ions of the salts include a sodium ion, a potassium ion, a lithium ion; and an ammonium ion.

Among these, 2-acrylamide-2-methylpropanesulfonic acid, and sodium 2-acrylamide-2-methylpropane sulfonate are more preferable.

Hereinafter, specific examples of the constitutional units derived from monomers containing at least one group selected from a sulfo group and a salt of the sulfo group will be described below, but the present disclosure is not limited to the following specific examples.

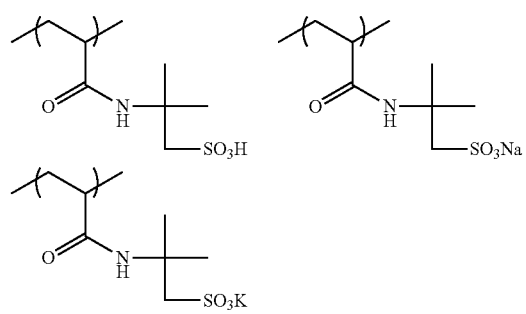

-continued

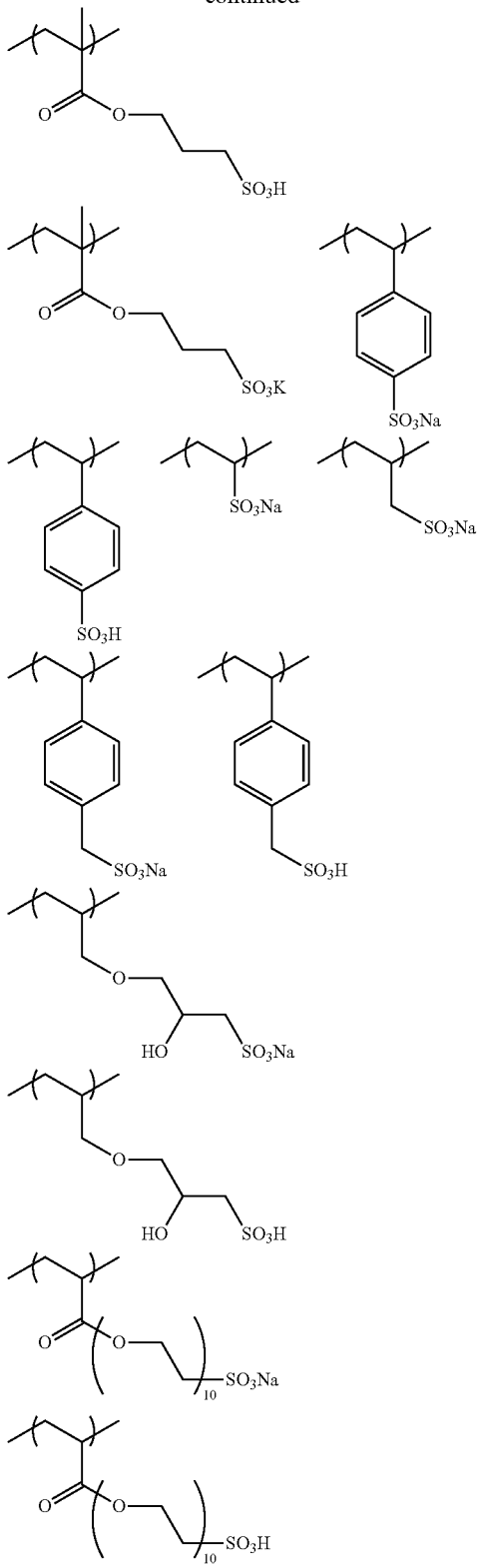

The content ratio of the constitutional unit derived from the first monomer containing at least one group selected from a sulfo group and a salt of the sulfo group in the water-insoluble resin to the total mass of the water-insoluble resin is in a range of 5% by mass to 25% by mass, more preferably in a range of 8% by mass to 25% by mass, and particularly preferably in a range of 10% by mass to 25% by mass.

In a case where the content ratio of the constitutional unit derived from the first monomer is 5% by mass or greater, the surface of the particles is suitably hydrophilized and the surface of the substrate is suitable for a hydrophilic treatment. Further, in a case where the content ratio of the constitutional unit derived from the first monomer is 25% by mass or less, the balance with the degree of hydrophobicity inside the particles is excellent, the particles are unlikely to be swollen, and stable dispersion stability is obtained.

—Constitutional Unit Derived from Second Monomer—

The constitutional unit derived from the second monomer is a constitutional unit which is present in a resin by copolymerizing the second monomer containing at least one structure selected from an aromatic ring structure and an alicyclic structure with at least the first monomer described below. By copolymerizing the second monomer so that the aromatic ring structure or the alicyclic structure is contained in a molecule, the hydrophobicity inside the water-insoluble resin particles can be further increased compared to a case where an aliphatic structure such as an alkyl chain or the like is contained in a molecule.

In addition, the constitutional unit derived from the second monomer is a hydrophobic constitutional unit and does not contain a sulfo group and a salt of the sulfo group. Therefore, the constitutional unit derived from the second monomer is distinguished from the constitutional unit derived from the first monomer containing at least one group selected from a sulfo group or a salt of the sulfo group in terms that the constitutional unit derived from the second monomer does not contain a sulfo group and a salt of the sulfo group.

The second monomer having at least one structure selected from an aromatic ring structure and an alicyclic structure is not particularly limited as long as the monomer has an aromatic ring structure or an alicyclic structure or an aromatic ring structure and an alicyclic structure. The constitutional unit derived from the second monomer may be appropriately selected from the group consisting of a constitutional unit derived from a monomer having an aromatic ring structure or an alicyclic structure or a constitutional unit derived from a monomer having an aromatic ring structure and an alicyclic structure. The water-insoluble resin particles may contain one or two or more second monomers.

Among these, a constitutional unit selected from the group consisting of constitutional units represented by any of Formulae A to E is preferable as the constitutional unit derived from the second monomer.

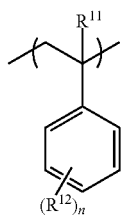

Formula A

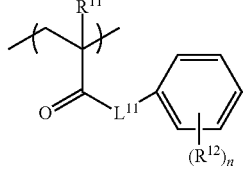

Formula B

-continued

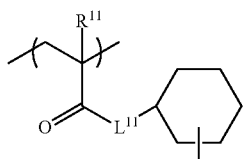

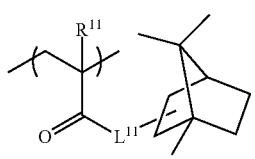

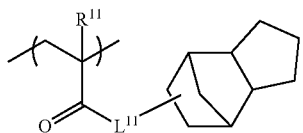

In Formulae A to E, $R^{11}$ represents a methyl group or a hydrogen atom.

Further, $R^{12}$ in Formulae A to C represents a hydrogen atom or a linear or branched alkyl group having 1 to 10 carbon atoms. Examples of the linear or branched alkyl group having 1 to 10 carbon atoms include a methyl group, an ethyl group, an n-propyl group, an i-propyl group, and a t-butyl group. $R^{12}$ represents preferably a hydrogen atom or a linear or branched alkyl group having 4 to 10 carbon atoms and more preferably a hydrogen atom or a methyl group. Further, $R^{12}$ may represent an unsubstituted group or a group substituted with a substituent. In a case where $R^{12}$ represents a group substituted with a substituent, examples of the substituent include a halogen (such as a chlorine atom or a bromine atom) and an alkyl group (such as a methyl group or an ethyl group).

In Formulae A to C, n represents an integer of 0 to 5. In a case where n represents 2 or greater, a plurality of $R^{12}$'s may be the same as or different from each other and may represent groups different from one another.

In Formulae B to E, $L^{11}$ represents a divalent linking group formed by linking one or two or more groups selected from the group consisting of a single bond, a linear, branched, or cyclic alkylene group having 1 to 18 carbon atoms, an arylene group having 6 to 18 carbon atoms, —O—, —NH—, —S—, and —C(=O)—.

Examples of the linear, branched, or cyclic alkylene group having 1 to 18 carbon atoms include a methylene group, an ethylene group, an i-propylene group, a t-butylene group, and an n-propylene group.

Examples of the arylene group having 6 to 18 carbon atoms include a phenylene group, a naphthylene group, and a tolyl group.

Among these, it is preferable that $L^{11}$ represents a divalent linking group shown below. In the following divalent linking groups, $R^{21}$'s each independently represent a methyl group or a hydrogen atom. n represents an integer of 1 to 8.

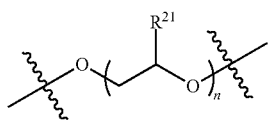

Formula C

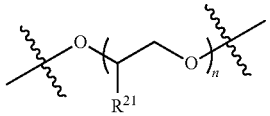

Formula D

Hereinafter, specific examples of the constitutional unit derived from the second monomer having at least one structure selected from an aromatic ring structure and an alicyclic structure will be described below. However, the present disclosure is not limited to the following specific examples.

Formula E

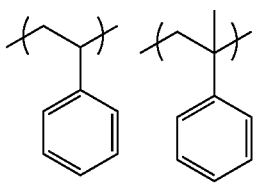

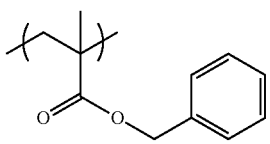

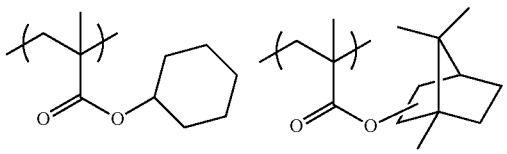

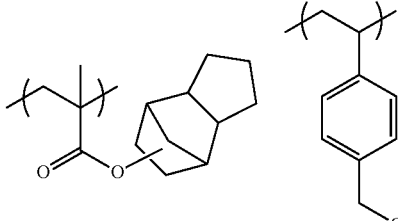

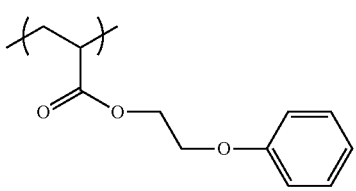

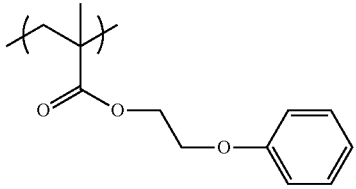

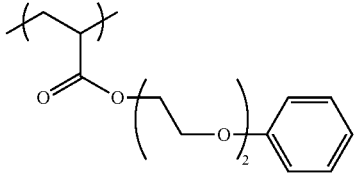

-continued

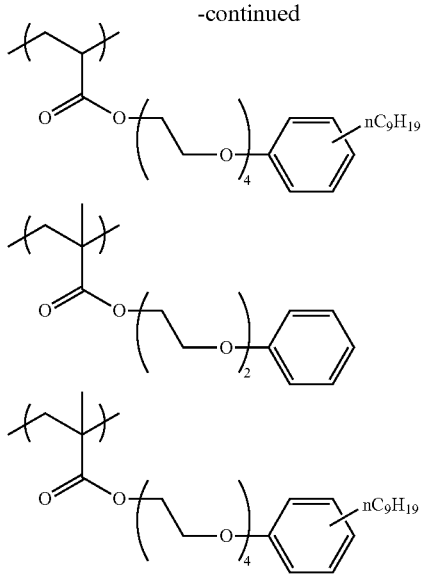

Among these, as the second monomer, a constitutional unit represented by Formula A is preferable, and styrene is particularly preferable. In a case where the water-insoluble resin has the constitutional unit represented by Formula A, the proportion of oxygen atoms in a molecule of the water-insoluble resin is decreased, and thus the effect of suppressing a decrease in density of a solid image is excellent. Further, since particularly styrene is a compound that is more hydrophobic than a monomer containing elements other than a carbon atom and a hydrogen atom, the swelling of particles is prevented and the dispersion stability of particles is further improved.

The content ratio of the total constitutional units (preferably constitutional units represented by any of Formulae A to E) derived from the second monomer having at least one structure selected from an aromatic ring structure and an alicyclic structure in the water-insoluble resin to the total mass of the water-insoluble resin can be set to be in a range of 5% by mass to 80% by mass and is preferably in a range of 10% by mass to 40% by mass and more preferably in a range of 20% by mass to 40% by mass.

Particularly in a case where the content ratio of the total constitutional units represented by any of Formulae A to E is 10% by mass or greater, the inside of the water-insoluble resin particles is suitably hydrophobized, the swelling of particles in a case where the particles are allowed to be present in an aqueous treatment liquid is easily prevented, and the dispersion stability of the particles in the treatment liquid is further improved. As the result, occurrence of streak unevenness in an image is effectively suppressed. Further, it is advantageous that the content ratio of the constitutional units represented by any of Formulae A to E is 40% by mass or less from the viewpoints of the density of a solid image and the streak unevenness.

In regard to the second monomer, it is preferable that the mass ratio of oxygen atoms in the second monomer to the molecular weight of the second monomer is 0.1 or less. It is preferable that the mass ratio of oxygen atoms in the second monomer to the molecular weight of the second monomer is 0.1 or less from the viewpoint that the second monomer is unlikely to be unevenly distributed in the surface and is locally present inside the substrate. Further, the mass ratio of oxygen atoms in the second monomer to the molecular weight of the second monomer can be selected from the range of 0 or greater. It is preferable that the mass ratio of oxygen atoms in the second monomer to the molecular weight of the second monomer is as small as possible, and 0 is particularly preferable.

The ratio (constitutional unit derived from first monomer/constitutional unit derived from second monomer) of the content (the total content in a case where two or more constitutional units derived from the first monomer are included in the water-soluble resin particles) of the constitutional unit derived from the first monomer containing at least one group selected from a sulfo group and a salt of the sulfo group to the content (the total content in a case where two or more constitutional units derived from the second monomer are included in the water-soluble resin particles) of the constitutional unit (preferably a constitutional unit represented by any of Formulae A to E) derived from the second monomer having at least one structure selected from an aromatic ring structure and an alicyclic structure is preferably in a range of 0.10 to 4.0, more preferably in a range of 0.10 to 2.0, still more preferably in a range of 0.15 to 0.90, and most preferably in a range of 0.30 to 0.85 in terms of the mass.

In a case where the ratio of the content of the constitutional unit derived from the first monomer to the content of the constitutional unit derived from the second monomer is in the above-described range, the balance between the hydrophilicity resulting from a hydrophilic group selected from a sulfo group and a salt of the sulfo group and the hydrophobicity of a hydrophobic group selected from an aromatic ring structure and an alicyclic structure is excellent, and both of the image quality and the stability of the particles in the treatment liquid can be achieved.

—Constitutional Units Derived from Other Monomers—

The water-insoluble resin in the water-insoluble resin particles may have constitutional units derived from monomers other than the constitutional unit derived from the first monomer and the constitutional unit derived from the second monomer. Examples of the constitutional units derived from other monomers include a constitutional unit derived from a monomer containing at least one group selected from a carboxy group and a salt of the carboxy group and constitutional units derived from other monomers shown below.

Further, the constitutional units derived from other monomers are distinguished from the constitutional unit derived from the first monomer described above from the viewpoint that the constitutional units derived from other monomers do not contain a sulfo group and a salt of the sulfo group.

Further, the constitutional units derived from other monomers are distinguished from the constitutional unit derived from the first monomer and the constitutional unit derived from the second monomer described above from the viewpoint that the constitutional units derived from other monomers do not have a hydrophobic constitutional unit (such as a carboxy group or a salt thereof) or do not have an aromatic ring structure and an alicyclic structure.

In a case where the water-insoluble resin has a constitutional unit derived from a monomer containing at least one group selected from a carboxy group and a salt of the carboxy group, a decrease in density of a solid image can be more effectively suppressed, and a desired density is likely to be obtained. The reason for this is assumed that the interaction of the substrate (for example, coated paper) with respect to the surface thereof becomes strong and thus the water-insoluble resin particles are likely to be unevenly distributed in the surface of the substrate.

The content ratio of the constitutional unit derived from the monomer containing at least one group selected from a carboxy group and a salt of the carboxy group to the total mass of the water-insoluble resin is preferably in a range of 0.01% by mass to 40% by mass and more preferably in a range of 0.01% by mass to 10% by mass.

Hereinafter, specific examples of the constitutional unit derived from a monomer containing at least one group selected from a carboxy group and a salt of the carboxy group will be described. However, the present disclosure is not limited to the following specific examples.

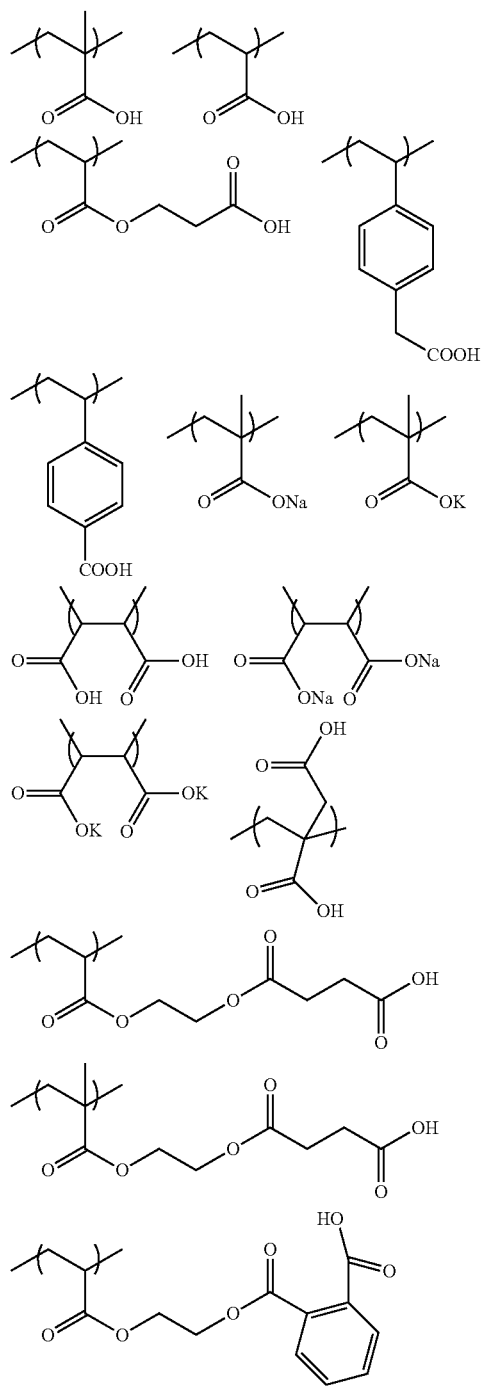

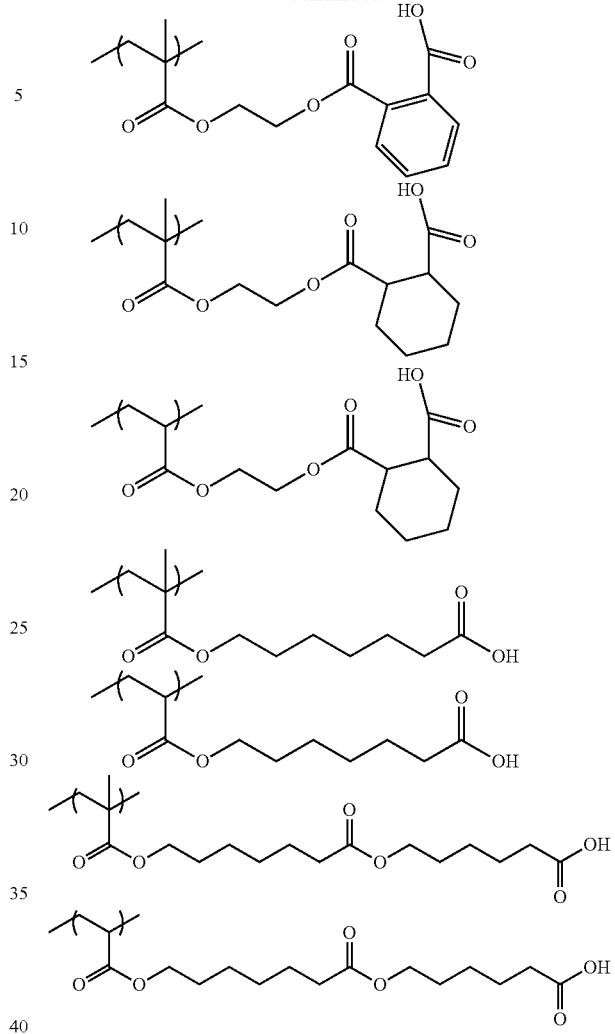

Examples of the constitutional units derived from other monomers include constitutional units derived from acrylic acid esters (for example, methacrylic acid esters such as methyl methacrylate, ethyl methacrylate, and 2-hydroxyethyl methacrylate; methyl acrylate, and 2-hydroxyethyl acrylate); amide monomers (for example, acrylamide, N-(2-hydroxyethyl)acrylamide, N,N-dimethylacrylamide, N,N-diethylacrylamide, isopropylacrylamide, N-(2-hydroxymethyl)acrylamide, and methacrylamide); vinyl cyanide monomers (for example, acrylonitrile and methacrylonitrile); ethylenically unsaturated carboxylic acid hydroxyalkyl ester monomers (for example, β-hydroxyethyl acrylate and β-hydroxyethyl methacrylate); tertiary salts such as hydrochloride and sulfate of dialkylaminoalkyl (meth)acrylate (for example, dimethylaminoethyl (meth)acrylate, diethylaminoethyl (meth)acrylate, diethylaminoethyl (meth)acrylate, diethylamino-2-hydroxypropyl (meth)acrylate, and dimethylaminopropyl (meth)acrylate); tertiary salts of hydrochloride and sulfate of dialkylaminoalkyl (meth)acrylamide (for example, dimethylaminoethyl (meth)acrylamide); cationic monomers (for example, quaternary salts such as a halogenated alkyl adduct (for example, a methyl chloride adduct) of dialkylaminoalkyl (meth)acrylate and a halogenated aryl adduct (for example, a benzyl chloride adduct); and quaternary salts such as a halogenated alkyl adduct (for example, a methyl chloride adduct) of dialkylaminoalkyl (meth)acrylamide and a halogenated aryl adduct (for example, a benzyl chloride adduct)); and bifunctional (meth) acrylate (for example, ethylene glycol dimethacrylate, ethylene glycol methacrylate, diethylene glycol dimethacrylate, or diethylene glycol methacrylate). Here, examples of the constitutional unit derived from other monomers are not limited to the above-described constitutional units.

The constitutional units derived from other monomers may be used alone or in combination of two or more kinds thereof.

The content of the constitutional units derived from other monomers can be set to be in a range of 20% by mass to 80% by mass and is more preferably in a range of 30% by mass to 75% by mass and still more preferably in a range of 30% by mass to 60% by mass with respect to the total mass of the water-insoluble resin particles.

From the viewpoint of maintaining the hydrophilicity of the water-insoluble resin particles, as the constitutional units derived from other monomers, a constitutional unit other than the constitutional unit derived from a hydrophobic a monomer is preferable. Among these constitutional units derived from other monomers, a constitutional unit derived from a monomer selected from methyl methacrylate, ethyl methacrylate, and ethyl acrylate is preferable, a constitutional unit derived from at least one of methyl methacrylate or ethyl methacrylate is more preferable, and a constitutional units derived from methyl methacrylate is still more preferable.

Specific examples of the water-insoluble resin particles will be described below, but the present disclosure is not limited to the following specific examples. Further, the subscript for each constitutional unit shows the compositional ratio in terms of the mass (% by mass).

A-1
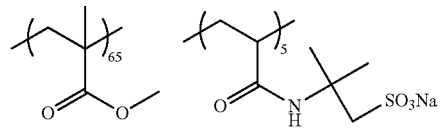

A-2

A-3
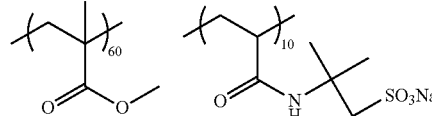

A-4
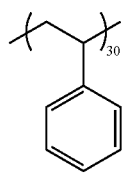
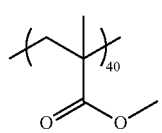

A-5
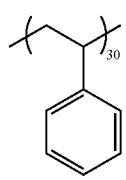
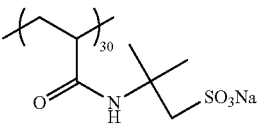

A-6
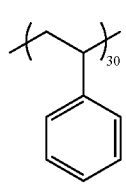
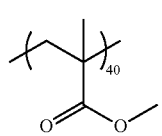

A-7
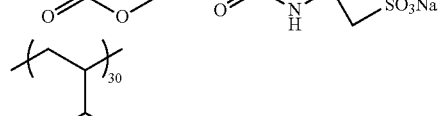

A-8

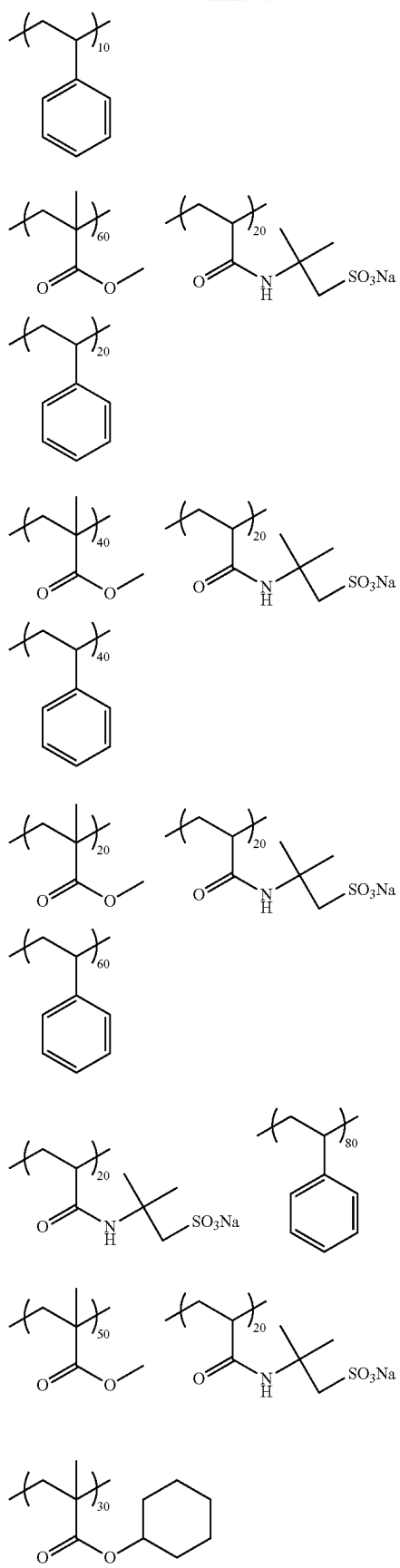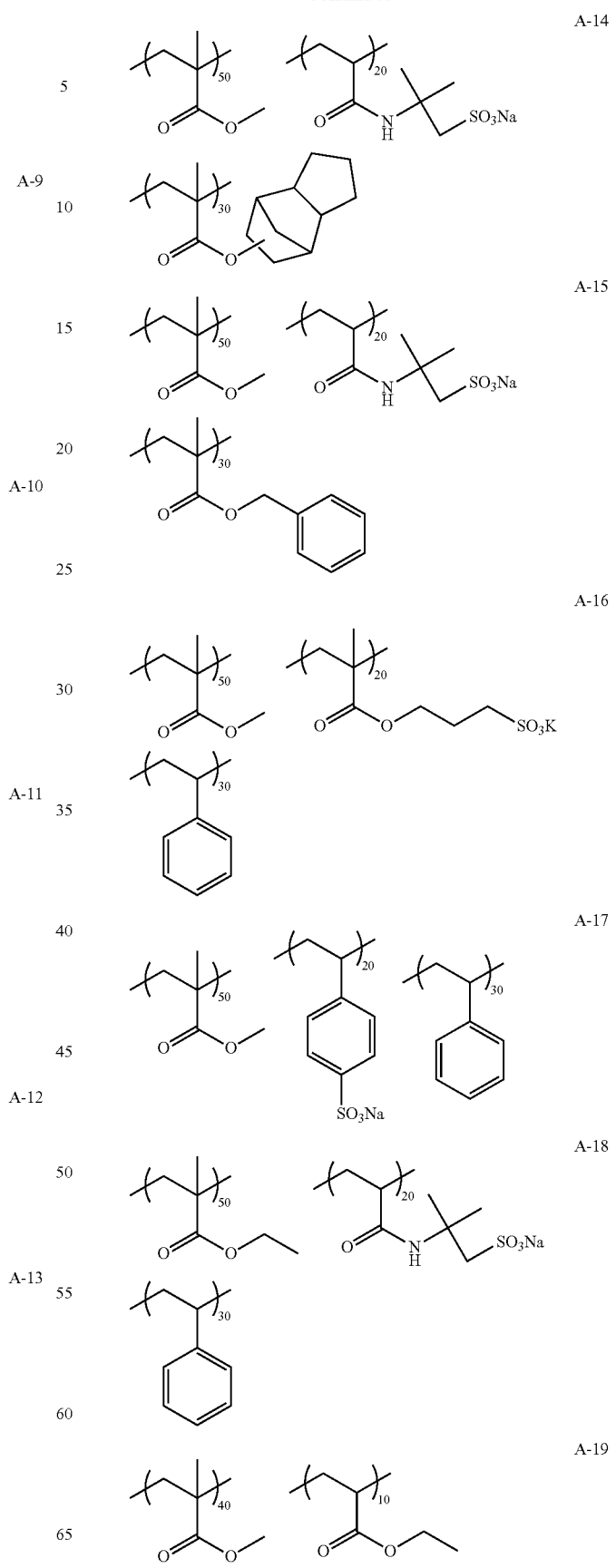

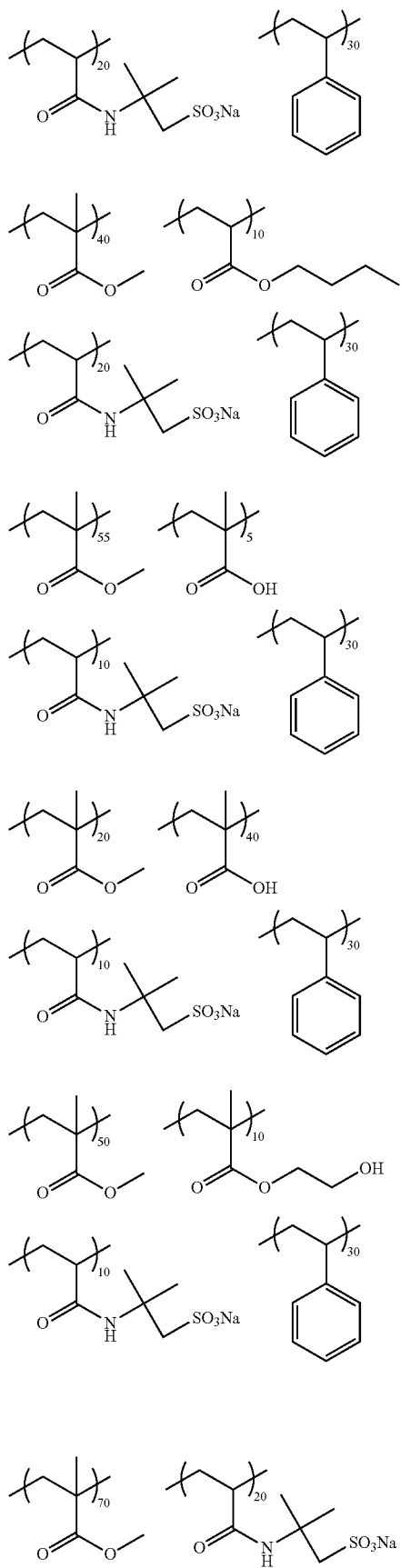
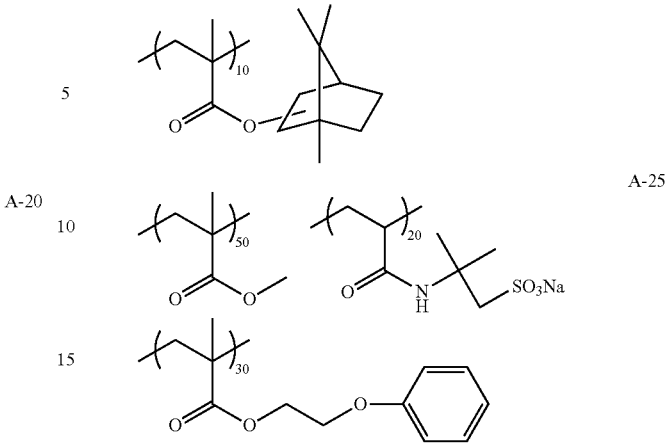

Further, in a case where the constitutional units derived from other monomers are introduced into the water-insoluble resin, the constitutional units derived from other monomers can be introduced into the water-insoluble resin by copolymerizing other monomers.

As other monomers, in a case where a constitutional unit derived from a monomer containing at least one group selected from a carboxy group and a salt of the carboxy group is introduced into the water-insoluble resin, a method of copolymerizing other monomers, synthesizing the copolymer, hydrolyzing the resultant, and adding a strong acid thereto to reproduce a carboxy group may be applied.

The glass transition temperature (Tg) of the water-insoluble resin is preferably 100° C. or higher. In a case where the Tg is 100° C. or higher, the dispersion stability of the water-insoluble resin particles becomes excellent. From the viewpoint of satisfactorily maintaining heat stability of the particles dispersed in the treatment liquid, the Tg of the water-insoluble resin particles is more preferably in a range of 100° C. to 200° C., still more preferably in a range of 120° C. to 200° C., and particularly preferably in a range of 130° C. to 200° C.

The Tg of the water-insoluble resin particles is a value to be measured using a differential scanning calorimeter (DSC) EXSTAR6220 (manufactured by SII Nanotechnology, Inc.).

The content ratio of the water-insoluble resin particles to the compound (aggregation component) that causes the colorant contained in the ink composition to aggregate is preferably in a range of 0.01 to 2.0, more preferably in a range of 0.01 to 1.0, and most preferably in a range of 0.19 to 0.5 in terms of the mass. It is advantageous that the content ratio of the water-insoluble resin particles is 0.19 or greater in terms of the mass from the viewpoint of the density of a solid image area. Further, it is advantageous that the content ratio of the water-insoluble resin particles is 0.5 or less in terms of the mass from the viewpoint of the streak unevenness and the graininess of an image.

The content ratio of the water-insoluble resin particles to the total mass of the treatment liquid is preferably in a range of 0.5% by mass to 20% by mass, more preferably in a range of 1% by mass to 10% by mass, and still more preferably in a range of 3% by mass to 5% by mass. In a case where the content of the water-insoluble resin particles is 0.5% by mass or greater, the effect of improving wettability of the substrate is high. Further, in a case where the content thereof is 20% by mass or less, the viscosity of the treatment liquid is maintained to be in an appropriate range and the stability of the treatment liquid is improved.

From the viewpoint of the viscosity of the treatment liquid, the weight-average molecular weight of the water-insoluble resin particle diameter is preferably in a range of 1000 to 1000000, more preferably in a range of 5000 to 500000, still more preferably in a range of 10000 to 300000, and particularly preferably 20000 to 70000 from the viewpoint of the viscosity of the treatment liquid.

The weight-average molecular weight can be measured by gel permeation chromatography (GPC).

According to GPC, HLC-8220GPC (manufactured by TOSOH CORPORATION) is used as a measuring device, three columns of TSKgel, Super Multipore HZ-H (registered trademark) (manufactured by TOSOH CORPORATION, 4.6 mmID×15 cm) are used as columns, and tetrahydrofuran (THF) is used as an eluent. The weight-average molecular weight is measured under conditions of a sample concentration of 0.45% by mass, a flow rate of 0.35 mL/min, a sample injection amount of 10 µl, and a measurement temperature of 40° C. using a refractive index (RI) detector. Further, the calibration curve is created from 8 samples of "standard samples TSK standard, polystyrene" (manufactured by TOSOH CORPORATION), which are "F-40", "F-20", "F-4", "F-1", "A-5000", "A-2500", "A-1000", and "n-propylbenzene".

—Aggregation Component—

The treatment liquid contains at least one compound (aggregation component) that causes the colorant in the ink composition to aggregate. At least the colorant in the ink composition is aggregated by bringing the treatment liquid into contact with the ink composition at the time of recording an image, and thus a high-resolution image can be obtained.

The expression "causes the colorant to aggregate" indicates that the particle diameter of secondary particles formed by the colorant is increased by destabilizing the dispersion state of the colorant which has been dispersed in the ink composition. Further, the change in particle diameter can be confirmed by measuring the volume average particle diameter using a nanotrac particle size distribution measurement apparatus UPA-EX150 (manufactured by Nikkiso Co., Ltd.) according to a dynamic light scattering method.

The aggregation component contributes to aggregation of resin particles in a dispersed state in addition to the colorant (preferably a pigment).

Examples of the compound that causes the colorant to aggregate include acidic compounds such as organic acidic compounds and inorganic acidic compounds, polyvalent metal salts, and cationic compounds. Among these, from the viewpoint of the aggregation rate, acidic compounds are preferable and organic acidic compounds are more preferable.

(Acidic Compound)

Examples of the acidic compounds include acidic substances capable of decreasing the pH of an ink composition. Further, both of an organic acidic compound and an inorganic acidic compound may be used and two or more of organic acidic compounds and inorganic acidic compounds may be used in combination.

—Organic Acidic Compound—

In a case where the treatment liquid contains an organic acidic compound, the organic acidic compound can cause the components in the ink composition to aggregate.

The organic acidic compound contained in the treatment liquid is not particularly limited. Examples of the organic acidic compound include a compound containing a phosphoric acid group, a compound containing a phosphonic acid group, a compound containing a phosphinic acid group, a compound containing a sulfuric acid group, a compound containing a sulfo group, a compound containing a sulfinic acid group, and a compound containing a carboxy group. From the viewpoint of aggregation rate of the ink composition, as the organic acidic compound, a compound containing a phosphoric acid group or a carboxy group is preferable and a compound containing a carboxy group is more preferable.

Preferred examples of the compound containing a carboxy group include polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts of these (for example, polyvalent metal salts). These compounds may be used alone or in combination of two or more kinds thereof.

From the viewpoint of the aggregation rate of the ink composition, as the compound containing a carboxy group, a di- or higher valent carboxylic acid (hereinafter, also referred to as polyvalent carboxylic acid) is preferable, at least one polyvalent carboxylic acid selected from malonic acid, malic acid, maleic acid, succinic acid, glutaric acid, fumaric acid, tartaric acid, 4-methylphthalic acid, and citric acid is more preferable, and malonic acid, malic acid, tartaric acid, and citric acid are particularly preferable.

It is preferable that the organic acidic compound contained in the treatment liquid has a low pKa. The surface charge of particles of a pigment or polymer particles in the ink composition in which the particles are stably dispersed due to a weakly acidic functional group such as a carboxy group is decreased by bringing the particles into contact with an organic acidic compound having a lower pKa than the pKa of the particles and the dispersion stability can be degraded.

It is preferable that the organic acidic compound contained in the treatment liquid has a low pKa, high solubility in water, and a valence of divalent or higher. Further, it is more preferable that the organic acidic compound is a divalent or trivalent acidic compound with high buffer capacity in a pH region having a lower pKa than the pKa of a functional group (for example, a carboxy group) that allows the particles to be stably dispersed in the ink composition.

—Inorganic Acidic Compound—

In a case where the treatment liquid contains an inorganic acidic compound, the inorganic acidic compound can cause the components in the ink composition to aggregate.

Examples of the inorganic acidic compound contained in the treatment liquid include phosphoric acid, a phosphoric acid compound, nitric acid, nitrous acid, sulfuric acid, and hydrochloric acid, and the examples are not limited to these. From the viewpoints of suppressing graininess of an image and improving the aggregation rate of an ink, phosphoric acid or a phosphoric acid compound are preferable as the inorganic acidic compound.

The solubility (25° C.) of phosphoric acid in water when turned into calcium salt (calcium phosphate) is 0.0018 g per 100 g of water, which is small. Therefore, when the inorganic acidic compound contained in the treatment liquid is phosphoric acid, calcium salt is not dissolved in the treatment liquid and solidified and the effects of suppressing occurrence of graininess on the surface of an image area are excellent. Particularly, phosphoric acid is advantageous as the inorganic acidic compound contained in the treatment liquid when a recording medium that includes a coating layer containing calcium carbonate is used as a recording medium.

As the phosphoric acid compound, phosphorous acid, hypophosphorous acid, pyrophosphoric acid, metaphosphoric acid, polyphosphoric acid, and salts of these can be used.

(Polyvalent Metal Salt)

Examples of the polyvalent metal salt include salts of alkaline earth metals (such as magnesium and calcium) of Group 2 of the periodic table, salts of transition metals (such as lanthanum) of Group 3 of the periodic table, salts of cations (such as aluminum) of Group 13 of the periodic table, and salts of lanthanides (such as neodymium).

Suitable examples of the metal salts include carboxylate (such as formate, acetate, or benzoate), nitrate, chloride, and thiocyanate. Among these, calcium salt or magnesium salt of carboxylic acid (such as formic acid, acetic acid, or benzoic acid), calcium salt or magnesium salt of nitric acid, calcium chloride, magnesium chloride, and calcium salt or magnesium salt of thiocyanic acid are preferable.

(Cationic Compound)

Suitable examples of the cationic compound include cationic resins and cationic surfactants.

Examples of the cationic resins include an epichlorohydrin-dimethylamine addition polymer, a polycondensate of dicyandiamide and formalin or diethylenetriamine, a copolymer of a dimethyl diallyl ammonium chloride and sulfur dioxide ($SO_2$), a copolymer of a diallylamine salt and sulfur dioxide ($SO_2$), a dimethyl diallyl ammonium chloride polymer, a polymer of allylamine salt, a dialkylaminoethyl (meth)acrylate quaternary polymer, polyallylamine, cationic epoxy, polyethyleneimine, polyacrylamide, poly(meth) acrylic acid ester, vinyl formamide, a cationic resin emulsion, and cationic resin polyvalent metal salt.

As cationic surfactants, for example, primary, secondary, or tertiary amine salt type compounds are preferable. Examples of the amine salt type compounds include compounds of hydrochloride or acetate (such as laurylamine, coconut amine, stearylamine, and rosinamine), quaternary ammonium salt type compounds (such as lauryl trimethyl ammonium chloride, cetyl trimethyl ammonium chloride, lauryl dimethyl benzyl ammonium chloride, benzyl tributyl ammonium chloride, and benzalkonium chloride), pyridinium salt type compounds (such as cetyl pyridinium chloride and cetyl pyridinium bromide), imidazoline cationic compounds (such as 2-heptadecenyl-hydroxyethylimidazoline), and ethylene oxide adducts of higher alkylamine (such as dihydroxy ethyl stearylamine).

In addition, polyallylamines may be used. In addition to these, amphoteric surfactants exhibiting cationic properties in a desired pH region can be used, and examples thereof include an amino acid type amphoteric surfactant, a R—NH—$CH_2CH_2$—COOH type compound (R represents an alkyl group), a carboxylate type amphoteric surfactant (such as steary dimethyl betaine or lauryl dihydroxy ethyl betaine), a sulfuric acid ester type amphoteric surfactant, a sulfonic acid type amphoteric surfactant, and a phosphoric acid ester type amphoteric surfactant.

The content (total content) of the aggregation component in the total mass of the treatment liquid is not particularly limited, but is preferably in a range of 5% by mass to 40% by mass and more preferably in a range of 10% by mass to 30% by mass with respect to the total amount of the treatment liquid. In a case where the content thereof is 5% by mass or greater, the graininess of an image can be suppressed. Further, in a case where the content thereof is 40% by mass or less, rub resistance of an image is improved.

In the content ratio between an organic acidic compound and an inorganic acidic compound in a case where an organic acidic compound and an inorganic acidic compound are used in combination as the aggregation component, from the viewpoint of the aggregation rate and suppression of the graininess, the content of the inorganic acidic compound to the content of the organic acidic compound is preferably in a range of 5 mol % to 50 mol %, more preferably in a range of 10 mol % to 40 mol %, and still more preferably in a range of 15 mol % to 35 mol %.

In the treatment liquid, the mass ratio (water-insoluble resin particles/aggregation component) of the water-insoluble resin particles to the compound (aggregation component) that causes the colorant of the ink composition in the ink composition to aggregate is preferably in a range of 0.01% by mass to 2.0% by mass, more preferably in a range of 0.01% by mass to 1.0% by mass, still more preferably in a range of 0.04% by mass to 0.5% by mass, and particularly preferably in a range of 0.1% by mass to 0.4% by mass, from the viewpoints of suppressing a decrease in density of a solid image area and occurrence of streak unevenness (and the graininess in some cases).

—Water—

The treatment liquid contains water and is prepared as an aqueous composition. The content of water is not particularly limited, but is preferably in a range of 10% by mass to 99% by mass, more preferably in a range of 50% by mass to 90% by mass, and still more preferably in a range of 60% by mass to 80% by mass with respect to the total mass of the treatment liquid.

—Other Components—

The treatment liquid may contain components other than the above-described components. Examples of other components include an organic solvent, a nitrogen-containing heterocyclic compound, an anti-foaming agent, and other additives.

[Organic Solvent]

It is preferable that the treatment liquid contains at least one organic solvent.

As the organic solvent, an organic solvent (hereinafter, also referred to as a "water-soluble organic solvent") to be dissolved in 100 g of water at 20° C. by an amount of 5 g or greater is preferable.

As the water-soluble organic solvent, a solvent which is the same as the water-soluble organic solvent contained in the ink composition described below can be used. Among the examples of the organic solvent, from the viewpoint of curl suppression, polyalkylene glycol or a derivative thereof is preferable and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

The content of the organic solvent in the treatment liquid is not particularly limited, but is preferably in a range of 1% by mass to 30% by mass and more preferably in a range of 5% by mass to 15% by mass with respect to the total amount of the treatment liquid from the viewpoint of curl suppression.

[Nitrogen-Containing Heterocyclic Compound]

The treatment liquid may contain a nitrogen-containing heterocyclic compound. In this manner, the rub resistance of an image and the transportability of the substrate are improved.

As the heterocyclic structure of the nitrogen-containing heterocyclic compound, a nitrogen-containing 5-membered ring structure or a nitrogen-containing 6-membered ring structure is preferable. Among these, a nitrogen-containing 5-membered ring structure is preferable.

In the nitrogen-containing 5-membered ring structure or the nitrogen-containing 6-membered ring structure, a 5- or 6-membered heterocyclic structure containing at least one atom preferably selected from a carbon atom, a nitrogen atom, an oxygen atom, a sulfur atom, and a selenium atom is preferable. Further, this heterocycle may be condensed with a carbon aromatic ring or a heteroaromatic ring.

Examples of the heterocycle include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, and a pentaazaindene ring.

The heterocycle may contain a substituent, and the substituent may be substituted with a nitro group, a halogen atom (such as a chlorine atom or a bromine atom), a mercapto group, a cyano group, a substituted or unsubstituted alkyl group (such as each group of methyl, ethyl, propyl, t-butyl, or cyanoethyl), a substituted or unsubstituted aryl group (such as each group of phenyl, 4-methanesulfonamide phenyl, 4-methylphenyl, 3,4-dichlorophenyl, or naphthyl), a substituted or unsubstituted alkenyl group (such as an allyl group), a substituted or unsubstituted aralkyl group (such as each group of benzyl, 4-methylbenzyl, or phenethyl), a substituted or unsubstituted sulfonyl group (such as each group of methanesulfonyl, ethanesulfonyl, or p-toluenesulfonyl), a substituted or unsubstituted carbamoyl group (such as each group or unsubstituted carbamoyl, methyl carbamoyl, or phenyl carbamoyl), a substituted or unsubstituted sulfamoyl group (such as each group of unsubstituted sulfamoyl, methyl sulfamoyl, or phenyl sulfamoyl), a substituted or unsubstituted carbonamide group (such as each group of acetamide or benzamide), a substituted or unsubstituted sulfonamide group (such as each group or methanesulfonamide, benzenesulfonamide, or p-toluenesulfonamide), a substituted or unsubstituted acyloxy group (such as each group of acetyloxy or benzoyloxy), a substituted or unsubstituted sulfonyloxy group (such as methanesulfonyloxy), a substituted or unsubstituted ureido group (such as each group of unsubstituted ureido, methylureido, ethylureido, or phenylureido), a substituted or unsubstituted acyl group (such as each group of acetyl or benzoyl), a substituted or unsubstituted oxycarbonyl group (such as each group of methoxycarbonyl or phenoxycarbonyl), a substituted or unsubstituted oxycarbonylamino group (such as each group of methoxycarbonylamino, phenoxycarbonylamino, or 2-ethylhexyloxycarbonylamino), and a substituted or unsubstituted hydroxyl group. The substituent may be substituted with one ring several times.

Preferred specific examples of the nitrogen-containing heterocyclic compound include the following compounds.

The examples include imidazole, benzoimidazole, benzoindazole, benzotriazole, tetrazole, benzoxazole, benzothiazole, pyridine, quinoline, pyrimidine, piperidine, piperazine, quinoxaline, and morpholine. The nitrogen-containing heterocyclic compound may include the substituents such as an alkyl group, a carboxy group, and a sulfo group described above.

Preferred examples of the nitrogen-containing 6-membered ring compound include compounds including a triazine ring, a pyrimidine ring, a pyridine ring, a pyrroline ring, a piperidine ring, a pyridazine ring, or a pyrazine ring. Among these, compounds including a triazine ring or a pyrimidine ring are preferable. These nitrogen-containing 6-membered ring compound may include substituents, and examples of the substituents in this case include an alkyl group having 1 to 6 carbon atoms (preferably an alkyl group having 1 to 3 carbon atoms), an alkoxy group having 1 to 6 carbon atoms (preferably an alkoxy group having 1 to 3 carbon atoms), a hydroxyl group, a carboxy group, a mercapto group, an alkoxyalkyl group having 1 to 6 carbon atoms (preferably an alkoxyalkyl group having 1 to 3 carbon atoms), and a hydroxyalkyl group having 1 to 6 carbon atoms (preferably a hydroxyalkyl group having 1 to 3 carbon atoms).

Preferred specific examples of the nitrogen-containing 6-membered ring compound include triazine, methyl triazine, dimethyl triazine, hydroxyethyl triazine ring, pyrimidine, 4-methylpyrimidine, pyridine, and pyrroline.

[Anti-Foaming Agent]

The treatment liquid may contain an anti-foaming agent.

Examples of the anti-foaming agent include a silicone-based compound (silicone-based anti-foaming agent), and a pluronic compound (pluronic anti-foaming agent). Among these, a silicone-based anti-foaming agent is preferable.

As the silicone-based anti-foaming agent, a silicone-based anti-foaming agent having a polysiloxane structure is preferable.

As the anti-foaming agent, commercially available anti-foaming agents can be used. Examples thereof include BYK-012, BYK-017, BYK-021, BYK-022, BYK-024, BYK-025, BYK-038, and BYK-094 (all manufactured by BYK Chemie GmbH), KS-537, KS-604, and KM-72F (all manufactured by Shin-Etsu Chemical Co., Ltd.), TSA-739 (manufactured by Momentive Performance Materials Inc.), and OLFINE AF104 (manufactured by Nissin Chemical Industry Co., Ltd.). Among these, BYK-017, BYK-021, BYK-022, BYK-024, BYK-025, BYK-094, KS-537, KS-604, KM-72F, and TSA-739 which are silicone-based anti-foaming agents are preferable. Among these, BYK-024 is particularly preferable from the viewpoint of jetting stability of an ink.

In a case where the treatment liquid contains an anti-foaming agent, the content of the anti-foaming agent is preferably in a range of 0.0001% by mass to 1% by mass and more preferably in a range of 0.001% by mass to 0.1% by mass with respect to the total mass of the treatment liquid.

In a case where a silicone-based anti-foaming agent is used as an anti-foaming agent, it is preferable that the amount of the silicone-based anti-foaming agent is set such that the amount of silicone oil is in a range of 50 ppm to 200 ppm.

[Other Additives]

The treatment liquid may contain other additives as necessary. Other additives are the same as other additives in the ink composition described below.

~Surface Tension~

The surface tension of the treatment liquid is not particularly limited and can be set to 20 mN/m or greater. From the viewpoint of coating properties with respect to the substrate, the surface tension thereof is preferably in a range of 20 mN/m to 60 mN/m and more preferably in a range of 25 mN/m to 45 mN/m.

The surface tension of the treatment liquid is a value measured under a temperature condition of 25° C. using Automatic Surface Tensionmeter CBVP-Z (manufactured by Kyowa Interface Science Co., Ltd.) according to a plate method.

The surface tension of the treatment liquid can be adjusted by adding a surfactant to the treatment liquid.

~pH~

From the viewpoint of the aggregation rate of the ink composition, the pH (25° C.±1° C.) of the treatment liquid is preferably 7.0 or greater, more preferably in a range of 0.5 to 3.5, and still more preferably in a range of 0.5 to 2.0.

The pH thereof can be measured in a state in which the temperature of the treatment liquid is adjusted to 25° C. using a pH meter WM-50EG (manufactured by DKK-TOA CORPORATION) in an environment of 25° C.

~Viscosity~

From the viewpoint of the aggregation rate of the ink composition, the viscosity of the treatment liquid is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s.

The viscosity is a value measured under a temperature condition of 25° C. using VISCOMETER TV-22 (manufactured by TOKI SANGYO CO., LTD.).

(Ink Composition)

The ink composition in the ink set contains at least a colorant and water.

The ink composition may contain resin particles, a pigment dispersing agent (polymer dispersing agent), an organic solvent, a neutralizing agent, and other components as necessary.

—Colorant—

The ink composition contains at least one colorant. The colorant is not particularly limited and may be a pigment or a dye. In addition, from the viewpoint that aggregating properties become excellent when the colorant is brought into contact with the above-described aggregation component, an anionic colorant is preferable and a pigment is more preferable.

Here, the "anionic colorant" indicates a colorant containing an anionic group such as a carboxy group, a sulfo group, or a phosphoric acid group in the structure (in the structure of a dispersing agent in a case where the colorant is coated with a dispersing agent described below).

(Pigment)

The pigment is not particularly limited and can be selected as appropriate depending on the purpose thereof. The pigment may be any of an organic pigment and an inorganic pigment. From the viewpoint of ink colorability, it is preferable that the pigment is a pigment which is almost insoluble or sparingly soluble in water.

Examples of the organic pigment include a polycyclic pigment such as azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment or a quinophthalone pigment, dye lake such as a basic dye type lake or acidic dye type lake, a nitro pigment, a nitroso pigment, aniline black, and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black.

Further, even pigments which are not described in Color Index can be used as long as the pigments can be dispersed in water. Further, pigments which are surface-treated with a surfactant or a polymer dispersing agent and graft carbon can be used.

Among these pigments, particularly, an azo pigment, a phthalocyanine pigment, an anthraquinone pigment, a quinacridone pigment, and a carbon black pigment are preferable and an anionic azo pigment, an anionic phthalocyanine pigment, and an anionic quinacridone pigment are more preferable.

~Dispersing Agent~

In the ink composition, the form in which a pigment is dispersed by a dispersing agent is preferable. Among examples of this form, particularly, the form in which a pigment is dispersed by a polymer dispersing agent, that is, the form in which at least a part of a pigment is coated with a polymer dispersing agent is preferable.

Hereinafter, a pigment of which at least a part is coated with a polymer dispersing agent is referred to as a "resin-coated pigment".

As the dispersing agent, a polymer dispersing agent or a low-molecular-weight surfactant-type dispersing agent may be used. Further, a polymer dispersing agent which is not crosslinked (non-crosslinked polymer dispersing agent) and a polymer dispersing agent (crosslinked polymer dispersing agent) which is crosslinked by a crosslinking agent may be used.

As the non-crosslinked polymer dispersing agent, a water-soluble non-crosslinked polymer dispersing agent or a water-insoluble non-crosslinked polymer dispersing agent may be used.

As the low-molecular-weight surfactant-type dispersing agent, surfactant type dispersing agents described in paragraphs 0016 to 0020 of JP2010-188661A can be used.

Among the examples of the non-crosslinked polymer dispersing agent, a hydrophilic polymer compound can be used as a water-soluble non-crosslinked polymer dispersing agent.

As the water-soluble non-crosslinked polymer dispersing agent, natural hydrophilic polymer compounds described in paragraphs 0021 and 0022 of JP2010-188661A can be used.

Further, a synthetic hydrophilic polymer compound can be used as the water-soluble non-crosslinked polymer dispersing agent.

Examples of the synthetic hydrophilic polymer compound include polymer compounds having a vinyl-based polymer such as polyvinyl alcohol, polyvinylpyrrolidone, or polyvinyl methyl ether, an acrylic resin such as polyacrylamide, polyacrylic acid or alkali metal salt thereof, or a water-soluble styrene acrylic resin, a water-soluble styrene maleic acid resin, a water-soluble vinyl naphthalene acrylic resin, a water-soluble vinyl naphthalene maleic acid resin, polyvinylpyrrolidone, polyvinyl alcohol, alkali metal salt of a β-naphthalenesulfonic acid formalin condensate, and salts of a cationic functional group of quaternary ammonium or an amino group, in the side chain.

Among these, from the viewpoint of dispersion stability and aggregating properties of a pigment, a polymer compound containing a carboxy group is preferable and a polymer compound containing a carboxy group, for example, an acrylic resin such as a water-soluble styrene acrylic resin, a water-soluble styrene maleic acid resin, a water-soluble vinyl naphthalene acrylic resin, or a water-soluble vinyl naphthalene maleic acid resin is particularly preferable.

As the water-insoluble dispersing agent among the examples of the non-crosslinked polymer dispersing agent, a polymer having both of a hydrophobic part and a hydrophilic part can be used. Examples of the water-insoluble dispersing agent include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The styrene-(meth)acrylic acid copolymer, the (meth)acrylic acid ester-(meth)acrylic acid copolymer, the polyethylene glycol (meth)acrylate-(meth)acrylic acid copolymer, and the styrene-maleic acid copolymer may be binary copolymers or ternary or higher copolymers.

Among the examples of the non-crosslinked polymer dispersing agent, a (meth)acrylic acid ester-(meth)acrylic acid copolymer is preferable and a benzyl(meth)acrylate-(meth)acrylic acid-methyl(meth)acrylate ternary copolymer is particularly preferable.

The term "(meth)acrylic acid" indicates acrylic acid or methacrylic acid and the term "(meth)acrylate" indicates acrylate or methacrylate.

Further, a copolymer may be a random copolymer, a block copolymer, or a graft copolymer.

The weight-average molecular weight of the non-crosslinked polymer dispersing agent is preferably in a range of 3000 to 200000, more preferably in a range of 5000 to 100000, still more preferably in a range of 5000 to 80000, and particularly preferably in a range of 10000 to 60000.

In addition, the weight-average molecular weight can be measured according to the same method as the method used for measuring the weight-average molecular weight of the water-insoluble resin.

The acid value of the non-crosslinked polymer dispersing agent is not particularly limited, but it is preferable that the acid value of the non-crosslinked polymer dispersing agent is larger than the acid value of resin particles (preferably self-dispersing resin particles) described below from the viewpoint of the aggregating properties.

A crosslinked polymer dispersing agent is formed by a polymer (uncrosslinked polymer) being crosslinked by a crosslinking agent.

The polymer is not particularly limited and various polymers can be used. Among the various polymers, polyvinyls, polyurethanes, and polyesters which can function as water-soluble dispersing agents are preferable and polyvinyls are more preferable.

It is preferable that the polymer is a copolymer obtained by using a carboxy group-containing monomer as a copolymer component. Examples of the carboxy group-containing monomer include (meth)acrylic acid, β-carboxyethyl acrylate, fumaric acid, itaconic acid, maleic acid, or crotonic acid. Among these monomers, from the viewpoint of crosslinking properties and dispersion stability of the polymer, (meth)acrylic acid and β-carboxyethyl acrylate are preferable.

Since the polymer is crosslinked by a crosslinking agent, the polymer contains a functional group which can be crosslinked by the crosslinking agent. The functional group which can be crosslinked is not particularly limited, and examples thereof include a carboxy group or a salt thereof, an isocyanate group, and an epoxy group. Among these, from the viewpoint of improving dispersibility, a carboxy group or a salt thereof is preferable.

From the viewpoint of water solubility of the polymer, the acid value of the polymer is preferably 90 mgKOH/g or greater and more preferably 95 mgKOH/g or greater.

Further, from the viewpoints of dispersibility and dispersion stability of a pigment, the acid value thereof is preferably in a range of 100 mgKOH/g to 180 mgKOH/g, more preferably in a range of 100 mgKOH/g to 170 mgKOH/g, and still more preferably in a range of 100 mgKOH/g to 160 mgKOH/g.

In addition, the acid value can be measured using a method described in Japanese Industrial Standards (JISK0070: 1992).

The weight-average molecular weight (Mw) of the polymer is preferably in a range of 50000 to 120000, more preferably in a range of 60000 to 120000, still more preferably in a range of 60000 to 100000, and particularly preferably in a range of 60000 to 90000.

Further, the weight-average molecular weight can be measured according to the same method as the method used for measuring the weight-average molecular weight of the water-insoluble resin.

It is preferable that the polymer contains at least one hydrophobic monomer as a copolymer component. Examples of the hydrophobic monomer include (meth)acrylate containing an aromatic ring group such as alkyl (meth)acrylate having 1 to 20 carbon atoms, benzyl (meth)acrylate, or phenoxyethyl (meth)acrylate, styrene, and derivatives thereof.

The form of copolymerization of a polymer is not particularly limited, and the polymer may be a random polymer, a block polymer, or a graft polymer.

The method of synthesizing a polymer is not particularly limited, but a random polymerization method of a vinyl monomer is preferable from the viewpoint of dispersion stability.

The crosslinking agent is not particularly limited as long as the crosslinking agent is a compound having two or more sites that react with a polymer. Among the examples thereof, a compound (bi- or higher functional epoxy group) containing two or more epoxy groups is preferable from the viewpoint of excellent reactivity with a carboxy group.

Examples of the crosslinking agent include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylol propane triglycidyl ether. Among these, polyethylene glycol diglycidyl ether, diethylene glycol diglycidyl ether, and trimethylol propane triglycidyl ether are preferable.

As the method of coating a pigment with a crosslinking polymer dispersing agent, a method of preparing a pigment dispersing agent by crosslinking a polymer using a crosslinking agent after a pigment is dispersed using a water-soluble or water-insoluble polymer.

In the ink composition, the mass ratio (pigment:dispersing agent) of the mass of the pigment to the mass of the dispersing agent is preferably in a range of 1:0.06 to 1:3, more preferably in a range of 1:0.125 to 1:2, and still more preferably in a range of 1:0.125 to 1:1.5.

The average particle diameter (the average particle diameter of the resin-coated pigment in the case of the resin-coated pigment, the same applies to hereinafter) of the pigment is preferably in a range of 10 nm to 200 nm, more preferably in a range of 10 nm to 150 nm, and still more preferably in a range of 10 nm to 100 nm. In a case where the average particle diameter is 200 nm or less, color reproducibility becomes excellent and jetting properties when droplets are jetted according to an ink jet method become excellent. Further, in a case where the average particle diameter is 10 nm or greater, light resistance becomes excellent. Further, the particle size distribution of the pigment is not particularly limited, and any of wide particle size distribution and monodisperse particle size distribution may be used. In addition, two or more pigments having monodisperse particle size distribution may be mixed with each other and then used.

Further, the average particle diameter and the particle size distribution of the pigment are acquired by measuring the volume average particle diameter using a nanotrac particle size distribution measurement apparatus UPA-EX150 (manufactured by Nikkiso Co., Ltd.) according to a dynamic light scattering method.

In the present disclosure, from the viewpoint of the image density, the content of the pigment in the ink composition is preferably in a range of 1% by mass to 25% by mass, more preferably in a range of 2% by mass to 20% by mass, and particularly preferably in a range of 2% by mass to 10% by mass with respect to the total mass of the ink composition.

The pigment may be used alone or in combination of two or more kinds thereof.

(Dye)

As a dye, a known dye can be used without particular limitation. For example, dyes described in JP2001-115066A, JP2001-335714A, and JP2002-249677A can be preferably used in the present disclosure.

Further, in a case of using a dye, a dye which is held by a water-insoluble carrier may be used. The carrier (water-insoluble coloring particle) holding a dye can be used as an aqueous dispersion using a dispersing agent. The carrier is not particularly limited as long as the carrier is insoluble or sparingly soluble in water, and examples thereof include inorganic materials, organic materials, and composite materials of these. Specifically, carriers described in JP2001-181549A and JP2007-169418A can be preferably used in the present disclosure.

—Resin Particles—

It is preferable that the ink composition contains at least one kind of resin particles.

The resin particles are different from the above-described polymer dispersing agent (polymer dispersing agent that covers at least a part of the pigment) and are present separately from the pigment.

In a case where the ink composition contains resin particles, it is preferable that the resin particles aggregate when brought into contact with the aggregation component.

Further, from the viewpoint that the aggregating properties when the resin particles are brought into contact with the above-described aggregation component become excellent, resin particles containing an anionic dissociable group other than a sulfo group are preferable as the resin particles. The details of the resin particles containing an anionic dissociable group other than a sulfo group will be described below.

Resin particles containing a sulfo group as an anionic dissociable group are not preferable because the dispersion stability of the resin particles is not greatly improved so that the resin particles are difficult to aggregate when brought into contact with the aggregation component in the treatment liquid.

It is preferable that the resin particles are insoluble or sparingly soluble in water.

The expression "insoluble or sparingly soluble in water" indicates that the dissolution amount of a resin is 15 g or less in a case where the resin is dissolved in 100 g of water at 25° C. after being dried at 105° C. for 2 hours. From the viewpoint of improving the continuous jetting properties and jetting stability of an ink, the dissolution amount thereof is preferably 10 g or less, more preferably 5 g or less, and still more preferably 1 g or less. The dissolution amount indicates a dissolution amount obtained by neutralizing the resin particles at a neutralization degree of 100% with sodium hydroxide or acetic acid depending on the type of a salt-forming group of the resin particles which are insoluble or sparingly soluble in water.

As the resin particles, particles of any of thermoplastic resins and thermosetting resins may be used, and examples thereof include particles of resins having anionic groups such as a modified acrylic resin, an epoxy resin, a polyurethane resin, a polyether resin, a polyamide resin, an unsaturated polyester resin, a phenolic resin, a silicone resin, a fluorine resin, a polyvinyl resin such as vinyl chloride, vinyl acetate, polyvinyl alcohol, or polyvinyl butyral, a polyester resin such as an alkyd resin or a phthalic acid resin, an amino-based resin such as a melamine resin, a melamine formaldehyde resin, an aminoalkyd co-condensation resin, or a urea resin, or copolymers or mixtures of these. Among these resin particles, the anionic acrylic resin is obtained by polymerizing acrylic monomers (anionic group-containing acrylic monomers) containing an anionic dissociable group other than a sulfo group and other monomers which can be copolymerized with anionic dissociable group-containing acrylic monomers as necessary, in a solvent. Examples of the anionic dissociable group-containing acrylic monomer include an acrylic monomer containing one or more selected from the group consisting of a carboxy group and a phosphonic acid group. Among these, acrylic monomers (such as acrylic acid, methacrylic acid, crotonic acid, ethaacrylic acid, propylacrylic acid, isopropylacrylic acid, itaconic acid, and fumaric acid) having a carboxy group are preferable and acrylic acid and methacrylic acid are particularly preferable.

It is preferable that the resin particles are self-dispersing resin particles (self-dispersing resin particles) from the viewpoints of jetting stability and liquid stability (particularly dispersion stability) of a system containing a colorant. The self-dispersing resin indicates a water-insoluble polymer which may be in a state of being dispersed in an aqueous medium by a functional group (particularly a hydrophilic group such as an acidic group or a salt thereof) included in a polymer when the polymer is set to be in a dispersion state using a phase-transfer emulsification method in the absence of a surfactant.

The dispersion state includes both of an emulsion state (emulsion) formed by a water-insoluble polymer being dispersed in an aqueous medium in a liquid state and a dispersion state (suspension) formed by a water-insoluble polymer being dispersed in an aqueous medium in a solid state.

In addition, the aqueous medium indicates a medium containing water. The aqueous medium may contain a hydrophilic organic solvent as necessary. It is preferable that the aqueous medium contains water and a hydrophilic organic solvent at a content of 0.2% by mass or less with respect to water and more preferable that the aqueous medium contains only water.

From the viewpoints of the aggregation rate and fixing properties in a case where the self-dispersing resin is contained in the ink composition, self-dispersing resin particles in which a water-insoluble polymer can be dispersed in a solid state are preferable as the self-dispersing resin.

As the method of obtaining an emulsified or dispersion state of the self-dispersing resin, that is, a method of preparing an aqueous dispersion of the self-dispersing resin particles, a phase-transfer emulsification method is exemplified.

As the phase-transfer emulsification method, a method of dissolving or dispersing a self-dispersing resin in a solvent (for example, a water-soluble organic solvent), putting the resultant in water without adding a surfactant thereto, stirring and mixing the solution in a state in which a salt-forming group (for example, an acidic group) included in the self-dispersing resin is neutralized, and removing the solvent therefrom to obtain an aqueous dispersion in an emulsified or dispersion state is exemplified.

Further, a stable emulsified or dispersion state of the self-dispersing resin indicates a state (that is, the state in which precipitation cannot be confirmed visually) in which an emulsified or dispersion state is stably maintained at 25° C. for at least one week even after a solution obtained by dissolving 30 g of a water-insoluble polymer in 70 g of an organic solvent (for example, methyl ethyl ketone), a neutralizing agent (sodium hydroxide in a case where the salt-forming group is anionic and acetic acid in a case where the salt-forming group is cationic) which is capable of neutralizing a salt-forming group of the water-insoluble polymer at a neutralization degree of 100%, and 200 g of water are mixed and stirred (device: stirring device provided with stirring blades, rotation speed of 200 rpm, 30 minutes, 25° C.) and then the organic solvent is removed from the mixed solution.

In addition, the stability of the emulsified or dispersion state of the self-dispersing resin can be confirmed by performing a sedimentation acceleration test using centrifugation. The stability confirmed by the sedimentation acceleration test using centrifugation can be evaluated by adjusting the concentration of solid contents of the aqueous dispersion of resin particles obtained by the above-described method to 25% by mass, performing centrifugation at 12000 rpm for one hour, and measuring the concentration of solid contents of the supernatant after the centrifugation.

In a case where the ratio of the concentration of solid contents after the centrifugation to the concentration of solid contents before the centrifugation is large (in a case where the numerical value is close to 1), this means that sedimentation of resin particles due to centrifugation does not occur, that is, the aqueous dispersion of the resin particles becomes more stable. In the present disclosure, the ratio between the concentrations of solid contents before and after the centrifugation is preferably 0.8 or greater, more preferably 0.9 or greater, and particularly preferably 0.95 or greater.

In a case where the self-dispersing resin is in the dispersion state, the content of a water-soluble component showing water solubility is preferably 10% by mass or less, more preferably 8% by mass or less, and still more preferably 6% by mass or less. In a case where the content of the water-soluble component is 10% by mass or less, it is possible to effectively suppress swelling of resin particles and fusion welding of resin particles and to more stably maintain the dispersion state. Further, an increase in viscosity of the ink composition can be suppressed, and the jetting stability becomes more excellent in a case where the ink composition is applied to an ink jet method.

The water-soluble component is a compound to be contained in the self-dispersing resin. In other words, the water-soluble component indicates a compound to be dissolved in water in a case where the self-dispersing resin is set to be in the dispersion state. The water-soluble component is a water-soluble compound which is created as a by-product or mixed into in a case where the self-dispersing resin is produced.

A main chain skeleton of the water-insoluble polymer is not particularly limited, and a vinyl polymer or a condensation type polymer (such as an epoxy resin, polyester, polyurethane, polyamide, cellulose, polyether, polyurea, polyimide, or polycarbonate) can be used. Among these, a vinyl polymer is particularly preferable.

Preferred examples of a vinyl polymer and a monomer constituting a vinyl polymer include those described in JP2001-181549A and JP2002-88294A. Further, a vinyl polymer obtained by introducing a dissociable group to a terminal of a polymer chain by performing radical polymerization on a vinyl monomer using a chain transfer agent, a polymerization initiator, and an iniferter which have a dissociable group (or a substituent which can be induced to a dissociable group) or performing ion polymerization using a compound having a dissociable group (or a substituent which can be induced to a dissociable group) in either of an initiator or a terminator can be used.

Further, preferred examples of a condensation type polymer and a monomer constituting a condensation type polymer include those described in JP2001-247787A.

From the viewpoint of dispersion stability, it is preferable that the resin particles contain a water-insoluble polymer which has a hydrophilic constitutional unit and a constitutional unit derived from an aromatic group-containing monomer or a cyclic aliphatic group-containing monomer.

The "hydrophilic constitutional unit" is not particularly limited as long as the constitutional unit is derived from a hydrophilic group-containing monomer, and the constitutional unit may be a constitutional unit derived from one hydrophilic group-containing monomer or a constitutional unit derived from two or more hydrophilic group-containing monomers. The hydrophilic group is not particularly limited except for a sulfo group and may be a dissociable group or a non-ionic hydrophilic group.

From the viewpoint of the stability of the formed emulsified or dispersion state, as the hydrophilic group, a dissociable group is preferable and an anionic dissociable group is more preferable.

That is, resin particles of the present disclosure containing an anionic dissociable group are preferable as the resin particles.

Examples of the dissociable group include a carboxy group and a phosphoric acid group. Among these, from the viewpoint of the fixing properties in a case of constituting the ink composition, a carboxy group is preferable.

From the viewpoint of the dispersion stability and aggregating properties, as the hydrophilic group-containing monomer, a dissociable group-containing monomer is preferable and a dissociable group-containing monomer that contains a dissociable group and an ethylenically unsaturated bond is more preferable.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated phosphoric acid monomer include vinylphosphonic acid, vinyl phosphate, bis(methacryloxyethyl) phosphate, diphenyl-2-acryloxyethyl phosphate, diphenyl-2-methacryloxyethyl phosphate, and dibutyl-2-acryloxyethyl phosphate.

Among the dissociable group-containing monomers, from the viewpoints of the dispersion stability and the jetting stability, an unsaturated carboxylic acid monomer is preferable and acrylic acid and methacrylic acid are more preferable.

From the viewpoint of the dispersion stability and the aggregation rate when the resin particles are brought into contact with the treatment liquid, it is preferable that the resin particles contain a polymer containing a carboxy group and more preferable that the resin particles contain a polymer which contains a carboxy group and has an acid value of 25 mgKOH/g to 100 mgKOH/g. Further, from the viewpoint of the self-dispersibility and the aggregating properties when the resin particles are brought into contact with the treatment liquid, the acid value is more preferably in a range of 25 mgKOH/g to 80 mgKOH/g and particularly preferably in a range of 30 mgKOH/g to 65 mgKOH/g.

Particularly, in a case where the acid value thereof is 25 mgKOH/g or greater, the dispersion stability becomes excellent. Further, in a case where the acid value thereof 100 mgKOH/g or less, the aggregation rate is improved.

Further, the acid value can be measured using a method described in Japanese Industrial Standards (JISK0070: 1992).

The aromatic group-containing monomer is not particularly limited as long as the aromatic group-containing monomer is a compound containing an aromatic group and a polymerizable group. In the present disclosure, the aromatic group may be a group derived from aromatic hydrocarbon or a group derived from an aromatic heterocycle. From the viewpoint of stability of the particle shape in an aqueous medium, it is preferable that the aromatic group is an aromatic group derived from aromatic hydrocarbon.

Further, the polymerizable group may be a polymerizable group which is condensation-polymerizable or a polymerizable group which is addition-polymerizable. In the present disclosure, from the viewpoint of stability of the particle shape in an aqueous medium, as the polymerizable group, a polymerizable group which is addition-polymerizable is preferable and a group containing an ethylenically unsaturated bond is more preferable.

It is preferable that the aromatic group-containing monomer is a monomer containing an ethylenically unsaturated bond and an aromatic group derived from aromatic hydrocarbon. The aromatic group-containing monomer may be used alone or in combination of two or more kinds thereof.

Examples of the aromatic group-containing monomer include phenoxyethyl (meth)acrylate, benzyl (meth)acrylate, phenyl (meth)acrylate, and a styrene-based monomer. Among these, from the viewpoints of the balance between hydrophilicity and hydrophobicity of the polymer chain and ink fixing properties, an aromatic group-containing (meth) acrylate monomer is preferable, at least one selected from phenoxyethyl (meth)acrylate, benzyl (meth)acrylate, and phenyl (meth)acrylate is more preferable, and phenoxyethyl (meth)acrylate and benzyl (meth)acrylate are still more preferable.

As the cyclic aliphatic group-containing monomer, a monomer containing a cyclic aliphatic group derived from cyclic aliphatic hydrocarbon and an ethylenically unsaturated bond is preferable and a cyclic aliphatic group-containing (meth)acrylate monomer (hereinafter, also referred to as alicyclic (meth)acrylate is more preferable).

The alicyclic (meth)acrylate is a compound which includes a constitutional site derived from (meth)acrylic acid and a constitutional site derived from alcohol and has a structure containing at least one substituted or unsubstituted alicyclic hydrocarbon group (cyclic aliphatic group) in the constitutional site derived from alcohol. Further, the alicyclic hydrocarbon group may be the constitutional site derived from alcohol or may be bonded to the constitutional site derived from alcohol through a linking group.

The alicyclic hydrocarbon group is not particularly limited as long as the alicyclic hydrocarbon group is a hydrocarbon group containing a cyclic non-aromatic hydrocarbon group, and examples thereof include a monocyclic hydrocarbon group, a bicyclic hydrocarbon group, and a tricyclic or higher polycyclic hydrocarbon group. Examples of the alicyclic hydrocarbon group include cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricycle[$5.2.1.0^{2,6}$]decanyl group, and bicyclo[4.3.0]nonane.

The alicyclic hydrocarbon group may further include a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, and a cyano group. In addition, the alicyclic hydrocarbon group may form a fused ring. In the present disclosure, from the viewpoint of the viscosity or solubility, the number of carbon atoms of the alicyclic hydrocarbon group portion in the alicyclic hydrocarbon group is preferably in a range of 5 to 20.

Specific examples of the alicyclic (meth)acrylate will be described below, but the present disclosure is not limited to these.

Examples of the monocyclic (meth)acrylate include cycloalkyl (meth)acrylate containing a cycloalkyl group having 3 to 10 carbon atoms such as cyclopropyl (meth) acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone or in combination of two or more kinds thereof.

Among these, from the viewpoints of dispersion stability, fixing properties, and blocking resistance of resin particles, at least one of bicyclic (meth)acrylate or tricyclic or higher polycyclic (meth)acrylate is preferable and at least one selected from isobornyl (meth)acrylate, adamantyl (meth) acrylate, and dicyclopentanyl (meth)acrylate is more preferable.

As the resin used to form resin particles, an acrylic resin having a constitutional unit derived from a (meth)acrylate monomer is preferable and an acrylic resin having a constitutional unit derived from an aromatic group-containing (meth)acrylate monomer or alicyclic (meth)acrylate is more preferable. Further, it is preferable that the resin particles have a constitutional unit derived from an aromatic group-containing (meth)acrylate monomer or alicyclic (meth)acrylate and the content thereof is in a range of 10% by mass to 95% by mass. In a case where the content of the aromatic group-containing (meth)acrylate monomer or the alicyclic (meth)acrylate is in a range of 10% by mass to 95% by mass, emulsification or the stability of the dispersion state is improved and an increase in ink viscosity can be suppressed.

From the viewpoints of stability of the dispersion state, stabilization of the particle shape in the aqueous medium using the hydrophobic interaction between aromatic rings and alicycles, and a decrease in amount of water-soluble components due to appropriate hydrophobization of particles, the content of the aromatic group-containing (meth) acrylate monomer or the alicyclic (meth)acrylate is more preferably in a range of 15% by mass to 90% by mass, more preferably in a range of 15% by mass to 80% by mass, and particularly preferably in a range of 25% by mass to 70% by mass.

A resin used to form resin particles can be formed using a constitutional unit derived from an aromatic group-containing monomer or a cyclic aliphatic group-containing monomer and a constitutional unit derived from a dissociable group-containing monomer. Further, other constitutional units may be also used as necessary.

The monomers forming other constitutional units are not particularly limited as long as the monomers can be copolymerized with an aromatic group-containing monomer and a dissociable group-containing monomer. Among these, from the viewpoints of flexibility of a polymer skeleton or ease of controlling the glass transition temperature (Tg), an alkyl group-containing monomer is preferable.

Examples of the alkyl group-containing monomer include alkyl(meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acryl amide, N-ethoxyethyl (meth)acryl amide, or N-(n-,iso)butoxyethyl (meth)acrylamide.

The weight-average molecular weight of the water-insoluble polymer that forms resin particles is preferably in a range of 3000 to 200000, more preferably in a range of 5000 to 150000, and still more preferably in a range of 10000 to 100000. In a case where the weight-average molecular weight thereof is 3000 or greater, the amount of water-soluble components can be effectively suppressed.

Further, the weight-average molecular weight thereof is 200000 or less, the dispersion stability can be improved.

In addition, the weight-average molecular weight can be measured using a known method.

From the viewpoint of controlling hydrophobicity of the polymer, it is preferable that the water-insoluble polymer that forms resin particles includes a constitutional unit derived from an aromatic group-containing (meth)acrylate monomer (preferably a constitutional unit derived from phenoxyethyl (meth)acrylate and/or a constitutional unit derived from benzyl (meth)acrylate) or a cyclic aliphatic group-containing monomer (preferably alicyclic (meth) acrylate) at a copolymerization ratio of 15% by mass to 80% by mass with respect to the total mass of the resin particles.

In addition, from the viewpoint of controlling hydrophobicity of the polymer, it is preferable that the water-insoluble polymer includes a constitutional unit derived from an aromatic group-containing (meth)acrylate monomer or an alicyclic (meth)acrylate monomer at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid) and more preferable that the water-insoluble polymer includes a constitutional unit derived from phenoxyethyl (meth)acrylate and/or a constitutional unit derived from benzyl (meth)acrylate at a copolymerization ratio of 15% by mass to 80% by mass, a constitutional unit derived from a carboxy group-containing monomer, and a constitutional unit derived from an alkyl group-containing monomer (preferably a constitutional unit derived from alkyl ester of (meth)acrylic acid having 1 to 4 carbon atoms).

It is preferable that the acid value of the water-insoluble polymer is in a range of 25 mgKOH/g to 100 mgKOH/g and the weight-average molecular weight thereof is in a range of 3000 to 200000 and more preferable that the acid value of the water-insoluble polymer is in a range of 25 mgKOH/g to 95 mgKOH/g and the weight-average molecular weight thereof is in a range of 5000 to 150000. The acid value and the weight-average molecular weight can be measured using known methods.

Hereinafter, exemplary compounds B-01 to B-23 will be described as specific examples of the water-insoluble polymer constituting the resin particles, but the present disclosure is not limited thereto. Further, the mass ratios of copolymer components are shown in the parentheses.

B-01: phenoxyethyl acrylate/methyl methacrylate/acrylic acid copolymer (50/45/25)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobornyl methacrylate/acrylic acid copolymer (20/72/8)

B-21: methyl methacrylate/isobornyl methacrylate/acrylic acid copolymer (40/52/8)

B-22: methyl methacrylate/isobornyl methacrylate/dicyclopentanyl methacrylate/methacrylic acid copolymer (20/62/10/8)

B-23: methyl methacrylate/dicyclopentanyl methacrylate/methacrylic acid copolymer (20/72/8)

The method of producing the water-insoluble polymer contained in the resin particles is not particularly limited, and examples thereof include a method of performing emulsion polymerization in the presence of a polymerizable surfactant and covalently bonding a surfactant and a water-insoluble polymer to each other; a solution polymerization method of performing polymerization on a monomer mixture that contains the hydrophilic group-containing monomer and the aromatic group-containing monomer or the cyclic aliphatic group-containing monomer; and a method of copolymerization using a known polymerization method such as a bulk polymerization method. Among these polymerization methods, from the viewpoints of aggregation rate and jetting stability at the time of jetting an ink composition, the solution polymerization method is preferable and a solution polymerization method using an organic solvent is more preferable.

From the viewpoint of the aggregation rate, it is preferable that the resin particles contain a polymer synthesized in an organic solvent, the polymer includes an anionic group (a carboxy group), a part or the entirety of the anionic group (a carboxy group) of the polymer (preferably the acid value is in a range of 20 mgKOH/g to 100 mgKOH/g) is neutralized, and the neutralized group is prepared as a polymer dispersion using water as a continuous phase.

In other words, it is preferable that the resin particles are produced by performing a step of synthesizing a polymer in an organic solvent and a dispersion step of obtaining an aqueous dispersion in which at least a part of the anionic group (a carboxy group) of the polymer is neutralized.

It is preferable that the dispersion step includes the following step (1) and step (2).

Step (1): step of stirring a mixture that contains a polymer (water-insoluble polymer), an organic solvent, a neutralizing agent, and an aqueous medium Step (2): step of removing the organic solvent from the mixture It is preferable that the step (1) is a treatment of dissolving the polymer (water-insoluble polymer) in the organic solvent, gradually adding a neutralizing agent and an aqueous medium thereto, and mixing and stirring the solution to obtain a dispersion material. In this manner, resin particles having excellent storage stability can be obtained by adding a neutralizing agent and an aqueous medium to the water-insoluble polymer solution dissolved in an organic solvent without requiring strong shear force.

The method of stirring the mixture is not particularly limited, and a mixing and stirring device which is typically used and dispersers such as an ultrasonic disperser and a high pressure homogenizer can be used as necessary.

Further, in the step (2), an aqueous dispersion of resin particles can be obtained by distilling the organic solvent using a conventional method, for example, distillation under reduced pressure from the dispersion material obtained from the step (1) and performing phase transfer into a water system. The organic solvent in the obtained aqueous dispersion is substantially removed and the amount of organic solvent is preferably 0.2% by mass or less and more preferably 0.1% by mass or less.

Preferred examples of the organic solvent include an alcohol-based solvent, a ketone-based solvent, and an ether-based solvent. As the organic solvent, organic solvents exemplified in paragraph 0059 of JP2010-188661A can be used.

As the neutralizing agent, neutralizing agents exemplified in paragraphs 0060 and 0061 of JP2010-188661A can be used.

The volume average particle diameter of the resin particles (particularly, self-dispersing resin particles) in the present disclosure is preferably in a range of 10 nm to 400 nm, more preferably in a range of 10 nm to 200 nm, still more preferably in a range of 10 nm to 100 nm, and particularly preferably in a range of 10 nm to 50 nm. In a case where the volume average particle diameter thereof is 10 nm or greater, the production suitability is improved. Further, the volume average particle diameter thereof is 400 nm or less, the storage stability is improved. Moreover, the particle size distribution of the resin particles is not particularly limited, and any of resin particles having wide particle size distribution and resin particles having monodisperse particle size distribution may be used. In addition, the resin particles may be used in combination of two or more kinds thereof.

Further, the average particle diameter and the particle size distribution of the resin particles are acquired by measuring the volume average particle diameter using a nanotrac particle size distribution measurement apparatus UPA-EX150 (manufactured by Nikkiso Co., Ltd.) according to a dynamic light scattering method.

The ink composition may contain one or two or more kinds of resin particles (preferably self-dispersing resin particles).

From the viewpoint of glossiness of an image, the content (total content) of the resin particles (preferably self-dispersing resin particles) in the ink composition is preferably in a range of 1% by mass to 30% by mass and more preferably in a range of 3% by mass to 15% by mass with respect to the total amount of the ink composition.

—Water—

The ink composition contains water and is prepared as an aqueous composition. The content of water is not particularly limited, but is preferably in a range of 10% by mass to 99% by mass, more preferably in a range of 30% by mass to 80% by mass, and still more preferably in a range of 50% by mass to 80% by mass with respect to the total mass of the ink composition.

—Other Components—

The ink composition may contain components other than the above-described components.

[Organic Solvent]

It is more preferable that the ink composition further contains at least one organic solvent (preferably a water-soluble organic solvent). In a case where the organic solvent contains particularly a water-soluble organic solvent, it is possible to prevent the ink composition from being dried and to promote permeation of the ink composition.

In a case where the water-soluble organic solvent is used as an anti-drying agent, it is possible to effectively prevent nozzle clogging which may occur due to the drying of an ink at an ink ejection opening in a case where the ink composition is jetted according to an ink jet method for recording an image.

In order to prevent the ink composition from being dried, a water-soluble organic solvent having a lower vapor pressure than that of water is preferable. Specific examples of a preferred water-soluble organic solvent for the purpose of preventing the ink composition from being dried include polyhydric alcohols such as ethylene glycol, propylene glycol, diethylene glycol, polyethylene glycol, thiodigylcol, dithiodigylcol, 2-methyl-1,3-propanediol, 1,2,6-hexanetriol, an acetylene glycol derivative, glycerin, and trimethylol propane; lower alkyl ethers of polyhydric alcohol such as ethylene glycol monomethyl (or ethyl) ether, diethylene glycol monomethyl (or ethyl) ether, triethylene glycol monoethyl (or butyl) ether, and tripropylene glycol monomethyl (or ethyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethyl sulfoxide, and 3-sulfolene; polyfunctional compounds such as diacetone alcohol and diethanolamine; and urea derivatives.

Among these water-soluble organic solvents, polyhydric alcohol such as glycerin and diethylene glycol are preferable. Further, these may be used alone or in combination of two or more kinds thereof. It is preferable that the ink composition contains 10% by mass to 50% by mass of these water-soluble organic solvents.

In order to promote penetration of the ink composition, a water-soluble organic solvent is preferably used from the viewpoint of penetration of the ink composition from the substrate. Specific examples of the water-soluble organic solvent which is preferable for promoting penetration include alcohols such as ethanol, isopropanol, butanol, di(t-ri)ethylene glycol monobutyl ether, tripropylene glycol monomethyl (or ethyl) ether, and 1,2-hexanediol. In a case where the ink composition contains 5% by mass to 30% by mass of these, excellent effects are obtained. Further, it is preferable that the amount of these water-soluble organic solvents is in a range in which blurring of printed characters and images or page omission (print through) does not occur.

Further, the water-soluble organic solvent can be used to adjust the viscosity other than the applications described above. Specific examples of the water-soluble organic solvent which can be used to adjust the viscosity include alcohol (for example, methanol, ethanol, propanol, isopropanol, butanol, isobutanol, sec-butanol, t-butanol, pentanol, hexanol, cyclohexanol, or benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amine (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, solfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Further, the water-soluble organic solvents may be used alone or two or more kinds thereof.

[Surfactant]

The ink composition may contain at least one surfactant. Examples of the surfactant include a non-ionic surfactant, a cationic surfactant, an anionic surfactant, and a betaine surfactant. From the viewpoint of the aggregation rate, an anionic surfactant or a non-ionic surfactant is preferable.

From the viewpoint of satisfactorily jetting the ink composition using an ink jet method, it is preferable that the amount of the surfactant to be contained in the ink composition is set such that the surface tension of the ink composition can be adjusted to be in a range of 25 mN/m to 40 mN/m. Among the examples of the ranges, it is preferable that the content of the surfactant is set such that the surface tension thereof can be adjusted to be in a range of 27 mN/m to 37 mN/m.

Further, these surfactants can be used as an anti-foaming agent. As the surfactants, chelating agents typified by a fluorine-based compound, a silicone-based compound, and ethylenediaminetetraacetic acid (EDTA) can be used.

[Other Additives]

The ink composition may further contain other additives in addition to the components described above. Examples of other additives include known additives such as a discoloration preventer, an emulsification stabilizer, a penetration enhancer, an ultraviolet absorbing agent, a preservative, an antibacterial agent, a pH adjusting agent, an anti-foaming agent, a viscosity adjusting agent, a dispersion stabilizer, a rust inhibitor, and a chelating agent. These various additives may be directly added after preparation of the ink composition or added during the preparation of the ink composition.

As the pH adjusting agent, a neutralizing agent (an organic base or inorganic alkali) can be used. From the viewpoint of improving the storage stability of the ink composition, it is preferable that the pH adjusting agent is added to the ink composition such that the pH of the ink composition is adjusted to be in a range of 6 to 10 and more preferable that the pH adjusting agent is added to the ink composition such that the pH of the ink composition is adjusted to be in a range of 7 to 10.

From the viewpoints of jetting stability in a case of jetting an ink using an ink jet method and the aggregation rate when a treatment liquid described below is used, the viscosity of the ink composition is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s.

The viscosity of the ink composition is obtained by measuring the ink composition under a temperature condition of 25° C. using VISCOMETER TV-22 (manufactured by TOKI SANGYO CO., LTD.).

Hereinbefore, the ink set according to the present disclosure has been described, but the specific structure of the ink set according to the present invention is not particularly limited as long as the ink set includes a combination of at least one ink composition and a treatment liquid.

Examples of preferred aspects of the ink set include a configuration (three color configuration) formed of a combination of a cyan ink serving as an ink composition, a magenta ink serving as an ink composition, a yellow ink serving as an ink composition, and a treatment liquid; and a configuration (four color configuration) formed of a combination of a black ink serving as an ink composition, a cyan ink serving as an ink composition, a magenta ink serving as an ink composition, a yellow ink serving as an ink composition, and a treatment liquid.

Here, the ink set may be an ink set with one color configuration or a two color configuration formed of a treatment liquid and one or two ink compositions.

Further, the ink set may contain other ink compositions as necessary, for example, at least one ink selected from light cyan ink, light magenta ink, and light yellow ink in addition to the above-described ink compositions. As other ink compositions described above, known ink compositions can be used.

Further, the ink set may contain two or more treatment liquids as necessary.

In a case where the ink set contains two or more ink compositions, at least one ink composition may be an ink composition containing a colorant (preferably a pigment).

Further, in a case where the ink set contains two or more treatment liquids, at least one treatment liquid may be a treatment liquid containing an aggregation component (a compound that causes the colorant in the ink composition to aggregate) and water-insoluble resin particles having a constitutional unit derived from a first monomer and a constitutional unit derived from a second monomer.

<Image Recording Method>

An image recording method according to the present disclosure includes a pre-treatment step of applying the treatment liquid of the ink set according to the present disclosure to at least one surface of a substrate having a contact angle of 70° or greater when 3 seconds have elapsed from application of water droplets to the surface; and an image recording step of recording an image by jetting the ink composition of the ink set according to the present disclosure to the surface to which the treatment liquid has been applied using an ink jet method.

According to the image recording method of the present disclosure, since the above-described ink set is used in a case of recording an image, an image in which a decrease in density of a solid image is suppressed and occurrence of streak unevenness is suppressed and which has a desired density can be recorded.

As the substrate a substrate having a contact angle (water contact angle) of 70° or greater when 3 seconds have elapsed from application of water droplets to each surface is used. Specific examples thereof include a paper substrate such as coated paper, synthetic paper, and a polymer substrate such as polyethylene terephthalate (PET) film. Among these substrates, from the viewpoints of remarkably exhibiting the effects of suppressing a decrease in density of a solid image area and streak unevenness (graininess in some cases), a paper substrate is preferable and a paper substrate (coated paper) having a coating layer is more preferable.

The contact angle between the surface of the substrate and water can be measured under conditions of a normal temperature and a normal humidity using a contact angle meter DROP MASTER DM700 (manufactured by Kyowa Interface Science Co., Ltd.) in conformity with Japanese Industrial Standards (JIS R3257).

The coated paper is a paper substrate formed by providing a coating layer containing an inorganic pigment and the like on the surface of high-quality paper, alkaline paper, or the like which includes cellulose serving as a support as a main body and which is not surface-treated. In the coated paper, gloss unevenness tends to occur in an image area, but the occurrence of the gloss unevenness in the image area can be effectively suppressed in a case where the treatment liquid contains phosphoric acid or a phosphoric acid compound. Specific examples of the paper substrate include art paper, coated paper, lightly coated paper, and fine coating paper.

The inorganic pigment contained in the coating layer is not particularly limited, but at least one selected from silica, kaolin, clay, baked clay, zinc oxide, tin oxide, magnesium sulfate, aluminum oxide, aluminum hydroxide, psuedoboehmite, calcium carbonate, sachin white, aluminum silicate, smectite, zeolite, magnesium silicate, magnesium carbonate, magnesium oxide, and diatomaceous earth is preferable and calcium carbonate, silica, and kaolin are more preferable.

As the substrate, commercially available products are typically used, and examples thereof include "MagnoStar-Gloss" (manufactured by Sappi), "CarolinaC2S" (manufactured by International Company), "CartaIntegra" (manufactured by Metsaboard), and "VJFP series" (manufactured by YUPO).

In the present disclosure, it is preferable that the amount of the treatment liquid to be applied and the amount of the ink composition to be applied are adjusted as necessary. For example, in order to adjust the physical properties such as the viscoelasticity of an aggregate formed by the treatment liquid and the ink composition being mixed with each other, the amount of the treatment liquid to be applied may be changed depending on the substrate.

[Pre-Treatment Step]

The pre-treatment step is a step of applying the treatment liquid of the ink set described above to at least one surface of the substrate having a contact angle of 70° or greater when 3 seconds have elapsed from application of water droplets to the surface.

The treatment liquid can be applied using a known method such as a coating method, an ink jet method, or an immersion method. Examples of the known coating method include a bar coater, an extrusion die coater, an air doctor coater, a blade coater, a rod coater, a knife coater, a squeeze coater, and a reverse roll coater. The details of the ink jet method will be described below.

The pre-treatment step is performed before the image recording step for which the ink composition is used.

In other words, before the ink composition is applied onto the substrate, the treatment liquid for aggregating dispersion components (a colorant and the like) in the ink composition is applied in advance, and the ink composition is applied such that the ink composition comes into contact with the treatment liquid applied onto the substrate to obtain an image.

In this manner, ink jet recording can be carried out at a high speed and a high-resolution fine image with a high density can be obtained even in a case where the recording is carried out at a high speed.

Further, it is preferable that the treatment liquid on the substrate is heated and dried from when the treatment liquid is applied onto the substrate to when the ink composition is applied. In this manner, ink colorability such as bleeding prevention become excellent and a visible image with an excellent color density and excellent hue can be recorded.

The treatment liquid is heated and dried using known heating means such as a heater, blast means for blasting such as a dryer, or a combination of known heating means and blast means.

Examples of the heating method include a method of applying heat using a heater or the like from the opposite side of the surface of the substrate to which the treatment liquid has been applied, a method of blowing warm air or hot air to the surface of the substrate to which the treatment liquid has been applied, and a heating method using an infrared heater, and the heating may be carried out by a method of combining a plurality of methods of these.

[Image Recording Step]

The image recording step is a step of recording an image by jetting the ink composition of the ink set described above to one surface of the substrate to which the treatment liquid has been applied in the pre-treatment step using an ink jet method.

The ink jet method is not particularly limited, and examples thereof include known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by changing an electric signal into an acoustic beam and applying the acoustic beam to the ink; and a thermal ink jet (bubble jet (registered trademark)) method of heating an ink to form bubbles and utilizing the generated pressure. As the ink jet method, particularly, an ink jet method, described in JP1979-59936A (JP-S54-59936A), of jetting an ink from a nozzle using an action force caused by a rapid change in volume of the ink after being subjected to an action of thermal energy.

Further, examples of the ink jet method include a method of jetting a small volume of an ink having a low density, which is referred to as a photo ink, multiple times, a method of improving the image quality using a plurality of inks having substantially the same hue and different densities, and a method of using a colorless transparent ink.

Further, an ink jet head used in the ink jet method may be operated by an on-demand system or a continuous system. Specific examples of the jetting system include an electromechanical conversion system (such as a single cavity type, a double cavity type, a bender type, a piston type, a share mode type, or a shared wall type), an electrothermal conversion system (such as a thermal ink jet type or a bubble jet (registered trademark) type), an electrostatic attraction system (such as an electric field control type or a slit jet type), and an electrical jetting system (such as a spark jet type), and any jetting system may be used.

The ink nozzle used at the time of recording according to the ink jet method is not particularly limited and can be selected as appropriate depending on the purpose thereof.

A short serial head is used as the ink jet head, and there are two systems for the ink jet head, which are a shuttle system of performing recording while scanning a head in the width direction of the substrate and a line system of using a line head in which recording elements are disposed correspondingly to the entire area of one side of the substrate. In the line system, image recording can be performed on the entire surface of the substrate by scanning the substrate in a direction orthogonal to the direction in which the recording elements are disposed. Therefore, a conveying system such as a carriage that scans a short head becomes unnecessary. Further, since movement of a carriage and complicated scanning control between the head and the substrate become unnecessary and only the substrate moves, the recording can be performed at a higher speed compared to the shuttle system.

It is preferable that the image recording step is started within 10 seconds after the pre-treatment step and more preferable that the image recording step is started within a time range of 0.1 seconds to 10 seconds. In this manner, an image can be formed at a high speed.

The expression "started within 10 seconds after the pre-treatment step" means that the time taken from when the treatment liquid is applied and the drying is completed to when the first ink droplet is impacted on the substrate is within 10 seconds.

Further, in the image recording step, the droplet amount of ink droplets to be applied (jetted) is preferably in a range of 1.5 pL (pico liter) to 3.0 pL and more preferably in a range of 1.5 pL to 2.5 pL from the viewpoint of a printed image with high resolution.

In addition, the droplet amount of the ink droplets can be adjusted by selecting the jetting conditions in the ink jet method as appropriate depending on the ink composition to be jetted.

[Heating and Fixing Step]

In the image recording method, it is preferable that a heating and fixing step of heating and fixing an image recorded by the pre-treatment step and the image recording step is further provided. An image on the substrate is fixed and the rub resistance of the image is further improved by performing such heating and fixing.

In a case where the ink composition contains resin particles, it is preferable that the heating in the heating and fixing step is performed at a temperature higher than or equal to the minimum filming temperature (MFT) of the resin particles in the image. In a case where the heating is performed at MFT or higher, the resin particles are formed into a film so that the rub resistance of the image is improved.

In a case where an image is heated and pressed at the same time, the pressure at the time of pressing the image is preferably in a range of 0.1 MPa to 3.0 MPa, more preferably in a range of 0.1 MPa to 1.0 MPa, and still more preferably in a range of 0.1 MPa to 0.5 MPa from the viewpoint of making the surface smooth.

The heating method is not particularly limited, and preferred examples thereof include drying methods in a non-contact manner such as a heating method using a heating element such as a nichrome wire heater, a method of supplying warm air or hot air, and a heating method using a halogen lamp and an infrared lamp.

Further, the heating and pressing method is not particularly limited, and preferred examples thereof include methods of performing heating and fixing in a contact manner such as a method of pressing a hot plate to a surface of the substrate on which an image is recorded; and a method of passing a pair of rollers or the like using a heating and pressing device that includes a pair of heating and pressing rollers, a pair of heating and pressing belts, or a heating and pressing belt disposed on a surface side of the substrate on which an image is recorded and a holding roller disposed on the opposite side of the surface.

In a case of the heating and the pressing, the nip time is preferably in a range of 1 millisecond to 10 seconds, more preferably in a range of 2 milliseconds to 1 second, and still more preferably in a range of 4 milliseconds to 100 milliseconds. Further, the nip width is preferably in a range of 0.1 mm to 100 mm, more preferably in a range of 0.5 mm to 50 mm, and still more preferably in a range of 1 mm to 10 mm.

As a heating and pressing roller, a metal roller made of a metal or a roller provided with a coating layer that has an elastic member in the vicinity of a core metal made of a metal and a surface layer (or also referred to as a release layer) as necessary may be used. The core metal can be formed of a cylindrical body made of iron, aluminum, stainless steel (SUS), and the like, and it is preferable that at least a part of the surface of the core metal is coated with the coating layer. Particularly, it is preferable that the coating layer is formed of a silicone resin or a fluorine resin having release properties. Further, it is preferable that a heating element is included in the inside of a core metal of one heating and pressing roller, and the heat treatment and the pressure treatment may be performed at the same time by passing the substrate between the rollers or the heating treatment may be performed by interposing the substrate between two heating rollers as necessary. As the heating element, a halogen lamp heater, a ceramic heater, and a nichrome wire are preferable.

As a belt substrate that forms a heating and pressing belt used for a heating and pressing device, seamless electro-formed nickel is preferable and the thickness of the substrate is preferably in a range of 10 µm to 100 µm. Further, aluminum, iron, and polyethylene other than nickel can be used as the material of the belt substrate. In a case where a silicone resin or a fluorine resin is provided, the thickness of a layer to be formed using these resins is preferably in a range of 1 µm to 50 µm and more preferably in a range of 10 µm to 30 µm.

In order to realize the pressure (nip pressure), an elastic member such as a sprint having a tensile force may be selected and then disposed on both ends of a roller such as a heating and pressing roller such that a desired nip pressure can be obtained by considering the nip gap.

The conveying speed of the substrate in a case of using a heating and pressing roller or a heating and pressing belt is preferably in a range of 200 mm/sec to 700 mm/sec, more preferably in a range of 300 mm/sec to 650 mm/sec, and still more preferably in a range of 400 mm/sec to 600 mm/sec.

EXAMPLES

Hereinafter, the present invention will be described in more detail with reference to the following examples, but the present invention is not limited to the following examples unless the present invention departs from the scope thereof.

Further, the notation "-" in Table 1 indicates that the component is not contained.

(Synthesis Example of Water-Insoluble Resin Particles A-1)

1.5 g of a sodium dodecyl benzene sulfonate (62 mass % aqueous solution, manufactured by Tokyo Chemical Industry Co., Ltd.) and 310 g of water were added to a 1000 mL three-neck flask provided with a stirrer and a cooling pipe and then heated to 90° C. in a nitrogen atmosphere. A solution A obtained by dissolving 4.14 g of a 50 mass % aqueous solution (manufactured by Sigma-Aldrich Co. LLC.) of sodium 2-acrylamide-2-methylpropane sulfonate (AMPSANa) in 20 g of water, a solution B obtained by mixing 26.89 g of methyl methacrylate (MMA: manufactured by Wako Pure Chemical Industries, Ltd.) and 12.41 g of styrene (St: manufactured by Wako Pure Chemical Industries, Ltd.), and a solution C obtained by dissolving 6.0 g of sodium persulfate (manufactured by Wako Pure Chemical Industries, Ltd.) in 40 g of water were added dropwise to the mixed solution in the heated three-neck flask for 3 hours at the same time. After the dropwise addition, the solution was reacted for 3 hours, thereby synthesizing 410 g of an aqueous dispersion liquid of water-insoluble resin particles A-1 (the amount of the solid content in the water-insoluble resin particles: 10.2% by mass).

The volume average particle diameter of the water-insoluble resin particles A-1 in the aqueous dispersion liquid was 30 nm. The weight-average molecular weight of the water-insoluble resin in the water-insoluble resin particles A-1 was 32000.

The volume average particle diameter was acquired by performing measurement on the aqueous dispersion liquid of the water-insoluble resin particles, adjusted such that the concentration of solid contents was set to 10% by mass, at a liquid temperature of 25° C. using a nanotrac particle size distribution measurement apparatus UPA-EX150 (manufactured by Nikkiso Co., Ltd.) according to a dynamic light scattering method.

The weight-average molecular weight was measured using gel permeation chromatography (GPC).

Specifically, according to GPC, HLC (registered trademark)-8220GPC (manufactured by TOSOH CORPORATION) was used as a measuring device, three columns of TSKgel, Super Multipore HZ-H (manufactured by TOSOH CORPORATION, 4.6 mmID×15 cm) were used as columns, and tetrahydrofuran (THF) was used as an eluent. The weight-average molecular weight was measured under conditions of a sample concentration of 0.45% by mass, a flow rate of 0.35 mL/min, a sample injection amount of 10 µl, and a measurement temperature of 40° C. using a refractive index (RI) detector. Further, the calibration curve was created from 8 samples of "standard samples TSK standard, polystyrene", which are "F-40", "F-20", "F-4", "F-1", "A-5000", "A-2500", "A-1000", and "n-propylbenzene".

(Synthesis of Water-Insoluble Resin Particles A-2 to A-20 and A-23 to A-25)

The aqueous dispersion liquids of the water-insoluble resin particles A-2 to A-20 and A-23 were synthesized in the same manner as that for the synthesis of the aqueous dispersion liquid of the water-insoluble resin particles A-1 except that the amount of the raw material monomer was changed as listed in Table 1 in the synthesis of the aqueous dispersion liquid of the water-insoluble resin particles A-1, and the volume average particle diameters and the weight-average molecular weights were measured. The measurement results are listed in Tables 5 to 7.

Further, the amounts of the solid contents of the water-insoluble resin particles A-2 to A-20 and A-23 in the aqueous dispersion liquid were respectively in a range of 9.5% by mass to 10.5% by mass.

(Synthesis Example of Water-Insoluble Resin Particles A-21)

1.5 g of a sodium dodecyl benzene sulfonate (62 mass % aqueous solution, manufactured by Tokyo Chemical Industry Co., Ltd.) and 130 g of water were added to a 500 mL three-neck flask provided with a stirrer and a cooling pipe and then heated to 90° C. in a nitrogen atmosphere. A solution A obtained by dissolving 8.27 g of a 50 mass % aqueous solution (manufactured by Sigma-Aldrich Co. LLC.) of sodium 2-acrylamide-2-methylpropane sulfonate (AMPSANa) in 20 g of water, a solution B obtained by mixing 22.75 g of methyl methacrylate (MMA: manufactured by Wako Pure Chemical Industries, Ltd.), 2.07 g of methacrylic acid (manufactured by Wako Pure Chemical Industries, Ltd.), 12.41 g of styrene, and 0.708 g of dodecanethiol (chain transfer agent), and a solution C obtained by dissolving 6.0 g of sodium persulfate (manufactured by Wako Pure Chemical Industries, Ltd.) in 40 g of water were added dropwise to the mixed solution in the heated three-neck flask for 3 hours at the same time. After the dropwise addition, the solution was reacted for 3 hours, thereby synthesizing 239 g of an aqueous dispersion liquid of water-insoluble resin particles A-22 (the amount of the solid content in the water-insoluble resin particles: 19.6% by mass). The measurement results of the volume average particle diameter and the weight-average molecular weight are listed in Table 6. The volume average particle diameter and the weight-average molecular weight were measured according to the same method as in the case of the aqueous dispersion liquid of the water-insoluble resin particles A-1.

(Synthesis of Water-Insoluble Resin Particles A-22)

The aqueous dispersion liquid (the amount of the solid content in the water-insoluble resin particles: 19.8% by mass) of the water-insoluble resin particles A-22 was synthesized in the same manner as that for the synthesis of the aqueous dispersion liquid of the water-insoluble resin particles A-21 except that the amount of the raw material monomer was changed as listed in Table 1 in the synthesis of the aqueous dispersion liquid of the water-insoluble resin particles A-21, and the volume average particle diameters and the weight-average molecular weights were measured. The measurement results are listed in Table 6.

(Synthesis of Water-Soluble Resin X-1)

150 g of water was added to a 500 mL three-neck flask provided with a stirrer and a cooling pipe and heated to 80° C. in a nitrogen atmosphere. A solution A obtained by dissolving 3.60 g of sodium persulfate and 57.91 g of a 50 mass % aqueous solution of sodium 2-acrylamide-2-methylpropane sulfonate (AMPSANa) in 45 g of water and 12.41 g of methyl methacrylate (MMA: manufactured by Wako Pure Chemical Industries, Ltd.) (solution B) were added dropwise to the heated water for 2 hours at the same time. After the dropwise addition, 1.3 g of sodium persulfate was added thereto and further reacted for 3 hours, thereby obtaining an aqueous solution of a water-soluble resin X-1 with the following structure. Further, the amount of the solid content of the water-soluble resin in the aqueous solution was 16.2% by mass.

The weight-average molecular weight of the water-soluble resin X-1 in the aqueous solution was 27000. The weight-average molecular weight was measured according to the same method as in the case of the aqueous dispersion liquid of the water-insoluble resin particles A-1.

Further, the particle diameter of the water-soluble resin X-1 was not detected from the measurement of the volume average particle diameter.

(Synthesis of Water-Insoluble Resin Particles X-2 to X-4)

The aqueous dispersion liquids of the water-insoluble resin particles X-2 to X-4 were prepared in the same manner as that for the preparation of the aqueous dispersion liquid of the water-insoluble resin particles A-1 except that the amount of the raw material monomer was changed as listed in Table 1 in the preparation of the aqueous dispersion liquid of the water-insoluble resin particles A-1, and the volume average particle diameters and the weight-average molecular weights were measured. The measurement results are listed in Table 7.

Further, the amounts of the solid contents of the water-insoluble resin particles X-2 to X-4 in the aqueous dispersion liquid were respectively in a range of 15.0% by mass to 17.0% by mass.

TABLE 1

| Water-insoluble resin | Solution A (g) | | | Solution B (g) | | | | | |
|---|---|---|---|---|---|---|---|---|---|
| | AMPSANa (50% by mass) | AMPSA (50% by mass) | 3SPK | MMA | St | CHMA | DCPMA | BZMA | StSNa |
| A-1 | 4.14 | — | — | 26.89 | 12.41 | — | — | — | — |
| A-2 | 8.27 | — | — | 24.82 | 12.41 | — | — | — | — |
| A-3 | 16.55 | — | — | 20.68 | 12.41 | — | — | — | — |
| A-4 | 20.68 | — | — | 18.62 | 12.41 | — | — | — | — |
| A-5 | 24.82 | — | — | 16.55 | 12.41 | — | — | — | — |
| A-6 | — | 16.55 | — | 20.68 | 12.41 | — | — | — | — |
| A-7 | 16.55 | — | — | 31.03 | 2.07 | — | — | — | — |
| A-8 | 16.55 | — | — | 28.96 | 4.14 | — | — | — | — |
| A-9 | 16.55 | — | — | 24.82 | 8.27 | — | — | — | — |
| A-10 | 16.55 | — | — | 16.55 | 16.55 | — | — | — | — |
| A-11 | 16.55 | — | — | 8.27 | 24.82 | — | — | — | — |
| A-12 | 16.55 | — | — | — | 33.09 | — | — | — | — |
| A-13 | 16.55 | — | — | 20.68 | — | 12.41 | — | — | — |
| A-14 | 16.55 | — | — | 20.68 | — | — | 12.41 | — | — |
| A-15 | 16.55 | — | — | 20.68 | — | — | — | 12.41 | — |
| A-16 | — | — | 16.55 | 20.68 | 12.41 | — | — | — | — |
| A-17 | — | — | — | 20.68 | 12.41 | — | — | — | 8.27 |
| A-18 | 16.55 | — | — | — | 12.41 | — | — | — | — |
| A-19 | 16.55 | — | — | 16.55 | 12.41 | — | — | — | — |
| A-20 | 16.55 | — | — | 16.55 | 12.41 | — | — | — | — |
| A-21 | 8.27 | — | — | 22.75 | 12.41 | — | — | — | — |
| A-22 | 8.27 | — | — | 8.27 | 12.41 | — | — | — | — |
| A-23 | 24.82 | — | — | 20.68 | 4.14 | — | — | — | — |
| A-24 | 16.54 | — | — | 28.96 | — | — | — | — | — |
| A-25 | 16.54 | — | — | 20.68 | — | — | — | — | — |
| X-1 | 57.91 | — | — | 12.41 | — | — | — | — | — |
| X-2 | 6.62 | — | — | 35.16 | — | — | — | — | — |
| X-3 | 16.55 | — | — | 33.09 | — | — | — | — | — |
| X-4 | — | — | — | 28.96 | — | — | — | 12.41 | — |

TABLE 1-continued

| Water-insoluble resin | Raw material monomer Solution B (g) | | | | | | | |
|---|---|---|---|---|---|---|---|---|
| | EMMA | EA | BA | MA | IBX | PEMA | 2EHA | 2HEMA |
| A-1 | — | — | — | — | — | — | — | — |
| A-2 | — | — | — | — | — | — | — | — |
| A-3 | — | — | — | — | — | — | — | — |
| A-4 | — | — | — | — | — | — | — | — |
| A-5 | — | — | — | — | — | — | — | — |
| A-6 | — | — | — | — | — | — | — | — |
| A-7 | — | — | — | — | — | — | — | — |
| A-8 | — | — | — | — | — | — | — | — |
| A-9 | — | — | — | — | — | — | — | — |
| A-10 | — | — | — | — | — | — | — | — |
| A-11 | — | — | — | — | — | — | — | — |
| A-12 | — | — | — | — | — | — | — | — |
| A-13 | — | — | — | — | — | — | — | — |
| A-14 | — | — | — | — | — | — | — | — |
| A-15 | — | — | — | — | — | — | — | — |
| A-16 | — | — | — | — | — | — | — | — |
| A-17 | — | — | — | — | — | — | — | — |
| A-18 | 16.55 | — | — | — | — | — | — | — |
| A-19 | — | 4.14 | — | — | — | — | — | — |
| A-20 | — | — | 4.14 | — | — | — | — | — |
| A-21 | — | — | — | 2.07 | — | — | — | — |
| A-22 | — | — | — | 16.55 | — | — | — | — |
| A-23 | — | — | — | — | — | — | — | 4.14 |
| A-24 | — | — | — | — | 4.14 | — | — | — |
| A-25 | — | — | — | — | — | 12.41 | — | — |
| X-1 | — | — | — | — | — | — | — | — |
| X-2 | — | — | — | — | — | — | 2.48 | — |
| X-3 | — | — | — | — | — | — | — | — |
| X-4 | — | — | — | — | — | — | — | — |

The details of the components listed in Table 1 are described below.

TABLE 2

| | |
|---|---|
| AMPSANa | Sodium 2-acrylamide-2-methylpropane sulfonate (50 mass % aqueous solution, manufactured by Sigma-Aldrich Co. LLC.; constitutional unit represented by Formula 1) |
| AMPSA | 2-acrylamide-2-methylpropane sulfonic acid (50 mass % aqueous solution (diluted to 50% with water), manufactured by Tokyo Chemical Industry Co., Ltd.; constitutional unit represented by Formula 1) |
| 3SPK | 3-sulfopropyl potassium methacrylate (manufactured by Tokyo Chemical Industry Co., Ltd.; constitutional unit represented by Formula 1) |
| MMA | Methyl methacrylate (manufactured by Mitsubishi Gas Chemical Company) |
| St | Styrene (manufactured by Tokyo Chemical Industry Co., Ltd.; constitutional unit represented by Formula 1) |
| CHMA | Cyclohexyl methacrylate (manufactured by Tokyo Chemical Industry Co., Ltd.; constitutional unit represented by Formula C) |
| DCPMA | Dicyclopentadienyl methacrylate (manufactured by Tokyo Chemical Industry Co., Ltd.; constitutional unit represented by Formula E) |
| BZMA | Benzyl methacrylate (manufactured by Tokyo Chemical Industry Co., Ltd.; constitutional unit represented by Formula B) |
| StSANa | Sodium styrene sulfonate (manufactured by Tokyo Chemical Industry Co., Ltd.; constitutional unit represented by Formula A) |
| EMMA | Ethyl methyl methacrylate (manufactured by Tokyo Chemical Industry Co., Ltd.) |
| EA | Ethyl acrylate (manufactured by Tokyo Chemical Industry Co., Ltd.) |
| BA | Butyl acrylate (manufactured by Tokyo Chemical Industry Co., Ltd.) |
| MA | Methacrylic acid (manufactured by Mitsubishi Gas Chemical Company) |
| 2EHA | 2-ethylhexyl acrylate (manufactured by Tokyo Chemical Industry Co., Ltd.) |
| 2HEMA | 2-hydroxyethyl methacrylate (manufactured by Tokyo Chemical Industry Co., Ltd.) |
| IBX | Isobornyl methacrylate (manufactured by KYOEISHA CHEMICAL Co., Ltd.) |
| PEMA | Phenoxy ethyl methacrylate (manufactured by Tokyo Chemical Industry Co., Ltd.) |

The respective structures of the water-insoluble resin particles X-1 to X4 are shown below. The numerical value in the structure represents parts by mass of each constitutional unit.

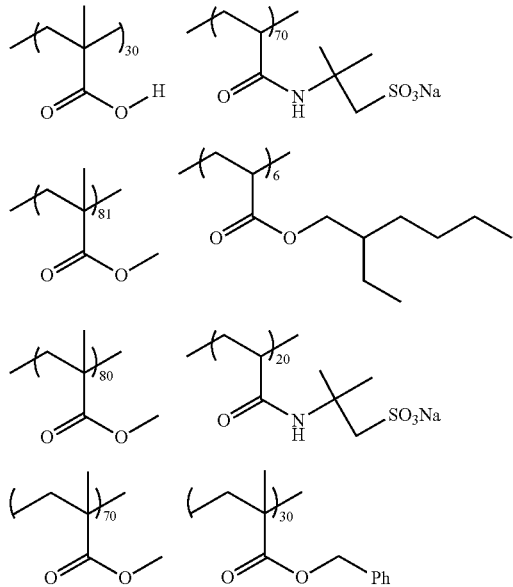

X-1

X-2

X-3

X-4

<Preparation of Treatment Liquid>
(Preparation of Treatment Liquids A1 to A27 and AX1 to AX4) Respective components in the following compositions were mixed to prepare treatment liquids A1 to A27 and treatment liquids AX1- to AX4 for comparison.
<Compositions of Treatment Liquids A1 to A27 and Ax1 to AX4>
Diethylene glycol monoethyl ether . . . 6.0% by mass
1,4-Butanediol . . . 2.5% by mass
Malonic acid (aggregation component: organic acidic compound) . . . 17.3% by mass
Propanetricarboxylic acid (aggregation component: organic acidic compound) . . . 4.3% by mass
Phosphoric acid (aggregation component: inorganic acidic compound) . . . 4.3% by mass Aqueous dispersion liquid or water-soluble resin of water-insoluble resin particles listed in Tables 5 to 7 . . . amounts listed in Tables 5 to 7
Benzotriazole . . . 1% by mass
Anti-foaming agent . . . 100 ppm as amount of silicone oil (manufactured by Momentive Performance Materials Inc., TSA-739 (solid content of 15% by mass), emulsion type silicon anti-foaming agent)
Ion exchange water . . . 100% by mass as residual amount in total
(Preparation of Treatment Liquid B)
Respective components in the following composition were mixed to prepare a treatment liquid B.
<Composition of Treatment Liquid B>
Dicyandiamide and formalin polycondensate . . . 10% by mass
(weight-average molecular weight of 3000, aggregation component: cationic compound)
Glycerin . . . 5% by mass
Ethylene glycol . . . 15% by mass IONET D46 . . . 1% by mass (SANYO CHEMICAL INDUSTRIES, LTD., quaternary ammonium cationic surfactant)
Sodium benzoate . . . 1% by mass
Triethanolamine . . . 0.7% by mass
Aqueous dispersion liquid of water-insoluble resin particles listed in Table 7 . . . amounts listed in Table 7
Ion exchange water . . . 100% by mass as residual amount in total
(Preparation of Treatment Liquid C)
Respective components in the following composition were mixed to prepare a treatment liquid C.
<Composition of Treatment Liquid C>
Calcium chloride (aggregation component: polyvalent metal salt) . . . 10% by mass
3-Methoxy-3-methyl-1-butanol . . . 5% by mass
Glycerin . . . 30% by mass
EMULGEN 108 . . . 1% by mass
(manufactured by Kao Corporation, surfactant, polyoxyethylene lauryl ether)
PROXEL x1-2(s) (manufactured by Lonza, preservative) . . . 0.2% by mass
Aqueous dispersion liquid of water-insoluble resin particles listed in Table 7 . . . amounts listed in Table 7
Ion exchange water . . . 100% by mass as residual amount in total
(Preparation of Treatment Liquid D)
Respective components in the following composition were mixed to prepare a treatment liquid D.
<Composition of Treatment Liquid D>
Diethylene glycol monoethyl ether . . . 6.0% by mass
1,4-Butanediol . . . 2.5% by mass
Malonic acid (aggregation component: organic acidic compound) . . . 10% by mass
Benzotriazole . . . 1% by mass
Anti-foaming agent . . . 100 ppm as amount of silicone oil
(manufactured by Momentive Performance Materials Inc., TSA-739 (solid content of 15% by mass), emulsion type silicon anti-foaming agent)

Aqueous dispersion liquid of water-insoluble resin particles listed in Table 7 . . . amounts listed in Table 7

Ion exchange water . . . 100% by mass as residual amount in total (Preparation of Treatment Liquid E)

Respective components in the following composition were mixed to prepare a treatment liquid E.

<Composition of Treatment Liquid E>

Diethylene glycol monoethyl ether . . . 6.0% by mass 1,4-Butanediol . . . 2.5% by mass Malonic acid (aggregation component: organic acidic compound) . . . 5% by mass Benzotriazole . . . 1% by mass Anti-foaming agent . . . 100 ppm as amount of silicone oil (manufactured by Momentive Performance Materials Inc., TSA-739 (solid content of 15% by mass), emulsion type silicon anti-foaming agent)

Aqueous dispersion liquid of water-insoluble resin particles listed in Table 7 . . . amounts listed in Table 7

Ion exchange water . . . 100% by mass as residual amount in total (Preparation of Treatment Liquid F)

Respective components in the following composition were mixed to prepare a treatment liquid F.

<Composition of Treatment Liquid F>

Diethylene glycol monoethyl ether . . . 6.0% by mass 1,4-Butanediol . . . 2.5% by mass Malonic acid (aggregation component: organic acidic compound) . . . 3% by mass Benzotriazole . . . 1% by mass Anti-foaming agent . . . 100 ppm as amount of silicone oil (manufactured by Momentive Performance Materials Inc., TSA-739 (solid content of 15% by mass), emulsion type silicon anti-foaming agent)

Aqueous dispersion liquid of water-insoluble resin particles listed in Table 7 . . . amounts listed in Table 7

Ion exchange water . . . 100% by mass as residual amount in total

The pH, the surface tension, and the viscosity of each of the treatment liquids A1 to A27, AX1 to AX4, and B to F are as follows.

Further, the pH was measured using a pH meter WM-50EG (manufactured by DKK-TOA CORPORATION) in an environment of 25° C. in a state in which the temperature of each treatment liquid was adjusted to 25° C. The surface tension was measured under a temperature condition of 25° C. using Automatic Surface Tensiometer CBVP-Z (manufactured by Kyowa Interface Science Co., Ltd.) according to a plate method. The viscosity was measured using VISCOMETER TV-22 (manufactured by TOKI SANGYO CO., LTD.) in a state in which the temperature of each treatment liquid was adjusted to 25° C.

TABLE 3

| | pH | Surface tension [mN/m] | Viscosity [mPa·s] | | pH | Surface tension [mN/m] | Viscosity [mPa·s] |
|---|---|---|---|---|---|---|---|
| A1 | 0.9 | 31 | 2.0 | B | 0.8 | 36 | 3.9 |
| A2 | 0.9 | 33 | 2.5 | C | 7.5 | 32 | 2.7 |
| A3 | 0.8 | 32 | 3.2 | D | 1.5 | 41 | 4.2 |
| A4 | 0.9 | 34 | 4.5 | E | 2.2 | 44 | 4.8 |
| A5 | 0.8 | 31 | 6.2 | F | 4.3 | 42 | 5.2 |
| A6 | 0.6 | 32 | 3.5 | AX1 | 0.7 | 35 | 9.2 |
| A7 | 0.8 | 32 | 3.0 | AX2 | 0.8 | 36 | 5.2 |
| A8 | 0.9 | 33 | 3.1 | AX3 | 0.8 | 34 | 8.1 |
| A9 | 0.8 | 35 | 2.8 | AX4 | 0.8 | 32 | 2.5 |
| A10 | 0.8 | 32 | 2.9 | | | | |

TABLE 3-continued

| | pH | Surface tension [mN/m] | Viscosity [mPa·s] | | pH | Surface tension [mN/m] | Viscosity [mPa·s] |
|---|---|---|---|---|---|---|---|
| A11 | 0.8 | 33 | 2.8 | | | | |
| A12 | 0.8 | 31 | 2.9 | | | | |
| A13 | 0.8 | 33 | 2.9 | | | | |
| A14 | 0.9 | 36 | 2.9 | | | | |
| A15 | 0.8 | 33 | 3.2 | | | | |
| A16 | 0.8 | 34 | 3.1 | | | | |
| A17 | 0.8 | 32 | 3.1 | | | | |
| A18 | 0.9 | 32 | 3.1 | | | | |
| A19 | 0.9 | 31 | 3.1 | | | | |
| A20 | 0.8 | 31 | 2.5 | | | | |
| A21 | 0.6 | 32 | 2.1 | | | | |
| A22 | 0.6 | 33 | 2.3 | | | | |
| A23 | 0.8 | 33 | 6.4 | | | | |
| A24 | 0.8 | 34 | 5.5 | | | | |
| A25 | 0.8 | 33 | 7.2 | | | | |
| A26 | 0.8 | 33 | 2.1 | | | | |
| A27 | 0.8 | 31 | 4.1 | | | | |

<Preparation of Ink Composition>

(Synthesis of Polymer Dispersing Agent P-1)

A polymer dispersing agent P-1 was synthesized in the following manner according to the following scheme. The numerical values in the structural formula of the polymer dispersing agent P-1 indicate the mass ratios.

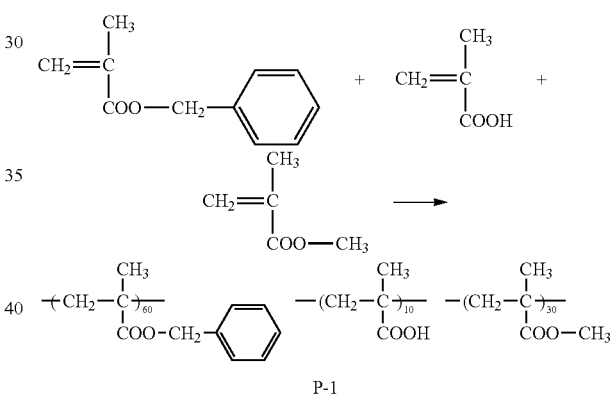

P-1

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise to the three-neck flask for 3 hours. After the dropwise addition, the solution was reacted for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was re-precipitated in an excessive amount of hexane twice, and the deposited resin was dried, thereby obtaining 96 g of a polymer dispersing agent P-1 (benzyl methacrylate:methacrylic acid:methyl methacrylate (mass ratio)=60:10:30).

The composition of the obtained polymer dispersing agent P-1 was confirmed using proton nuclear magnetic resonance spectroscopy ($^1$H-NMR), and the weight-average molecular weight (Mw) acquired by GPC was 44600. Further, the acid value acquired by the method described in JIS standard (JISK0070:1992) was 65.2 mgKOH/g.

(Preparation of Pigment Dispersion Liquid)

—Preparation of Cyan Dispersion Liquid—

10 parts by mass of Pigment Blue 15:3 (phthalocyanine blue A220, manufactured by Dainichiseika Color & Chemicals Mfg. Co., Ltd.) which is a cyan pigment, 5 parts by mass of a polymer dispersing agent P-1, 42 parts by mass of methyl ethyl ketone, 5.5 parts by mass of a $1 \times 10^3$ mol/L NaOH aqueous solution, and 87.2 parts by mass of ion exchange water were mixed and dispersed using zirconia beads having a diameter of 0.1 mm for 2 to 6 hours by utilizing a bead mill.

After methyl ethyl ketone was removed and some water was removed from the obtained dispersion under reduced pressure at 55° C., a centrifugation treatment was performed at 8000 rpm for 30 minutes using a high-speed centrifugal cooling machine 7550 (manufactured by KUBOTA CORPORATION) and a 50 mL centrifuge pipe. After the stretching treatment, the supernatant other than the precipitate was recovered. Thereafter, the pigment concentration was acquired from the absorbance spectrum and then a dispersion (a cyan dispersion liquid C) of resin-coated pigment particles (a pigment coated with a polymer dispersing agent) having a pigment concentration of 10.2% by mass was obtained.

The volume average particle diameter of the resin-coated pigment particles of the cyan dispersion liquid C was 105 nm. The volume average particle diameter was acquired by performing measurement on the dispersion of the water-insoluble resin particles, adjusted such that the concentration of solid contents was set to 10% by mass, at a liquid temperature of 25° C. using a nanotrac particle size distribution measurement apparatus UPA-EX150 (manufactured by Nikkiso Co., Ltd.) according to a dynamic light scattering method.

—Preparation of Magenta Dispersion Liquid—

A dispersion (a magenta dispersion liquid M) of resin-coated pigment particles (a pigment coated with a polymer dispersing agent) was prepared in the same manner as in the preparation of the cyan dispersion liquid except that Pigment Red 122 (chromofine red, manufactured by Dainichiseika Color & Chemicals Mfg. Co., Ltd.) which is a magenta pigment was used in place of Pigment Blue 15:3 (phthalocyanine blue A220, manufactured by Dainichiseika Color & Chemicals Mfg. Co., Ltd.).

The volume average particle diameter of the resin-coated pigment particles of the magenta dispersion liquid M was 85 nm. Further, the volume average particle diameter was measured according to the same method used for the measurement of the volume average particle diameter of the resin-coated pigment particles of the cyan dispersion liquid C.

—Preparation of Yellow Dispersion Liquid—

A dispersion (a yellow dispersion liquid Y) of resin-coated pigment particles (a pigment coated with a polymer dispersing agent) was prepared according to the same method used for the preparation of the cyan dispersion liquid except that Pigment Yellow 74 (chromofine yellow, manufactured by Dainichiseika Color & Chemicals Mfg. Co., Ltd.) which is a yellow pigment was used in place of Pigment Blue 15:3 (phthalocyanine blue A220, manufactured by Dainichiseika Color & Chemicals Mfg. Co., Ltd.).

The volume average particle diameter of the resin-coated pigment particles of the yellow dispersion liquid Y was 82 nm. Further, the volume average particle diameter was measured according to the same method used for the measurement of the volume average particle diameter of the resin-coated pigment particles of the cyan dispersion liquid C.

—Preparation of Black Dispersion Liquid—

A dispersion (a black dispersion liquid K) of resin-coated pigment particles (a pigment coated with a polymer dispersing agent) was prepared according to the same method used for the preparation of the cyan dispersion liquid except that carbon black (manufactured by Orion Engineered Carbons, NIPEX160-IQ) which is a black pigment was used in place of Pigment Blue 15:3 (phthalocyanine blue A220, manufactured by Dainichiseika Color & Chemicals Mfg. Co., Ltd.).

The volume average particle diameter of the resin-coated pigment particles of the black dispersion liquid K was 130 nm. Further, the volume average particle diameter was measured according to the same method used for the measurement of the volume average particle diameter of the resin-coated pigment particles of the cyan dispersion liquid C.

(Preparation of Resin Particles)

293 g of methyl ethyl ketone was put into a 2 L three-neck flask provided with a stirrer, a thermometer, a reflux cooling pipe, and a nitrogen gas introduction pipe and heated to 80° C. While the temperature inside the reaction container was maintained to 80° C., a mixed solution formed of 165.7 g of methyl methacrylate (manufactured by Mitsubishi Gas Chemical Company), 63.7 g of isoboronyl methacrylate (manufactured by KYOEISHA CHEMICAL Co., Ltd.), 25.5 g of methacrylic acid (manufactured by Mitsubishi Gas Chemical Company), 48 g of methyl ethyl ketone, and 1.25 g of "V-601" (manufactured by Wako Pure Chemical Industries, Ltd., polymerization initiator) was added dropwise at a constant speed such that the dropwise addition was completed within 2 hours. After the dropwise addition was completed, (1) a solution formed by mixing 0.60 g of "V-601" and 5.0 g of methyl ethyl ketone was added thereto, and the solution was stirred for 2 hours. Thereafter, the step of (1) was repeatedly performed four times, a solution formed by mixing 0.60 g of "V-601" and 5.0 g of methyl ethyl ketone was added thereto, and the solution was stirred for 3 hours. In this manner, a polymer solution was prepared.

The weight-average molecular weight (Mw) of the copolymer in the polymer solution was 72000 and the acid value thereof was 62.9 mgKOH/g.

The acid value was measured in conformity with the method described in Japanese Industrial Standards (JIS K0070: 1992). The weight-average molecular weight was measured according to the method described above using GPC.

Next, 588.2 g of a polymer solution was weighed, 165 g of isopropanol and 120.8 mL of a 1 mol/L sodium hydroxide (NaOH) aqueous solution was added thereto, and the temperature inside of the reaction container was heated to 80° C. Next, 718.0 g of distilled water was added dropwise to the reaction solution at a rate of 20 mL/min and dispersed in water (water dispersion). Thereafter, the temperature inside the reaction container was maintained at 80° C. for 2 hours, 85° C. for 2 hours, and 90° C. for 2 hours under the atmospheric pressure, the pressure inside the reaction container was reduced, and 913.7 g of isopropanol, methyl ethyl ketone, and distilled water in total were distilled off, thereby obtaining an aqueous dispersion (emulsion) of resin particles (B-01) having a concentration of solid contents of 23.0% by mass.

Further, the numerical values of each constitutional unit of the resin particles (B-01) shown below indicate the mass ratios.

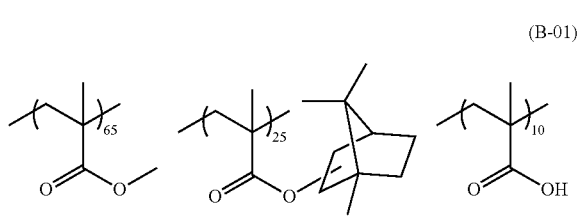

(B-01)

(Preparation of Ink 1)

Respective components were mixed to obtained the ink compositions listed in Table 4 and four ink compositions (magenta ink composition M1, cyan ink composition C1, yellow ink composition Y1, and black ink composition K1) were respectively prepared using each of the pigment dispersion liquids obtained in the above-described manner (cyan dispersion liquid C, magenta dispersion liquid M, yellow dispersion liquid Y, black dispersion liquid K), and resin particles (B-01), thereby preparing an ink 1 formed of four ink compositions.

The pHs (25° C.) of the magenta ink M1, the cyan ink C1, the yellow ink Y1, and the black ink K1 which was measured according to the same method used for the pH of the treatment liquid were respectively 8.1, 8.3, 8.0, and 8.2.

TABLE 4

| | | Ink 1 | | | |
|---|---|---|---|---|---|
| | Ink composition | M1 | K1 | C1 | Y1 |
| Ink composition (% by mass) | Magenta pigment (Pigment Red 122) | 4 | — | — | — |
| | Black pigment (carbon black) | — | 4 | — | — |
| | Cyan pigment (Pigment Blue 15:3) | — | — | 4 | — |
| | Yellow Pigment (Pigment Yellow 74) | — | — | — | 4 |
| | Pigment dispersing agent (polymer dispersing agent P-1) | 2 | 2 | 2 | 2 |
| | SANNIX GP-250 | 10 | 10 | 10 | 10 |
| | Tripropylene glycol monomethyl ether | 5 | 5 | 5 | 5 |
| | Olefin E1010 | 1 | 1 | 1 | 1 |
| | Resin particles (B-01) | 8 | 8 | 8 | 8 |
| | water | 70 | 70 | 70 | 70 |

The details of the components listed in Table 4 are as follows.
SANNIX GP-250 . . . organic solvent (manufactured by SANYO CHEMICAL INDUSTRIES, LTD.)
OLFINE E1010 . . . non-ionic surfactant (manufactured by Nissin Chemical Industry Co., Ltd.)

Examples 1 to 32 and Comparative Examples 1 to 4

<Ink Set>

Ink sets 1 to 25 and ink sets X1 to X4 obtained by combining each of the inks 1 (magenta ink composition M1, black ink composition K1, cyan ink composition C1, and yellow ink composition Y1) with each of the treatment liquids (treatment liquids A1 to A27, treatment liquids B to F, and treatment liquids AX-1 to AX4 for comparison) were prepared.

Images were recorded according to the following procedures using these ink sets and the recorded images were evaluated according to the following method.

<Image Recording>

An image was recorded under the following conditions using coated paper (CartaIntegra, manufactured by Metsaboard, having a water contact angle of 74° or greater when 3 seconds have elapsed from application of water droplets to the surface) as a substrate. In the image recording, ink jetting was set to be started within 10 seconds after the treatment liquid was applied.

Further, the contact angle between the substrate and water was measured using a contact angle meter DROP MASTER DM700 (manufactured by Kyowa Interface Science Co., Ltd.) in conformity with the method described in Japanese Industrial Standards (JIS R3257). The amount of water droplets was set to 2 μL and the contact angle of the substrate was measured when 3 seconds elapsed after water droplets had impacted on the surface of the substrate.

—Pre-Treatment Step—

The substrate was coated with the treatment liquid using a coating bar immediately before the ink was applied to the substrate. The substrate was coated with the treatment liquid such that the coating amount thereof was set to 1.7 g/m².

The expression "the substrate was coated with the treatment liquid immediately before the ink was applied" means that the substrate was coated with the treatment liquid whenever an image was recorded in the image recording step.

Next, the treatment liquid applied to the substrate was dried under the following conditions.

<Conditions for Drying Treatment>
Wind speed: 15 m/s
Temperature and heating method: The treatment liquid was heated using a contact-type planar heater from the rear surface (the surface on the side where the treatment liquid was not applied) of the substrate such that the surface temperature (the temperature of the surface on the side where the treatment liquid was applied) of the substrate was set to 60°.
Blast area: 450 mm (drying time of 0.7 seconds)
—Image Recording Step—

An image was recording using a method of recording an image by jetting four colors of inks onto a surface of the substrate, to which the treatment liquid had been applied, through a single path under the following conditions. Specifically, a polychromic image (including a solid image area with each color and a secondary color image) was recorded by jetting an ink with each color onto the treatment liquid applied to the substrate under the following conditions.
<Conditions>
Head: head formed by disposing four piezo full line heads of 1200 dpi (dots per inch)/20 inch width
Amount of liquid droplets to be jetted: 2.4 pL
Drive frequency: 30 kHz (conveying speed of substrate: 635 mm/sec).

Next, the ink applied to the substrate was dried under the following conditions.

<Conditions for Drying Ink>
Wind speed: 15 m/s
Temperature and heating method: The rear surface (the surface on the side where the ink was not applied) of the substrate was heated using a contact-type planar heater such that the surface temperature (the temperature of the surface on the side where the ink was applied) of the substrate was set to 60°.
Blast area: 640 mm (drying time: 1 second)
—Heating and Fixing Step—
An image recorded by jetting the ink in the above-described manner was heated and fixed under the following conditions using a silicon rubber roller (hardness: 50°, nip width: 5 mm). In this manner, an image sample having a substrate on which an image was recorded was obtained.
<Conditions of Heating and Fixing>
Roller temperature: 90°
Pressure (nip pressure): 0.8 MPa
<Evaluation>
The following evaluations were performed on samples obtained in the above-described manner. The evaluation results are listed in Tables 5 and 7.
—1. Density of Solid Image Area—
The density of a black solid image area in the image sample was measured with visual (V) density using spectrophotometer SPECTROEYE (manufactured by Sakata Inx Eng. Co., Ltd.).

In a case where the liquid droplet size of the ink droplets (ink dots) forming an image was small, the density of the solid image area was affected by the white background of the substrate so that the density appeared to be low. Further, in a case where the aggregating properties of the dispersion component in the ink due to the treatment liquid were degraded, interference occurred between ink dots adjacent to each other, the white background of the substrate was easily seen, and thus the density appeared to be low. Therefore, the density thereof appeared to be low. Further, the ranks 3 to 6 in the following evaluation standard are practically acceptable levels.
<Evaluation Standard>
6: The density of the solid image area in the image sample was greater than 2.0.
5: The density of the solid image area in the image sample was greater than 1.9 and 2.0 or less.
4: The density of the solid image area in the image sample was greater than 1.7 and 1.9 or less.
3: The density of the solid image area in the image sample was greater than 1.5 and 1.7 or less.
2: The density of the solid image area in the image sample was greater than 1.3 and 1.5 or less.
1: The density of the solid image area in the image sample was 1.3 or less.
—2. Graininess of Image—
The secondary color image areas in the image samples obtained in the above-described image recording step were visually observed, and the graininess of the images was evaluated based on the following standard.

In the image recording step, a magenta ink M1 was applied to the coated treatment liquid in a solid state to form a magenta solid image, a cyan ink C1 was applied to the obtained magenta solid image in the form of halftone dots such that the halftone dot area rate was set to be in a range of 50% to 80%, and the heating and fixing treatment was performed in the heating and fixing step, thereby obtaining a secondary color image area.

Further, the "graininess" indicates a phenomenon in which extremely small density unevenness occurs in an image so that the uniformity of pixels is degraded due to coalescence of liquid droplets after an ink composition is impacted on a substrate.
<Evaluation Standard>
5: Graininess was not found in the entire image and the surface of the image was uniform.
4: Graininess was extremely slightly found, but the surface of the image was almost uniform as a whole.
3: Graininess was slightly found, which was not acceptable in practical use.
2: Graininess was conspicuous, which was not acceptable in practical use.
1: Graininess with strong shading largely occurred and the surface of the image was not uniform, which was not acceptable in practical use.
—3. Streak Unevenness—
In the image recording step, a cyan ink C1 was applied to the coated treatment liquid in a solid state to form a cyan solid image, the image was visually observed, and the presence or absence of occurrence of streak unevenness in the transport direction was confirmed. The degree of occurrence of streak unevenness in the image sample was evaluated based on the following standard. Further, the ranks 3 to 5 in the following evaluation standard are practically acceptable levels.

The streak unevenness occurs in a case where the white background of the substrate becomes easily seen due to occurrence of interference between ink dots adjacent to each other.
<Evaluation Standard>
5: Streak unevenness in the image sample was not found.
4: One extremely thin line was visually recognized in the image sample.
3: A plurality of thin lines were found in the image sample.
2: Generation of two or less lines which were easily visually recognized in the image sample was confirmed.
1: Generation of three or more lines which were easily visually recognized in the image sample was confirmed.
—4. Streak Unevenness with Time—
25 g of the treatment liquid corresponding to each example and each comparative example was accommodated in a 30 ml polyethylene bottle. Each bottle accommodating the treatment liquid was stored in a THERMOSEL whose temperature was set to 40° C. for 2 weeks. In the image recording step, a cyan ink C1 was applied to the coated treatment liquid in a solid state to form a cyan solid image using the stored treatment liquid, the image was visually observed, and the presence or absence of occurrence of streak unevenness in the transport direction was confirmed. The degree of occurrence of streak unevenness was evaluated based on the following standard. The streak unevenness occurs in a case where the white background of the substrate becomes easily seen due to occurrence of interference between ink dots adjacent to each other. Further, the ranks 3 to 5 in the following evaluation standard are practically acceptable levels.
<Evaluation Standard>
5: Streak unevenness in the recorded material was not found.
4: One extremely thin line was visually recognized in the recorded material.
3: A plurality of thin lines were found in the recorded material.
2: Generation of two or less lines which were easily visually recognized in the recorded material was confirmed.

1: Generation of three or more lines which were easily visually recognized in the recorded material was confirmed.

—5. Temporal Stability of Treatment Liquid—

25 g of each treatment liquid corresponding to each example and each comparative example was accommodated in a 30 ml polyethylene bottle. Each bottle accommodating the treatment liquid was stored in a THERMOSEL whose temperature was set to 40° C. for 2 weeks. The viscosity of each treatment liquid was measured before and after the storage and the Δ viscosity (mPa·s) was calculated according to the following equation.

Δ Viscosity=(viscosity of treatment liquid after storage at 40° C. for 2 weeks)−(viscosity of treatment liquid before storage)

The viscosity was measured using VISCOMETER TV-22 (manufactured by TOKI SANGYO CO., LTD.) in a state in which the temperature of each treatment liquid was adjusted to 25° C.

The temporal stability of the treatment liquid at 40° C. was evaluated based on the obtained Δ viscosity and the following evaluation standard.

The temporal stability of the treatment liquid became excellent as the value of the Δ viscosity was smaller. Further, the temporal stability of the treatment liquid was degraded as the Δ viscosity was larger. Further, the ranks 3 to 5 in the following evaluation standard are practically acceptable levels.

<Evaluation Standard>

5: The Δ viscosity was 0.1 mPa·s or less.

4: The Δ viscosity was greater than 0.1 mPa·s and 0.4 mPa·s or less.

3: The Δ viscosity was greater than 0.4 mPa·s and 1.0 mPa·s or less.

2: The Δ viscosity was greater than 1.0 mPa·s and 2.0 mPa·s or less.

1: The Δ viscosity was greater than 2.0 mPa·s.

TABLE 5

| | | | | Water-insoluble resin particles/water-insoluble resin | | | | | |
|---|---|---|---|---|---|---|---|---|---|
| | Type of ink set | Type | Content (% by mass) | Constitutional unit derived from first monomer (% by mass) | Constitutional unit derived from second monomer (% by mass) | -Second monomer- ratio of mass of oxygen atoms/molecular weight (% by mass) | Ratio of first monomer/ second monomer (% by mass) | Tg (° C.) | Volume average particle diameter (nm) | Weight-average molecular weight |
| Example 1 | 1 | A-1 | 5 | 5 | 30 | 0 | 0.17 | 111 | 30 (water-insoluble) | 32000 |
| Example 2 | 2 | A-2 | 5 | 10 | 30 | 0 | 0.33 | 110 | 40 (water-insoluble) | 33000 |
| Example 3 | 3 | A-3 | 5 | 20 | 30 | 0 | 0.67 | 108 | 40 (water-insoluble) | 31000 |
| Example 4 | 4 | A-4 | 5 | 25 | 30 | 0 | 0.83 | 107 | 50 (water-insoluble) | 40000 |
| Example 5 | 5 | A-5 | 5 | 30 | 30 | 0 | 1.00 | 107 | 60 (water-insoluble) | 47000 |
| Example 6 | 6 | A-6 | 5 | 20 | 30 | 0 | 0.67 | 107 | 30 (water-insoluble) | 54000 |
| Example 7 | 7 | A-7 | 5 | 20 | 5 | 0 | 4.00 | 105 | 100 (water-insoluble) | 42000 |
| Example 8 | 8 | A-8 | 5 | 20 | 10 | 0 | 2.00 | 101 | 60 (water-insoluble) | 39000 |
| Example 9 | 9 | A-9 | 5 | 20 | 20 | 0 | 1.00 | 104 | 50 (water-insoluble) | 35000 |
| Example 10 | 10 | A-10 | 5 | 20 | 40 | 0 | 0.50 | 104 | 40 (water-insoluble) | 29000 |
| Example 11 | 11 | A-11 | 5 | 20 | 60 | 0 | 0.33 | 104 | 40 (water-insoluble) | 28000 |
| Example 12 | 12 | A-12 | 5 | 20 | 80 | 0 | 0.25 | 101 | 30 (water-insoluble) | 26000 |

| | Aggregation component Content (% by mass) | Water-insoluble resin particle/aggregation component (mass ratio) | Type of treatment liquid | Evaluation result | | | | |
|---|---|---|---|---|---|---|---|---|
| | | | | Density of solid image area | Streak unevenness | Streak unevenness with time | Image graininess | Temporal stability of treatment liquid |
| Example 1 | 25.9 | 0.19 | A1 | 4 | 5 | 5 | 5 | 5 |
| Example 2 | 25.9 | 0.19 | A2 | 5 | 5 | 5 | 5 | 5 |
| Example 3 | 25.9 | 0.19 | A3 | 5 | 5 | 5 | 5 | 5 |
| Example 4 | 25.9 | 0.19 | A4 | 5 | 5 | 5 | 5 | 5 |
| Example 5 | 25.9 | 0.19 | A5 | 3 | 3 | 5 | 4 | 5 |
| Example 6 | 25.9 | 0.19 | A6 | 5 | 5 | 5 | 5 | 5 |
| Example 7 | 25.9 | 0.19 | A7 | 5 | 5 | 3 | 5 | 3 |
| Example 8 | 25.9 | 0.19 | A8 | 5 | 5 | 4 | 5 | 4 |
| Example 9 | 25.9 | 0.19 | A9 | 5 | 5 | 5 | 5 | 5 |
| Example 10 | 25.9 | 0.19 | A10 | 5 | 5 | 5 | 5 | 5 |
| Example 11 | 25.9 | 0.19 | A11 | 4 | 4 | 5 | 5 | 5 |
| Example 12 | 25.9 | 0.19 | A12 | 3 | 4 | 5 | 4 | 5 |

TABLE 6

| | | | | | -Second monomer- ratio of mass of oxygen atoms/molecular weight (% by mass) | | | | |
|---|---|---|---|---|---|---|---|---|---|
| | Type of ink set | Type | Content (% by mass) | Constitutional unit derived from first monomer (% by mass) | Constitutional unit derived from second monomer (% by mass) | | Ratio of first monomer/second monomer (% by mass) | Tg (° C.) | Volume average particle diameter (nm) | Weight-average molecular weight |
| Example 13 | 13 | A-13 | 5 | 20 | 30 | 0.19 | 0.67 | 101 | 50 (water-insoluble) | 39000 |
| Example 14 | 14 | A-14 | 5 | 20 | 30 | 0.16 | 0.67 | 105 | 40 (water-insoluble) | 31000 |
| Example 15 | 15 | A-15 | 5 | 20 | 30 | 0.18 | 0.67 | 100 | 50 (water-insoluble) | 35000 |
| Example 16 | 16 | A-16 | 5 | 20 | 30 | 0 | 0.67 | 100 | 50 (water-insoluble) | 65000 |
| Example 17 | 17 | A-17 | 5 | 20 | 30 | 0 | 0.67 | 102 | 70 (water-insoluble) | 54000 |
| Example 18 | 18 | A-18 | 5 | 20 | 30 | 0 | 0.67 | 95 | 30 (water-insoluble) | 52000 |
| Example 19 | 19 | A-19 | 5 | 20 | 30 | 0 | 0.67 | 90 | 80 (water-insoluble) | 46000 |
| Example 20 | 20 | A-20 | 5 | 20 | 30 | 0 | 0.67 | 88 | 30 (water-insoluble) | 42000 |
| Example 21 | 21 | A-21 | 5 | 10 | 30 | 0 | 0.33 | 109 | 150 (water-insoluble) | 22000 |
| Example 22 | 22 | A-22 | 5 | 10 | 30 | 0 | 0.33 | 140 | 50 (water-insoluble) | 24000 |
| Example 23 | 23 | A-23 | 5 | 10 | 30 | 0 | 0.33 | 100 | 50 (water-insoluble) | 55000 |

| | | Aggregation component Content (% by mass) | Water-insoluble resin particle/aggregation component (mass ratio) | Type of treatment liquid | Density of solid image area | Streak unevenness | Streak unevenness with time | Image graininess | Temporal stability of treatment liquid |
|---|---|---|---|---|---|---|---|---|---|
| | Example 13 | 25.9 | 0.19 | A13 | 4 | 5 | 4 | 5 | 5 |
| | Example 14 | 25.9 | 0.19 | A14 | 4 | 5 | 5 | 5 | 5 |
| | Example 15 | 25.9 | 0.19 | A15 | 4 | 5 | 4 | 5 | 5 |
| | Example 16 | 25.9 | 0.19 | A16 | 5 | 5 | 5 | 5 | 4 |
| | Example 17 | 25.9 | 0.19 | A17 | 5 | 5 | 5 | 5 | 5 |
| | Example 18 | 25.9 | 0.19 | A18 | 5 | 4 | 4 | 5 | 4 |
| | Example 19 | 25.9 | 0.19 | A19 | 5 | 4 | 4 | 5 | 3 |
| | Example 20 | 25.9 | 0.19 | A20 | 5 | 4 | 3 | 5 | 3 |
| | Example 21 | 25.9 | 0.19 | A21 | 6 | 5 | 5 | 5 | 5 |
| | Example 22 | 25.9 | 0.19 | A22 | 6 | 5 | 5 | 5 | 5 |
| | Example 23 | 25.9 | 0.19 | A23 | 5 | 5 | 5 | 5 | 5 |

TABLE 7

| | Type of ink set | Type | Content (% by mass) | Constitutional unit derived from first monomer (% by mass) | Constitutional unit derived from second monomer (% by mass) | -Second monomer- ratio of mass of oxygen atoms/molecular weight (% by mass) | Ratio of first monomer/second monomer (% by mass) | Tg (° C.) | Volume average particle diameter (nm) | Weight-average molecular weight |
|---|---|---|---|---|---|---|---|---|---|---|
| Example 24 | 3 | A-3 | 5 | 20 | 30 | 0 | 0.67 | 108 | 40 (water-insoluble) | 31000 |

TABLE 7-continued

| | | | | | | | | | | |
|---|---|---|---|---|---|---|---|---|---|---|
| Example 25 | 3 | A-3 | 5 | 20 | 30 | 0 | 0.67 | 108 | 40 (water-insoluble) | 31000 |
| Example 26 | 3 | A-3 | 5 | 20 | 30 | 0 | 0.67 | 108 | 40 (water-insoluble) | 31000 |
| Example 27 | 3 | A-3 | 5 | 20 | 30 | 0 | 0.67 | 108 | 40 (water-insoluble) | 31000 |
| Example 28 | 3 | A-3 | 5 | 20 | 30 | 0 | 0.67 | 108 | 40 (water-insoluble) | 31000 |
| Example 29 | 24 | A-24 | 5 | 20 | 10 | 0.15 | 2.00 | 105 | 70 (water-insoluble) | 31000 |
| Example 30 | 25 | A-25 | 5 | 20 | 30 | 0.23 | 0.67 | 93 | 80 (water-insoluble) | 36000 |
| Example 31 | 3 | A-3 | 3 | 20 | 30 | 0 | 0.67 | 108 | 40 (water-insoluble) | 31000 |
| Example 32 | 3 | A-3 | 10 | 20 | 30 | 0 | 0.67 | 108 | 40 (water-insoluble) | 31000 |
| Comparative Example 1 | X1 | X-1 | 5 | 70 | 0 | — | — | — | Not detected (water-soluble) | 27000 |
| Comparative Example 2 | X2 | X-2 | 5 | 8 | 0 | — | — | — | 70 (water-insoluble) | 16000 |
| Comparative Example 3 | X3 | X-3 | 5 | 20 | 0 | — | — | — | 60 (water-insoluble) | 18000 |
| Comparative Example 4 | X4 | X-4 | 5 | 0 | 30 | 0 | 0.00 | — | 40 (water-insoluble) | 14000 |

| | | | | Evaluation result | | | | |
|---|---|---|---|---|---|---|---|---|
| | Aggregation component Content (% by mass) | Water-insoluble resin particle/aggregation component (mass ratio) | Type of treatment liquid | Density of solid image area | Streak unevenness | Streak unevenness with time | Image graininess | Temporal stability of treatment liquid |
| Example 24 | 10 | 0.50 | B | 5 | 5 | 5 | 5 | 5 |
| Example 25 | 10 | 0.50 | C | 5 | 5 | 5 | 5 | 5 |
| Example 26 | 10 | 0.50 | D | 5 | 5 | 5 | 5 | 5 |
| Example 27 | 5 | 1.00 | E | 5 | 5 | 5 | 4 | 5 |
| Example 28 | 3 | 1.67 | F | 5 | 4 | 4 | 3 | 5 |
| Example 29 | 25.9 | 0.19 | A24 | 4 | 4 | 4 | 5 | 4 |
| Example 30 | 25.9 | 0.19 | A25 | 4 | 4 | 4 | 5 | 4 |
| Example 31 | 25.9 | 0.12 | A26 | 5 | 5 | 5 | 5 | 5 |
| Example 32 | 25.9 | 0.39 | A27 | 5 | 5 | 5 | 5 | 5 |
| Comparative Example 1 | 25.9 | 0.19 | AX1 | 1 | 2 | 2 | 4 | 3 |
| Comparative Example 2 | 25.9 | 0.19 | AX2 | 4 | 3 | 2 | 4 | 1 |
| Comparative Example 3 | 25.9 | 0.19 | AX3 | 4 | 4 | 2 | 4 | 2 |
| Comparative Example 4 | 25.9 | 0.19 | AX4 | 3 | 3 | 2 | 1 | 1 |

As listed in Tables 5 to 7, in the ink sets containing the treatment liquid obtained by using the water-insoluble resin particles A-1 to A-25, an image in which a decrease in density of a solid image area was suppressed and occurrence of streak unevenness and the graininess of the image were suppressed was obtained.

Hereinafter, the examples will be described in more detail with reference to Tables 5 to 7.

(1) As described in Examples 1 to 5, a decrease in density of a solid image area and occurrence of streak unevenness were more effectively suppressed by adjusting the content ratio of the constitutional unit derived from the first monomer containing a sulfo group and the like to the total mass of the water-insoluble resin to 25% by mass or less.

(2) Further, as evident from the comparison of Example 7, Examples 11 and 12, and Examples 8 to 10, in Examples 7 to 10 in which the content ratio of the constitutional unit derived from the second monomer having an aromatic ring structure or an alicyclic structure to the total mass of the water-insoluble resin was 40% by mass or less, a decrease in density of a solid image area and occurrence of streak unevenness were more effectively suppressed compared to Examples 10 and 11 in which the content ratio of the constitutional unit derived from the second monomer was greater than 40% by mass. Further, it was understood that the occurrence of streak unevenness with time was more effectively suppressed by adjusting the content ratio of the constitutional unit derived from the second monomer having an aromatic ring structure or an alicyclic ring structure to the total mass of the water-insoluble resin to 10% by mass or greater, compared to Examples 7 and 8 to 10 in which the content ratio of the constitutional unit derived from the second monomer was less than 10% by mass.

(3) For example, in Example 3 in which the treatment liquid containing the water-insoluble resin particles with 0.1% by mass or less of oxygen atoms was used, the effect of suppressing a decrease in density of a solid image area was remarkably exhibited, compared to Examples 13 to 15 in which the treatment liquid containing the water-insoluble resin particles with greater than 0.1% by mass of oxygen atoms in a molecule was used.

(4) As evident from the comparison between Example 3 and Example 16 in which the kinds of the constitutional units derived from the first monomer in the water-insoluble resin were different from each other, the structure having —C(=O)—NH— was excellent than the structure having —C(=O)—O— represented by $L^4$ in Formula 1 from the viewpoint of the temporal stability in the treatment liquid. It is speculated that the structure of —C(=O)—O— is more easily hydrolyzed.

(5) As described in Example 18 to 20, in a case where the glass transition temperature (Tg) of the water-insoluble resin was lower than 100° C., there was a tendency that the effect of suppressing the streak unevenness was lowered and degradation of temporal stability of the treatment liquid was caused. Therefore, it is desirable that the Tg of the water-insoluble resin is 100° C. or higher.

Further, in a case where Ma was contained in the water-insoluble resin as a monomer component and the Tg was 100° C. or higher, as described in Examples 21 and 22, the effect of suppressing a decrease in density of a solid image area was significant, and a solid image area with a desired density was obtained.

(6) As described in Examples 3, 31, and 32, in a case where the amount of the water-insoluble resin to be added was in a range of 3% by mass to 10% by mass, an image in which a decrease in density of a solid image area was suppressed and the occurrence of streak unevenness and the graininess of an image were also suppressed was obtained.

(7) On the contrary, in all comparative examples, it was difficult to suppress a decrease in density of a solid image area and the occurrence of streak unevenness.

In a case where a water-insoluble resin was used as in Comparative Example 1, since it is difficult for the resin to permeate into the substrate and be unevenly distributed in the surface of the substrate, a decrease in density of a solid image area and occurrence of streak unevenness were not able to be suppressed. Further, in a case of the ink set of Comparative Example 1, the temporal stability of the treatment liquid was relatively good, but the initial viscosity was likely to be increased.

Further, in Comparative Examples 2 and 3, since the water-insoluble resin did not have an aromatic ring structure and an alicyclic structure, occurrence of streak unevenness was significantly found with time, and the temporal stability of the treatment liquid was degraded.

In Comparative Example 4, since the water-insoluble resin did not contain a sulfo group or a salt of the sulfo group, a decrease in density of a solid image area was not able to be suppressed, and the streak unevenness and the graininess of an image were significantly found. Further, severe deterioration of the temporal stability of the treatment liquid was found.

Example 263

Respective components in the composition listed in Table 8 were mixed to prepare eighteen kinds of ink compositions (respectively three ink compositions for each of magenta ink, cyan ink, yellow ink, black ink, orange ink, green ink, and violet ink). Further, an ink set was prepared by optionally selecting any one ink composition from among eighteen ink compositions and any one treatment liquid from among the above-described treatment liquids A-3, A-9, A-14, A-16, and A-22 and combining these.

An image was recorded according to the same procedures as in Example 1 using the prepared ink set, and the density of a solid image, the occurrence of streak unevenness, and the graininess of an image were evaluated with respect to the recorded image.

Further, the density of the solid image and the streak unevenness were evaluated in the same manner as in Example 1 and the like after each color of solid image was formed.

In addition, the graininess of the image was evaluated as follows after optional two ink compositions were selected from eighteen ink compositions listed in Table 8.

In other words, an image sample was obtained using two kinds of ink compositions selected from the ink compositions listed in Table 8 in the image recording step, the secondary image area in the obtained image sample was visually observed, and evaluation was performed in the same manner as in the section of "—2. Graininess of image—". Further, the secondary color image area was obtained by applying one of two ink compositions to the coated treatment liquid in a solid state to form a solid image, applying the other ink composition to the solid image in the form of halftone dots such that the halftone dot area rate was set to be in a range of 50% to 80%, and performing the heating and fixing treatment.

As the result of evaluation, an image in which a decrease in density of a solid image area was suppressed and the occurrence of streak unevenness and the graininess of an image were also suppressed was obtained similar to Example 1 and the like in all ink sets.

TABLE 8

| | Non-volatile content (% by mass) | Cyan ink | | | Magenta ink | | | Yellow ink | | | Black ink | | |
|---|---|---|---|---|---|---|---|---|---|---|---|---|---|
| | | Ca | Cb | Cc | Ma | Mb | Mc | Ya | Yb | Yc | Ka | Kb | Kc |
| Pro-Jet Cyan APD-3000 | 21.8 | 17.50 | 22.80 | 28.00 | — | — | — | — | — | — | 2.97 | 3.87 | 4.76 |
| Pro-Jet Magenta APD-3000 | 21.6 | — | — | — | 35.00 | 45.50 | 56.00 | — | — | — | 3.60 | 4.68 | 5.76 |
| Pro-Jet Yellow APD-3000 | 24.6 | — | — | — | — | — | — | 28.00 | 36.40 | 44.80 | — | — | — |
| Pro-Jet Black APD-3000 | 18.9 | — | — | — | — | — | — | — | — | — | 19.00 | 24.70 | 30.40 |
| FUJI SP ORANGE 651 | 19.0 | — | — | — | — | — | — | — | — | — | — | — | — |
| FUJI SP GREEN 7409 | 17.5 | — | — | — | — | — | — | — | — | — | — | — | — |
| FUJI SP VIOLET 9609 | 18.5 | — | — | — | — | — | — | — | — | — | — | — | — |
| Latex A | | 34.00 | 34.00 | 34.00 | 15.50 | 15.50 | 15.50 | 27.50 | 27.50 | 27.50 | 31.00 | 31.00 | 31.00 |
| Propylene glycol | | 13.00 | 12.00 | 9.00 | 15.00 | 14.00 | 9.00 | 13.00 | 12.00 | 9.00 | 13.00 | 12.00 | 9.00 |
| Glycerin | | 3.00 | 2.50 | 2.00 | 3.00 | 2.50 | 2.00 | 3.00 | 2.50 | 2.00 | 3.00 | 2.50 | 2.00 |
| PE-108 | | 1.00 | — | — | 1.00 | — | — | 1.00 | — | — | 1.00 | — | — |
| GP250 | | — | — | 1.50 | — | — | 1.50 | — | — | 1.50 | — | — | 1.50 |
| PEG-200 | | 0.50 | — | — | 0.50 | — | — | 0.50 | — | — | 0.50 | — | — |
| MFTG | | — | — | 0.50 | — | — | 0.50 | — | — | 0.50 | — | — | 0.50 |
| PVP K15 | | 0.09 | 0.09 | 0.09 | 0.10 | 0.10 | 0.10 | 0.10 | 0.10 | 0.10 | 0.09 | 0.09 | 0.09 |
| Urea | | 5.00 | 5.00 | 5.00 | 5.00 | 5.00 | 5.00 | 5.00 | 5.00 | 5.00 | 5.00 | 5.00 | 5.00 |
| OLFINE E1010 | | 0.25 | 0.25 | 0.25 | 0.25 | 0.25 | 0.25 | 0.25 | 0.25 | 0.25 | 0.25 | 0.25 | 0.25 |
| OLFINE E1020 | | 1.00 | 1.00 | 1.00 | 1.00 | 1.00 | 1.00 | 1.00 | 1.00 | 1.00 | 1.00 | 1.00 | 1.00 |
| Potassium nitrate | | — | 0.05 | 0.05 | — | — | — | — | 0.05 | 0.05 | — | 0.03 | 0.03 |

TABLE 8-continued

| | | | | | | | | | | | | | |
|---|---|---|---|---|---|---|---|---|---|---|---|---|---|
| SELOSOL 524D | 30.0 | 6.67 | 6.67 | 6.67 | 6.67 | 6.67 | 6.67 | 6.67 | 6.67 | 6.67 | 6.67 | 6.67 | 6.67 |
| SNOWTEX XS | 20.0 | 0.27 | 0.27 | 0.27 | 0.27 | 0.27 | 0.27 | 0.27 | 0.27 | 0.27 | 0.27 | 0.27 | 0.27 |
| BYK-024 | 15.0 | 0.01 | 0.01 | 0.01 | 0.01 | 0.01 | 0.01 | 0.01 | 0.01 | 0.01 | 0.01 | 0.01 | 0.01 |
| Capstone FS-63 | 35.0 | 0.02 | 0.02 | 0.02 | 0.02 | 0.02 | 0.02 | 0.02 | 0.02 | 0.02 | 0.02 | 0.02 | 0.02 |
| Water | | 17.70 | 15.35 | 11.65 | 16.69 | 9.19 | 2.19 | 13.69 | 8.24 | 1.34 | 12.63 | 7.93 | 1.76 |

| | Non-volatile content | Orange ink | | | Green ink | | | Violet ink | | |
|---|---|---|---|---|---|---|---|---|---|---|
| | (% by mass) | Oa | Ob | Oc | Ga | Gb | Gc | Va | Vb | Vc |
| Pro-Jet Cyan APD-3000 | 21.8 | — | — | — | — | — | — | — | — | — |
| Pro-Jet Magenta APD-3000 | 21.6 | — | — | — | — | — | — | — | — | — |
| Pro-Jet Yellow APD-3000 | 24.6 | — | — | — | — | — | — | — | — | — |
| Pro-Jet Black APD-3000 | 18.9 | — | — | — | — | — | — | — | — | — |
| FUJI SP ORANGE 651 | 19.0 | 19.00 | 24.70 | 30.40 | — | — | — | — | — | — |
| FUJI SP GREEN 7409 | 17.5 | — | — | — | 30.00 | 39.00 | 48.00 | — | — | — |
| FUJI SP VIOLET 9609 | 18.5 | — | — | — | — | — | — | 9.00 | 11.70 | 14.40 |
| Latex A | | 31.50 | 31.50 | 28.00 | 24.50 | 24.50 | 22.00 | 33.00 | 33.00 | 36.00 |
| Propylene glycol | | 15.00 | 14.00 | 12.00 | 11.00 | 10.00 | 8.00 | 15.00 | 14.00 | 12.00 |
| Glycerin | | 3.00 | 2.50 | 2.00 | 3.00 | 2.50 | 2.00 | 3.00 | 2.50 | 2.00 |
| PE-108 | | 1.00 | — | — | 1.00 | — | — | 1.00 | — | — |
| GP250 | | — | — | 1.50 | — | — | 1.50 | — | — | 1.50 |
| PEG-200 | | 0.50 | — | — | 0.50 | — | — | 0.50 | — | — |
| MFTG | | — | — | 0.50 | — | — | — | — | — | 0.50 |
| PVP K15 | | 0.10 | 0.10 | 0.10 | 0.10 | 0.10 | 0.10 | 0.10 | 0.10 | 0.10 |
| Urea | | 5.00 | 5.00 | 5.00 | 5.00 | 5.00 | 5.00 | 5.00 | 5.00 | 5.00 |
| OLFINE E1010 | | 0.03 | 0.03 | 0.03 | 0.03 | 0.03 | 0.03 | 0.03 | 0.03 | 0.03 |
| OLFINE E1020 | | 1.00 | 1.00 | 1.00 | 1.00 | 1.00 | 1.00 | 1.00 | 1.00 | 1.00 |
| Potassium nitrate | | — | — | 0.05 | — | — | 0.03 | — | — | 0.05 |
| SELOSOL 524D | 30.0 | 6.67 | 6.67 | 6.67 | 6.67 | 6.67 | 6.67 | 6.67 | 6.67 | 6.67 |
| SNOWTEX XS | 20.0 | 0.27 | 0.27 | 0.27 | 0.27 | 0.27 | 0.27 | 0.27 | 0.27 | 0.27 |
| BYK-024 | 15.0 | 0.01 | 0.01 | 0.01 | 0.01 | 0.01 | 0.01 | 0.01 | 0.01 | 0.01 |
| Capstone FS-63 | 35.0 | 0.02 | 0.02 | 0.02 | 0.02 | 0.02 | 0.02 | 0.02 | 0.02 | 0.02 |
| Water | | 16.91 | 14.21 | 12.46 | 16.91 | 10.91 | 5.38 | 25.41 | 25.71 | 20.46 |

The details of the components listed in Table 8 are as follows.

Pro-Jet Cyan APD3000: pigment dispersion liquid (pigment concentration: 12.0% by mass, non-volatile content concentration: 21.8% by mass) containing Pigment Blue 15:3, manufactured by FUJIFILM Imaging Colorants Co., Ltd.

Pro-Jet Magenta APD3000: pigment dispersion liquid (pigment concentration: 15.0% by mass, non-volatile content concentration: 21.6% by mass) containing Pigment Red 122, manufactured by FUJIFILM Imaging Colorants Co., Ltd.

Pro-Jet Yellow APD3000: pigment dispersion liquid (pigment concentration: 13.6% by mass, non-volatile content concentration: 24.6% by mass) containing Pigment Yellow 74, manufactured by FUJIFILM Imaging Colorants Co., Ltd.

Pro-Jet Black APD3000: pigment dispersion liquid (pigment concentration: 10.0% by mass, non-volatile content concentration: 18.9% by mass) containing Pigment Black 7, manufactured by FUJIFILM Imaging Colorants Co., Ltd.

FUJI SP ORANGE 651: pigment dispersion liquid (pigment concentration: 10.0% by mass, non-volatile content concentration: 18.9% by mass) containing Pigment Orange 43, manufactured by Fuji Pigment Co., Ltd.

FUJI SP GREEN 7409: pigment dispersion liquid (pigment concentration: 15.0% by mass, non-volatile content concentration: 17.5% by mass) containing Pigment Green 7, manufactured by Fuji Pigment Co., Ltd.

FUJI SP VIOLET 9609: pigment dispersion liquid (pigment concentration: 16.0% by mass, non-volatile content concentration: 18.5% by mass) containing Pigment Violet 23, manufactured by Fuji Pigment Co., Ltd.

Latex A: aqueous dispersion of resin particles obtained by mixing the above-described resin particles (B-01) with water and adjusting the solid content thereof to 23.20% by mass PE-108: NEWPOL (registered trademark) PE-108, polyoxyethylene-polyoxypropylene-block polymer (manufactured by SANYO CHEMICAL INDUSTRIES, LTD.)

GP250: SANNIX GP-250, polyoxypropylene glyceryl ether (manufactured by SANYO CHEMICAL INDUSTRIES, LTD.)

PEG-200: polyethylene glycol (manufactured by SANYO CHEMICAL INDUSTRIES, LTD.)

MFTG: tripropylene glycol monomethyl ether (Nippon Nyukazai Co., Ltd.)

PVP K15: polyvinylpyrrolidone (manufactured by Tokyo Chemical Industry Co., Ltd.)

OLFINE E1010: acetylene glycol-based surfactant (manufactured by Nissin Chemical Industry Co., Ltd.)

OLFINE E1020: acetylene glycol-based surfactant (manufactured by Nissin Chemical Industry Co., Ltd.)

SELOSOL (registered trademark) 524D: ester wax (manufactured by CHUKYO YUSHI CO., LTD.)

SNOWTEX (registered trademark) XS: colloidal silica (manufactured by NISSAN CHEMICAL INDUSTRIES, LTD.)

BYK-024: silicone-based anti-foaming agent (manufactured by BYK Chemie GmbH)

Capstone FS-63: fluorine-based surfactant (manufactured by Du Pont)

What is claimed is:

1. An ink set comprising:
an ink composition which contains a colorant and water; and a treatment liquid which contains water-insoluble resin particles having a constitutional unit derived from a first monomer that contains at least one group selected from a sulfo group and a salt of the sulfo group and a constitutional unit derived from a second monomer that contains at least one structure selected from an aromatic ring structure and an alicyclic structure, a compound that causes the colorant in the ink composition to aggregate, and water, wherein the water-insoluble resin particles are dispersed in the treatment liquid, wherein the constitutional unit derived from the first monomer is a constitutional unit represented by Formula 1,

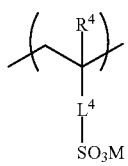

Formula 1 in the formula, $R^4$ represents a methyl group or a hydrogen atom, $L^4$ represents a divalent linking group formed by linking one or two or more groups selected from the group consisting of a single bond, a linear, branched, or cyclic alkylene group having 1 to 10 carbon atoms, an arylene group having 6 to 10 carbon atoms, —O—, —NH—, —S—, —C(=O)—, and —CH(—OH)—, and M represents a hydrogen atom or a cation.

2. The ink set according to claim 1, wherein the constitutional unit derived from the second monomer is at least one constitutional unit selected from the group of constitutional units represented by any of Formulae A to E,

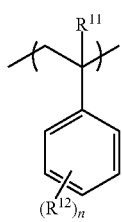

Formula A

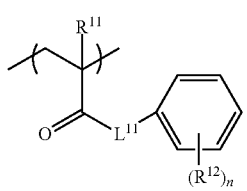

Formula B

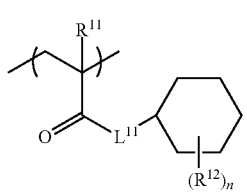

Formula C

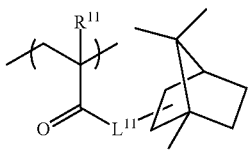

Formula D

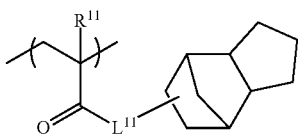

Formula E in the formulae, $R^{11}$ represents a methyl group or a hydrogen atom, $R^{12}$ represents a hydrogen atom or a linear or branched alkyl group having 1 to 10 carbon atoms, n represents an integer of 0 to 5, and in a case where n represents 2 or greater, a plurality of $R^{12}$'s may be the same as or different from each other, and $L^{11}$ represents a divalent linking group formed by linking one or two or more groups selected from the group consisting of a single bond, a linear, branched, or cyclic alkylene group having 1 to 18 carbon atoms, an arylene group having 6 to 18 carbon atoms, —O—, —NH—, —S—, and —C(=O)—.

3. The ink set according to claim 1, wherein a content ratio of the total constitutional units derived from the second monomer in the water-insoluble resin to a total mass of the water-insoluble resin is in a range of 10% by mass to 40% by mass.

4. The ink set according to claim 1, wherein a mass ratio of the constitutional unit derived from the first monomer to the constitutional unit derived from the second monomer is in a range of 0.15 to 0.90.

5. The ink set according to claim 1, wherein a content ratio of the constitutional unit derived from the first monomer in the water-insoluble resin to a total mass of the water-insoluble resin is in a range of 5% by mass to 25% by mass.

6. The ink set according to claim 1, wherein a mass ratio of oxygen atoms in at least one second monomer to a molecular weight of the second monomer is 0.1 or less.

7. The ink set according to claim 1, wherein at least one second monomer is styrene.

8. The ink set according to claim 1, wherein a glass transition temperature of the water-insoluble resin is 100° C. or higher.

9. The ink set according to claim 1, wherein a content ratio of the water-insoluble resin particles to the compound that causes the colorant to aggregate is in a range of 0.19 to 0.5 in terms of the mass.

10. An image recording method comprising:

a pre-treatment step of applying the treatment liquid of the ink set according to claim 1 to at least one surface of a substrate having a contact angle of 70° or greater when 3 seconds have elapsed from application of water droplets to the surface; and an image recording step of recording an image by jetting the ink composition of the ink set according to claim 1 to the surface to which the treatment liquid has been applied using an ink jet method.

11. The image recording method according to claim 10, wherein the substrate is a paper substrate having a coating layer.

\* \* \* \* \*